Oct. 6, 1959 N. B. COLEY 2,907,981

CODE COMMUNICATION SYSTEM

Filed June 5, 1953 22 Sheets-Sheet 1

INVENTOR.
N.B. COLEY
BY Forest B. Hitchcock
HIS ATTORNEY

FIG.8. CONTROL CODE CHART

| STEP NOS. | COND. | CONTROL STA. CODES | | | CONTROLS | | | SPARES | | | CK |
|---|---|---|---|---|---|---|---|---|---|---|---|
| | 1 | 2 | 3 | 4 | 5 | 6 | 7 | 8 | 9 | 10 | 11 |
| SW. NORMAL | | | | | S | | | | | | |
| SW. REVERSE | | | | | M | | | | | | |
| SIG. RIGHT | | | | | | M | S | | | | |
| SIG. LEFT | | | | | | S | M | | | | |
| SIG. STOP | | | | | | S | S | | | | |

S = SPACE
M = MARK

INVENTOR.
N.B. COLEY
BY Forest B. Hitchcock
HIS ATTORNEY

Oct. 6, 1959 N. B. COLEY 2,907,981

CODE COMMUNICATION SYSTEM

Filed June 5, 1953 22 Sheets-Sheet 3

INVENTOR.
N.B.COLEY
BY Forest B. Hitchcock
HIS ATTORNEY

Oct. 6, 1959 N. B. COLEY 2,907,981

CODE COMMUNICATION SYSTEM

Filed June 5, 1953 22 Sheets-Sheet 4

INVENTOR.

N.B. COLEY

BY Forest B. Hitchcock

HIS ATTORNEY

CODE COMMUNICATION SYSTEM

Filed June 5, 1953 22 Sheets-Sheet 5

INVENTOR.
N.B.COLEY
BY Forest B. Hitchcock
HIS ATTORNEY

INVENTOR.
N.B.COLEY
BY *Forest B. Hitchcock*
HIS ATTORNEY

Oct. 6, 1959 N. B. COLEY 2,907,981

CODE COMMUNICATION SYSTEM

Filed June 5, 1953 22 Sheets-Sheet 7

*INVENTOR.*

N.B.COLEY

*BY* Forest B. Hitchcock

HIS ATTORNEY

INVENTOR.
N.B.COLEY
BY
Forest B. Hitchcock
HIS ATTORNEY

INVENTOR.
N.B.COLEY
BY
Forest B. Hitchcock
HIS ATTORNEY

Oct. 6, 1959 N. B. COLEY 2,907,981

CODE COMMUNICATION SYSTEM

Filed June 5, 1953 22 Sheets-Sheet 10

INVENTOR.
N.B. COLEY
BY
Forest B. Hitchcock
HIS ATTORNEY

INVENTOR.
N.B.COLEY
BY Forest B. Hitchcock
HIS ATTORNEY

INVENTOR.
N.B.COLEY
BY Forest B. Hitchcock
HIS ATTORNEY

INVENTOR.
N. B. COLEY
BY Forest B. Hitchcock
HIS ATTORNEY

CODE COMMUNICATION SYSTEM

Filed June 5, 1953 22 Sheets-Sheet 14

INVENTOR
N.B. COLEY
BY Forest B. Hitchcock
HIS ATTORNEY

Oct. 6, 1959 N. B. COLEY 2,907,981

CODE COMMUNICATION SYSTEM

Filed June 5, 1953 22 Sheets-Sheet 15

INVENTOR.
N.B. COLEY
BY Forest B. Hitchcock
HIS ATTORNEY

CONTROL CYCLE SEQUENCE CHART

INVENTOR.
N.B. COLEY
BY Forest B. Hitchcock
HIS ATTORNEY

INVENTOR.
N.B.COLEY
BY *Forest B. Hitchcock*
HIS ATTORNEY

Oct. 6, 1959 N. B. COLEY 2,907,981

CODE COMMUNICATION SYSTEM

Filed June 5, 1953 22 Sheets-Sheet 18

INDICATION CYCLE SEQUENCE CHART

CONTROL OFFICE STA. NO. 1. (S-S-M) STA. NO. 2. (S-M-S) STA. NO. 3. (S-M-M) STA. NO. 4. (M-S-S)

INVENTOR.
N. B. COLEY
BY Forest B. Hitchcock
HIS ATTORNEY

INVENTOR.
N.B. COLEY
BY Forest B. Hitchcock
HIS ATTORNEY

Oct. 6, 1959 N. B. COLEY 2,907,981

CODE COMMUNICATION SYSTEM

Filed June 5, 1953 22 Sheets-Sheet 20

INVENTOR.
N.B.COLEY
BY Forest B. Hitchcock
HIS ATTORNEY

FIG. 9.

INDICATION CODE CHART

| FUNCTION ALLOCATION | COND. | SYN. CHECK | | STATION SELECTION CODES | | | STATION SELECTION | INDICATIONS | | | NOT USED FOR INDICATIONS | | | CAN BE USED FOR ADDITIONAL INDICATIONS | | | | | | | | |
|---|---|---|---|---|---|---|---|---|---|---|---|---|---|---|---|---|---|---|---|---|---|---|
| STEP NOS. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| CONTROL OFFICE | | | | S | S | S | | | | | | | | | | | | | | | | |
| 1ST. STATION | | S | M | S | S | M | M | | | | S | S | S | | | | | | | | | |
| 2ND. STATION | | S | M | S | M | S | M | | | | S | S | S | | | | | | | | | |
| 3RD. STATION | | S | M | S | M | M | M | | | | S | S | S | | | | | | | | | |
| 4TH. STATION | | S | M | M | S | S | M | | | | S | S | S | | | | | | | | | |
| 5TH. STATION | | S | M | M | S | M | M | | | | S | S | S | | | | | | | | | |
| 6TH. STATION | | S | M | M | M | S | M | | | | S | S | S | | | | | | | | | |
| NOT USED | | | | | | | | | | | | | | | | | | | | | | |

S= SHUNT
M= NONSHUNT

INVENTOR.
N. B. COLEY
BY Forest B. Hitchcock
HIS ATTORNEY

MIDPOINT INDICATION CYCLE
FIELD STATION

MIDPOINT INDICATION CYCLE
CONTROL OFFICE

INVENTOR.
N.B. COLEY
BY
Forest B. Hitchcock
HIS ATTORNEY 2,907,981

CODE COMMUNICATION SYSTEM

Nelson B. Coley, Rochester, N.Y., assignor to General Railway Signal Company, Rochester, N.Y.

Application June 5, 1953, Serial No. 359,727

24 Claims. (Cl. 340—163)

This invention relates to code communication systems, and it more particularly pertains to such systems for the remote control from a control office of railway track switches and signals located at different remotely spaced field stations, and for indicating at the control office the conditions of different devices at the respective field stations.

The system according to the present invention provides a normally at rest code communication system for at times transmitting control codes formed of selected "mark" and "space" characters from a control office to several field stations over a single communication channel, such as a single closed line circuit, and for at other times transmitting indication codes from the respective field stations to the control office over the closed line circuit by selected "shunt" and "non-shunt" code characters.

The setting up of respective code channels is accomplished by stepping relay banks at the control office and at the respective field stations, and the timing of sequential operation of the stepping relays at the different stations is determined solely by an associated timing device such as a normally at rest code oscillator which is effective when initiated to operate through a number of free oscillations. Thus the initiation of stepping at a transmitting station is accomplished by the initiation of the oscillator at the associated station, and by line circuit control means the oscillatory timing devices at the other stations are initiated. Thus, the system according to the present invention provides for the stepping to be operated to completion at each station in the system, irrespective of whether it is a control or an indication cycle of operation of the communication system that is considered.

If there is considerable line circuit propagation time, it will be readily apparent that conditions may arise where the stepping at the control office and at the different field stations can be considerably out of synchronism, particularly where the communication of indications from the different field stations is involved. This is because any field station initiating transmission initiates its own stepping bank and initiates the stepping at the control office and at some of the other stations over the line circuit. An intermediate station may not, however, have its stepping initiated until the line circuit is deenergized by the control office during the conditioning for an indication cycle, and thus, where line propagation time is involved, under certain conditions, the stepping may become considerably out of correspondence between different field stations and the control office.

If there is a second field station indication start that occurs at an intermediate station a little after a start is initiated by a more distant station, where there is considerable propagation time involved, the stepping at the second station to start may lag the control office stepping by more than a complete step. In this case, the control office detects the out of correspondence condition and shunts the line circuit for the remainder of the cycle to retire all stations trying to transmit and thus provides that a new indication cycle will be initiated whereby the stations will initiate their transmission substantially simultaneously. In a new cycle of operation, the stations are sufficiently in step with the control office for proper communication of indication codes.

Similarly, in the case of simultaneous starts between the control office and a field station in which the control office determines that the cycle of operation is for the transmission of control codes, if considerable line propagation time is involved, a field station initiating transmission may be sufficiently out of step with the control office to prevent accurate decoding of the control code transmitted during the control cycle of operation. This condition of out of correspondence is automatically detected by the field station during the second step in a cycle, and if an out of correspondence condition is detected, an execution of the code received at that station is prevented.

An object of the present invention is to reduce to a minimum the amount of apparatus required in a code communication system for the communication of controls from a control office to a plurality of field stations and for the communication of indications from the respective field stations to the control office.

Another object of the present invention is to provide means at a field station for detecting a condition of out of synchronism with the control office and for preventing execution of a control code at that field station in case a condition of out of synchronism is detected.

Another object of the present invention is to provide means for retiring all stations transmitting indications during an indication cycle of operation in case the stepping at any one station is materially out of synchronism with the stepping at the control office.

Other objects, purposes and characteristic features of the present invention will be in part obvious from the accompanying drawings and in part pointed out as the description of the invention progresses.

In describing the invention in detail, reference is made to the accompanying drawings, in which corresponding parts are designated by like reference characters, in which similar parts having similar functions are designated by like letter reference characters generally having preceding numerals indicative of the order of relay operations and succeeding numerals indicative of designation of a distinctive location or station with which the apparatus is associated, and in which:

Figs. 1A and 1B when placed end to end illustrate the line circuit for one embodiment of the present invention;

Figure 10:
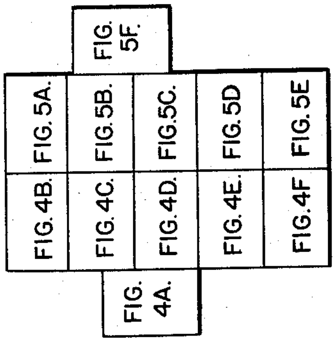
Figure 6A:
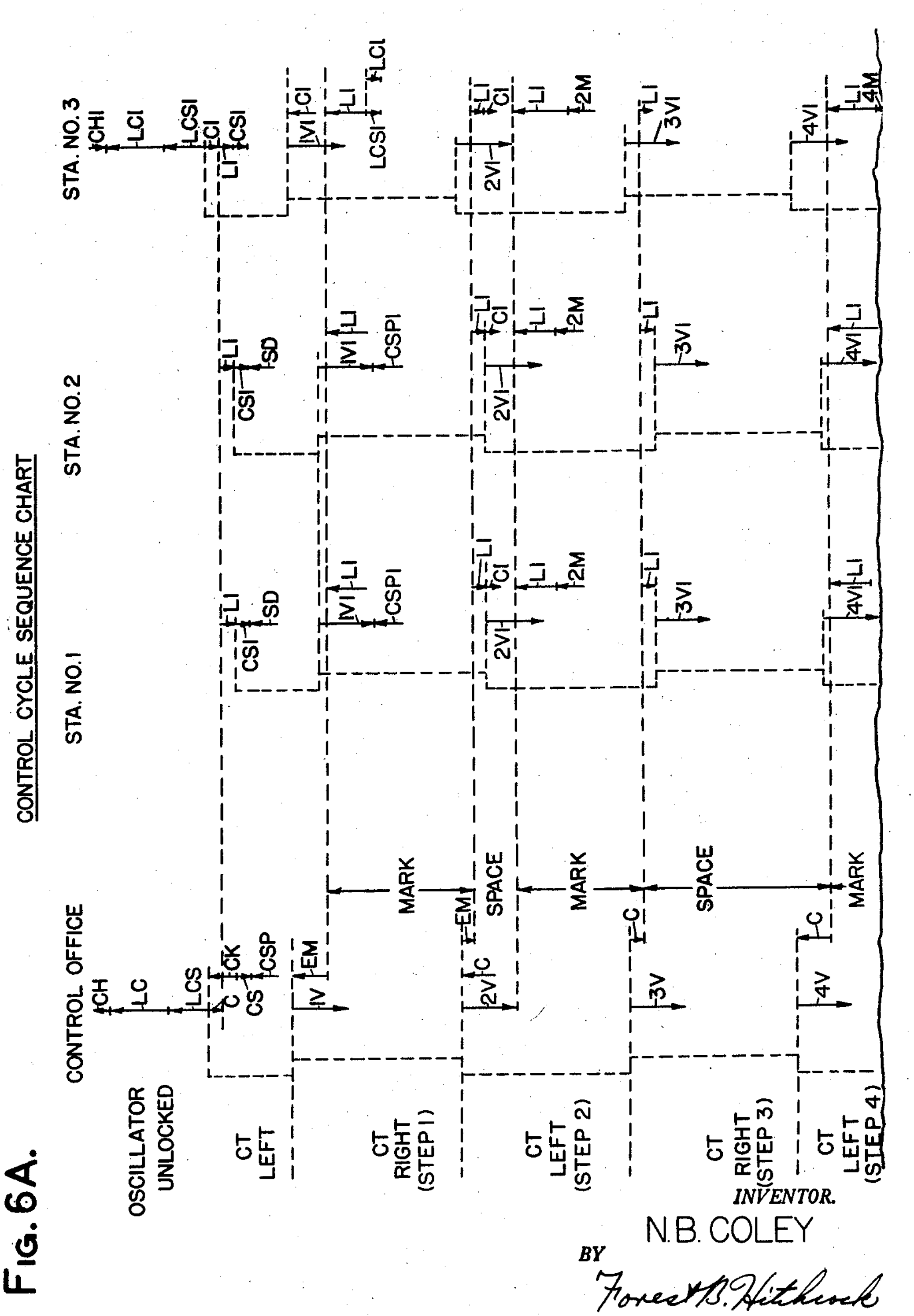
Figure 6B:
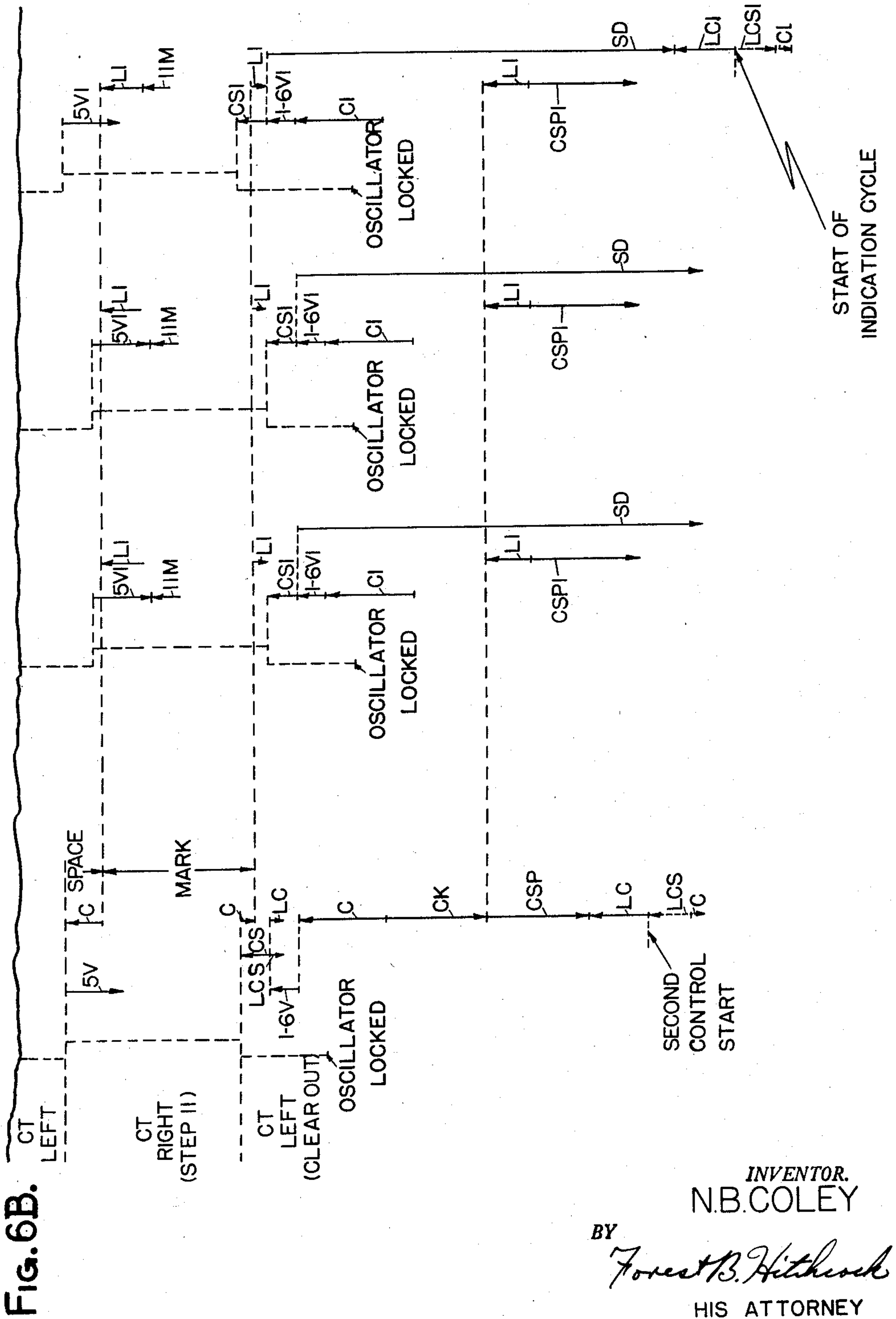
Figure 7A:
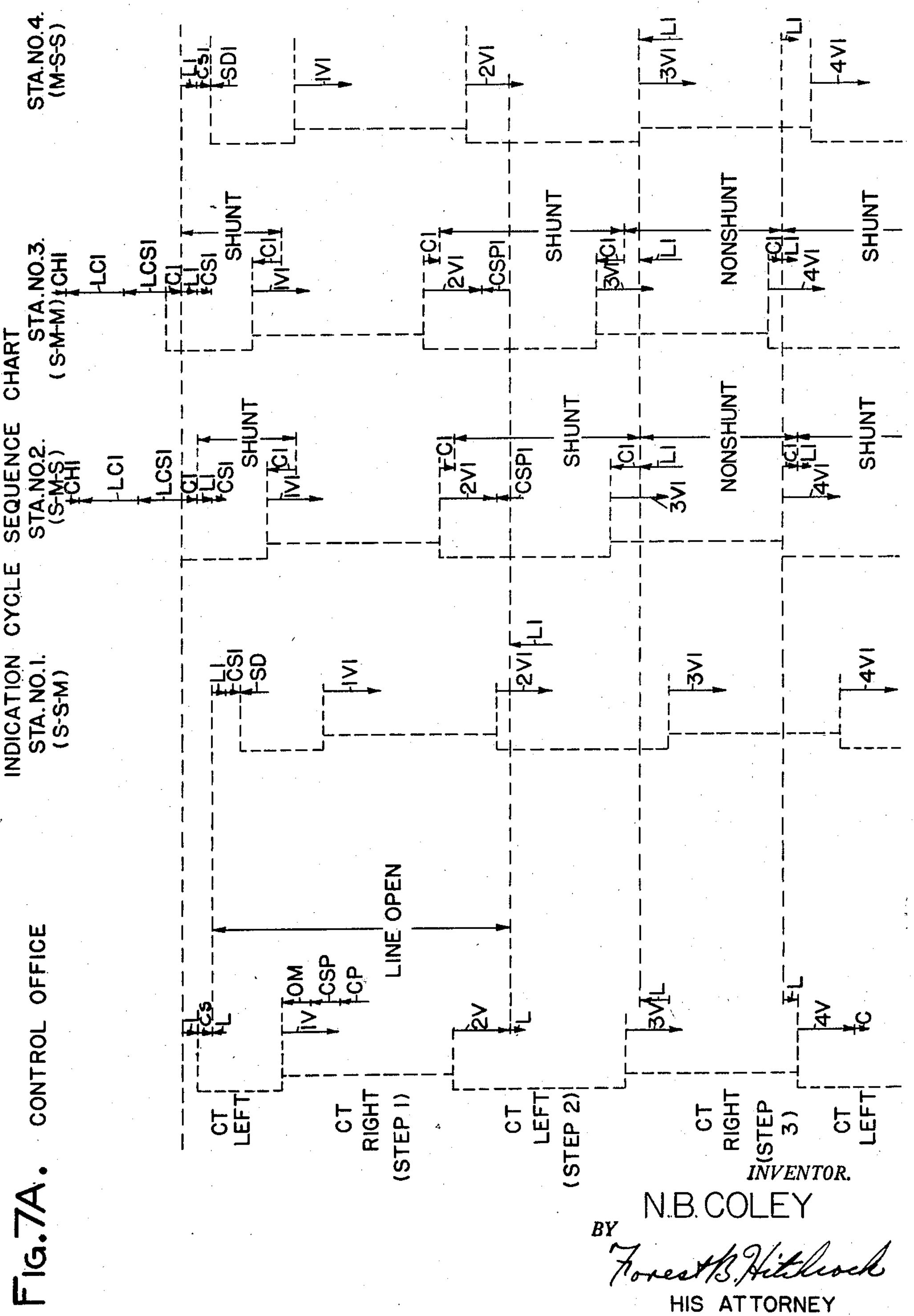
Figure 7B:
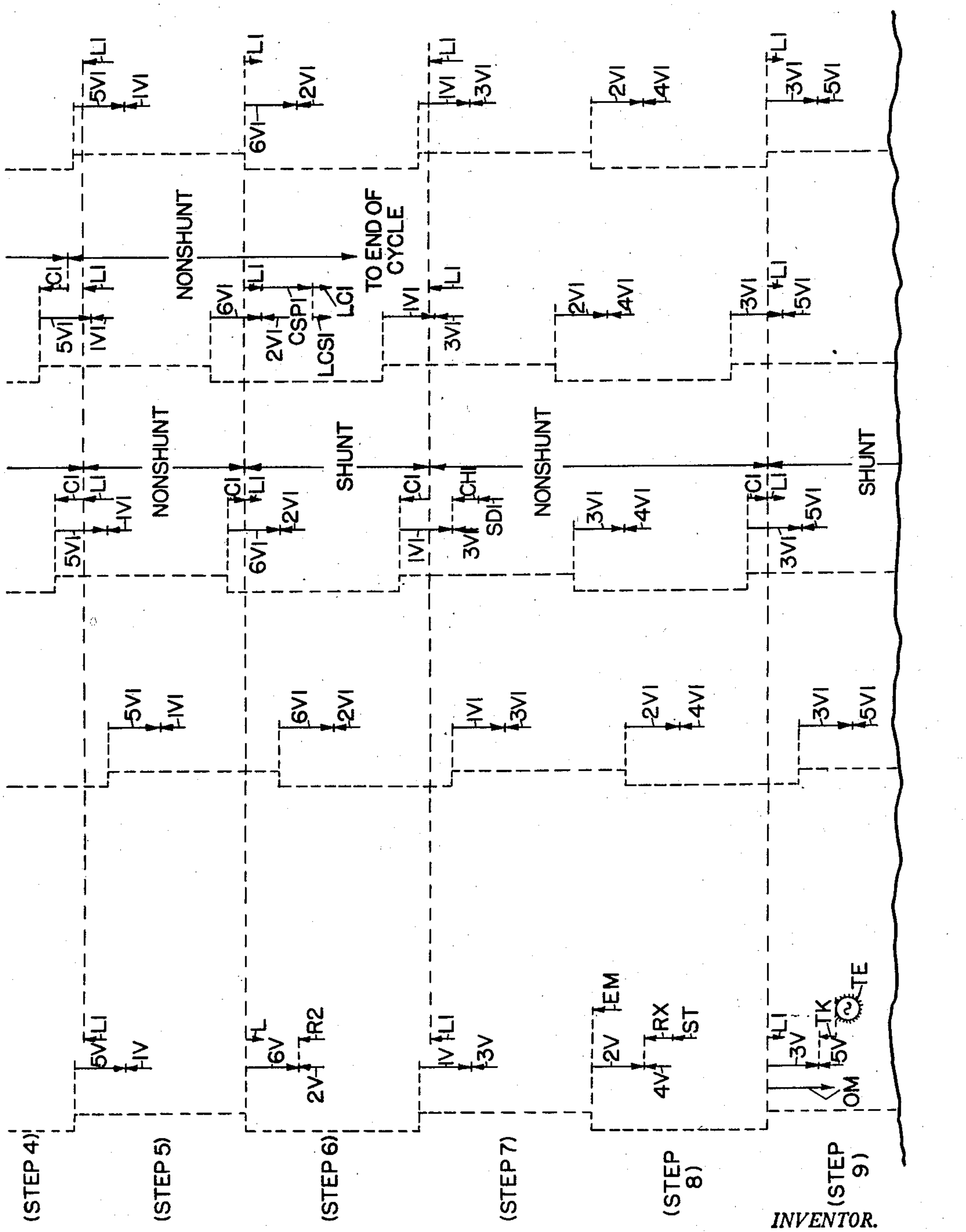
Figure 7C:
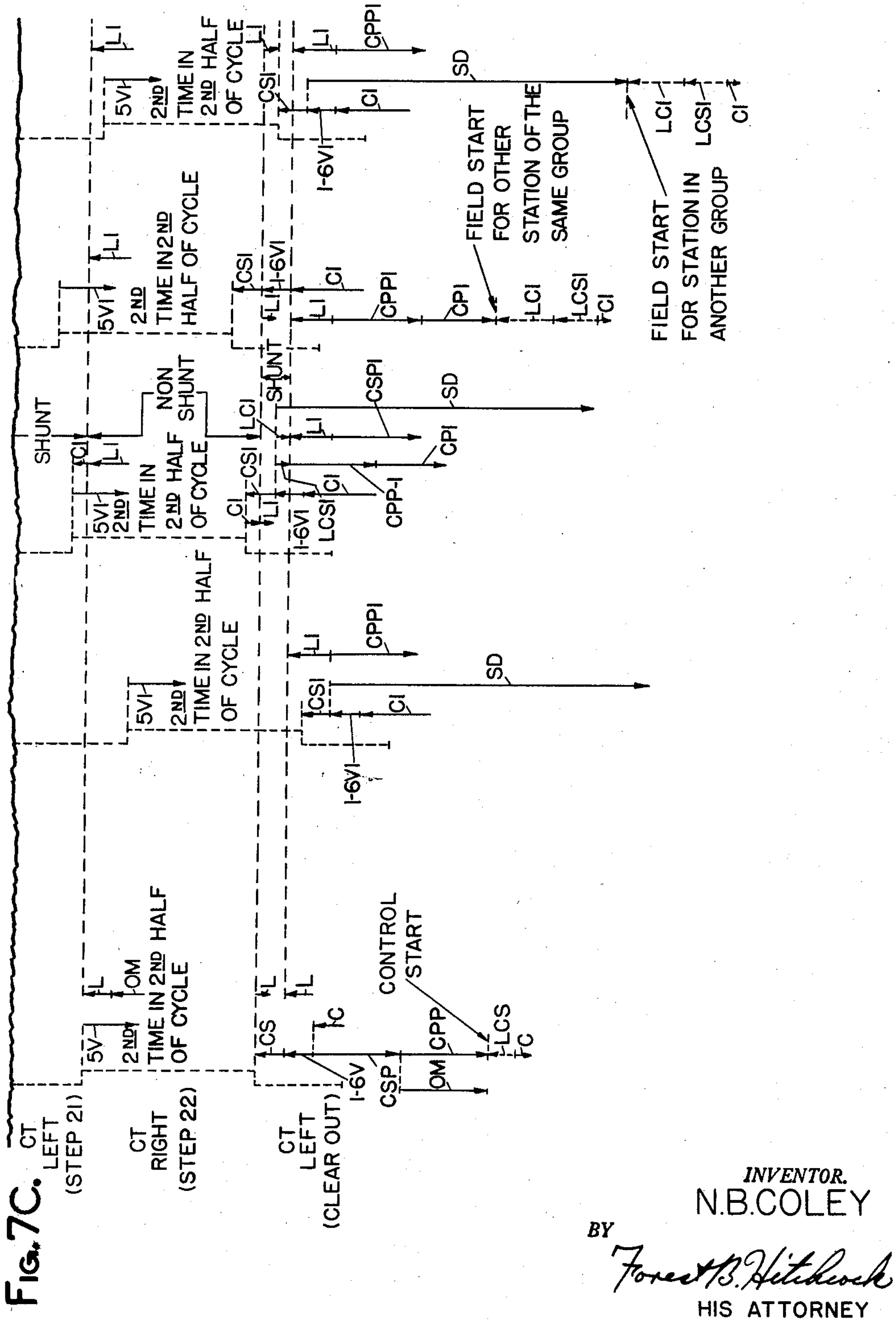
Figure 11A:
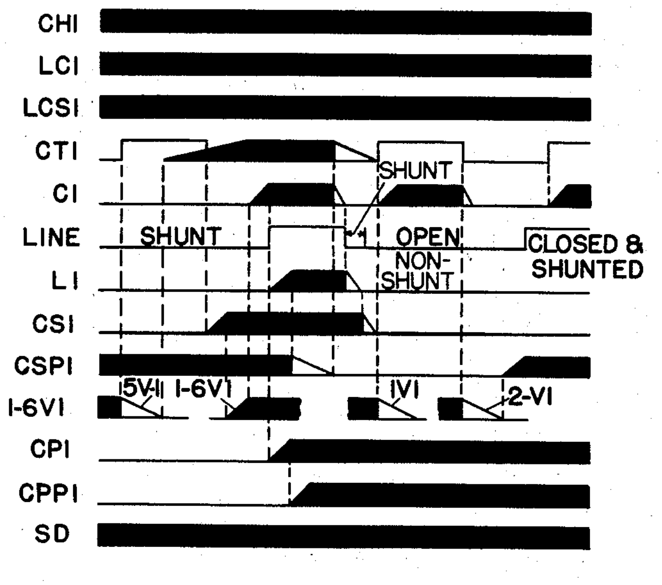
Figure 11B:
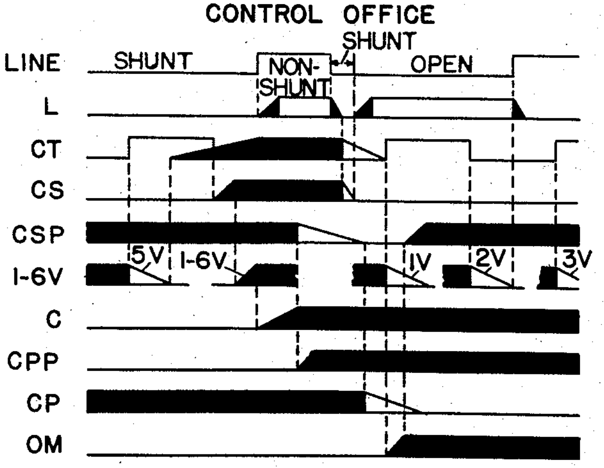

Figs. 4A to 4F inclusive, when arranged according to the arrangement plan of Fig. 10, illustrate the control of apparatus at a control office for the transmission of controls and the reception of indications according to one embodiment of the present invention;

Figs. 5A to 5F inclusive, when arranged according to the arrangement plan of Fig. 10 illustrate the apparatus for receiving controls and transmitting indications at a typical field station;

Figs. 6A and 6B, when placed one above the other, form a control cycle sequence chart illustrating the sequence in which the relays of the system are operated during a typical control cycle of operation;

Figs. 7A, 7B and 7C when placed one above the other form an indication cycle sequence chart illustrating the sequence of operation of the relays of the system during a typical indication cycle of operation;

Fig. 8 is a control code chart showing a typical manner in which the control codes may be assigned;

Fig. 9 is a code chart showing the order for indication station code superiority;

Fig. 10 is an arrangement plan showing the arrangement of drawings desirable for coordination of circuits for the control office and field station code communication system organization;

Figs. 11A and 11B illustrate a typical sequence of relay operation at a transmitting field station and at the control office respectively at the midpoint in an indication cycle of operation.

For the purpose of simplifying the illustrations and facilitating in the explanation thereof, the various parts and circuits constituting this embodiment of the present invention have been shown diagrammatically by conventional schematic diagrams in an arrangement to more particularly facilitate an understanding of the mode of operation of the system, rather than to attempt to point out all of the necessary details of construction and specific arrangement of components that may be provided by those skilled in the art in accordance with the requirements of practice. The symbols (+) and (—) have been used to indicate connections to the respective positive and negative terminals of suitable batteries or other sources of direct current, and the symbols (B+) and (B—) have been used to indicate connections to the respective positive and negative terminals of a suitable split battery, or other source of direct current having a center tap designated as (CN).

In the description of the present invention, a control cycle of operation is the term applied to a cycle of operation of the code communication system for the transmission of a control code from the control office to the field stations comprising "mark" and "space" code characters; while an indication cycle of operation is the term applied to a cycle of operation of the code communication system for the transmission of indication codes from the respective field stations to the control office comprising characters formed of "shunt" and "non-shunt" periods.

Each cycle of operation of the communication system is initiated from a period of rest of the code communication apparatus into a conditioning period. This conditioning period for either a control or an indication cycle is a condition of deenergization of the line circuit during the initiation of the code communication apparatus at the respective stations. Following the conditioning period, successive steps are taken, one code character being communicated during each step, until all steps have been taken. A clear-out period follows the stepping during which the code communication apparatus is restored to its normal condition to condition the system for another cycle of operation.

Figure 4A:
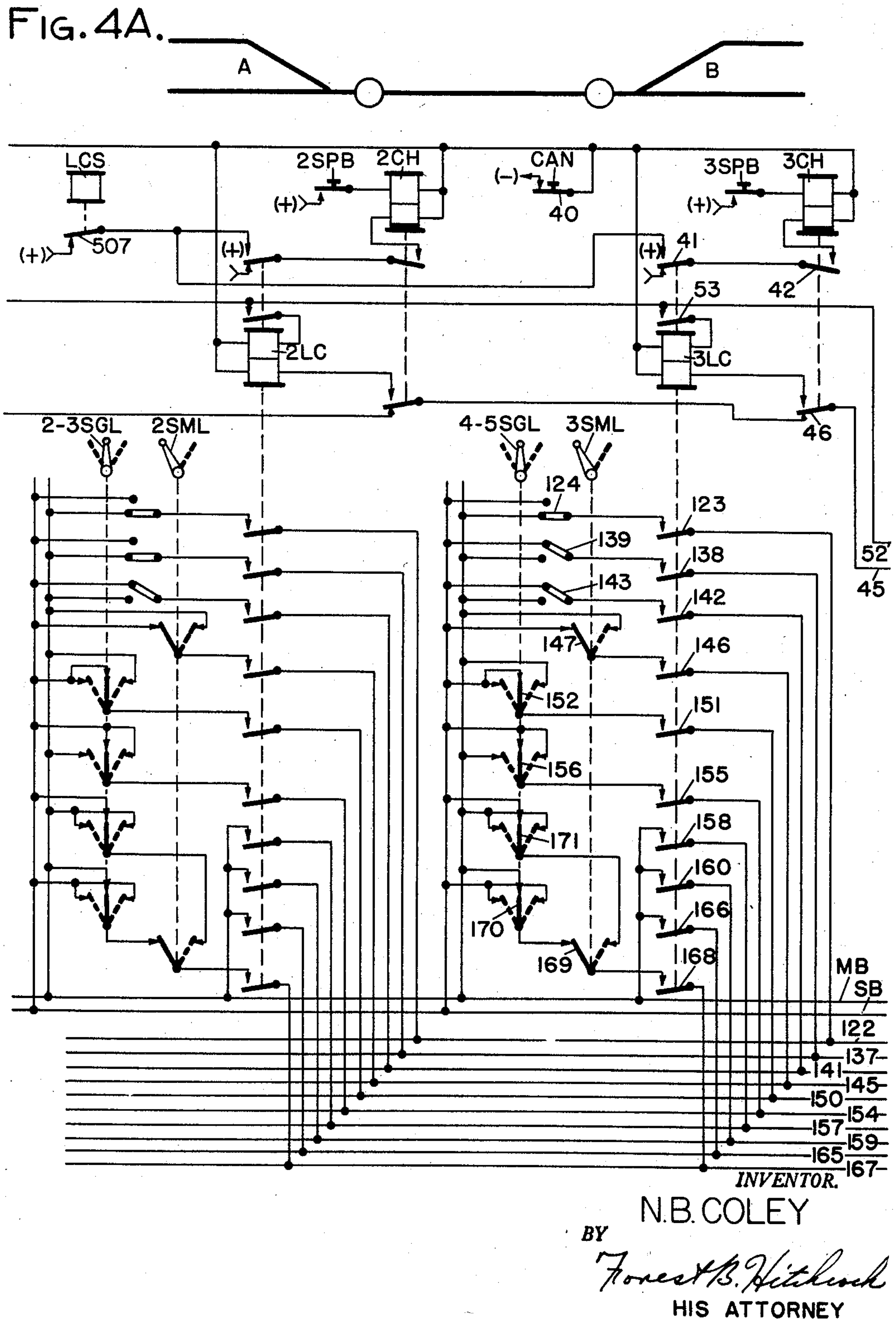

Although it is to be understood that the present invention is readily adaptable for the communication of switch and signal controls, or controls for other devices, from a control office to a plurality of remote field stations for a track layout having a relatively large number of track switches and signals or other devices to be controlled, for the purpose of simplification of this embodiment of the present invention, it has been considered sufficient for an understanding of the present invention that it be applied only for the control of a simple track layout a typical portion of which is illustrated by the diagram of Fig. 4A as having a main stretch of track with passing sidings A and B associated therewith at the opposite ends of a block in a stretch of single track.

Figure 5A:
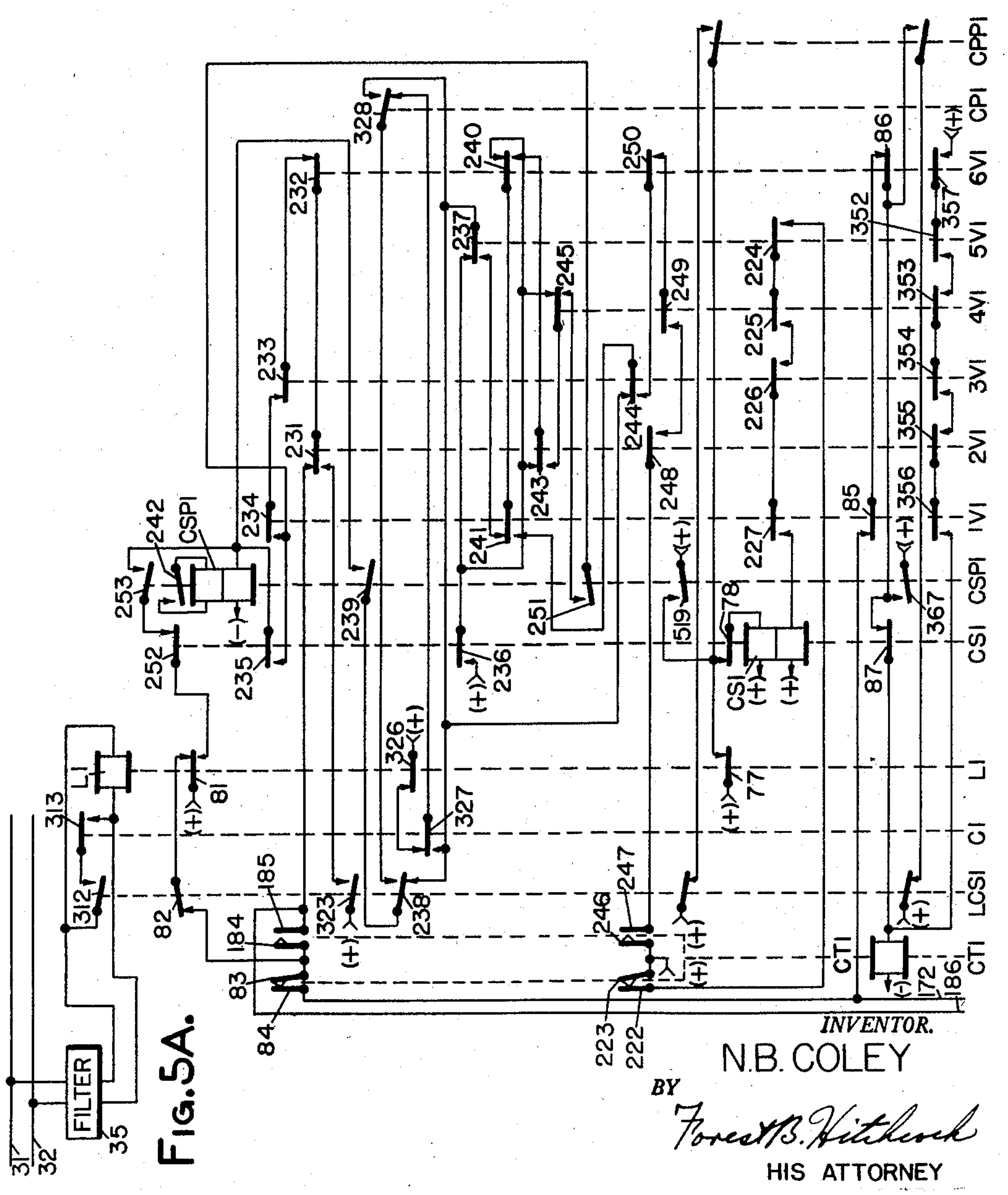
Figure 5B:
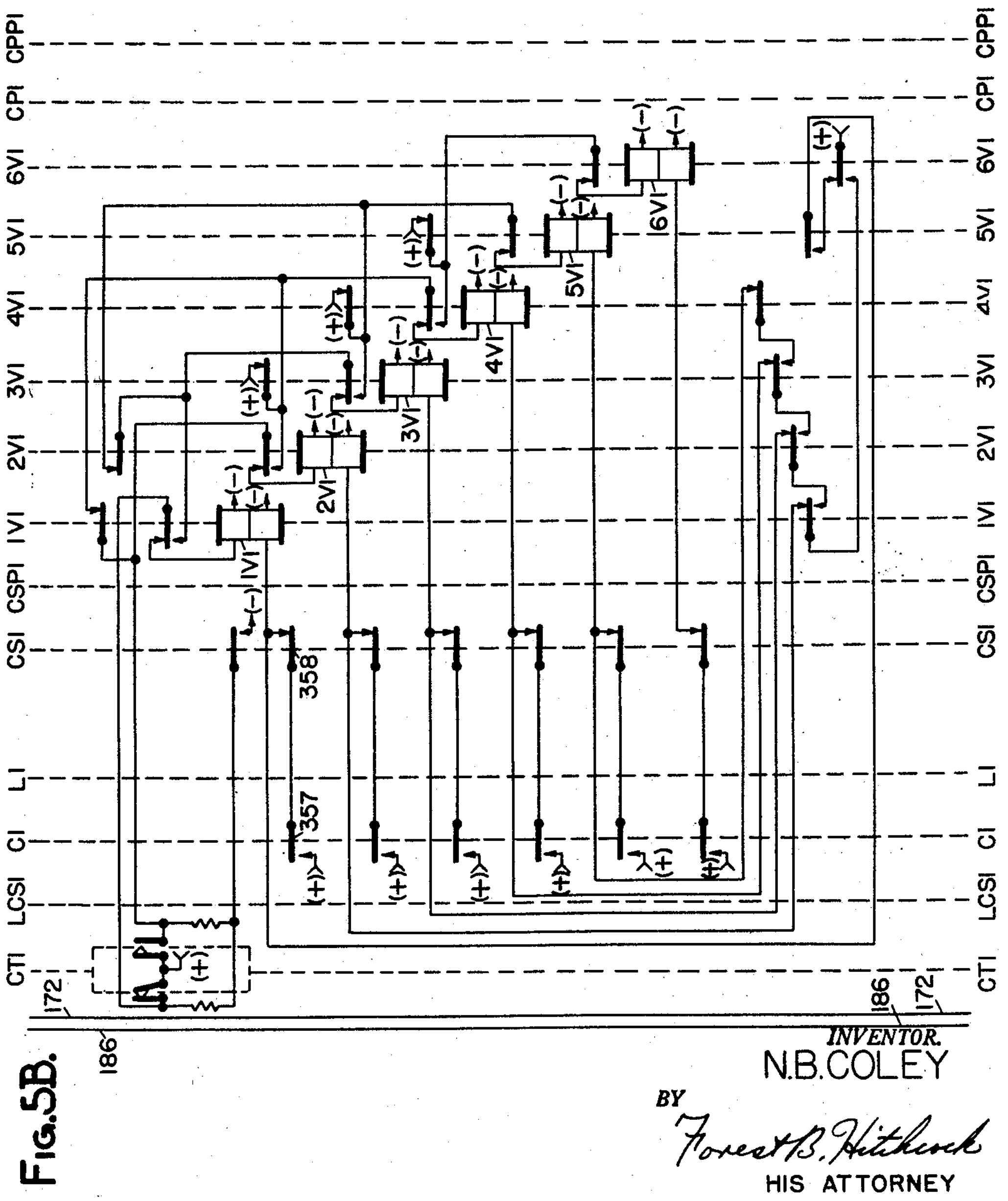
Figure 5C:
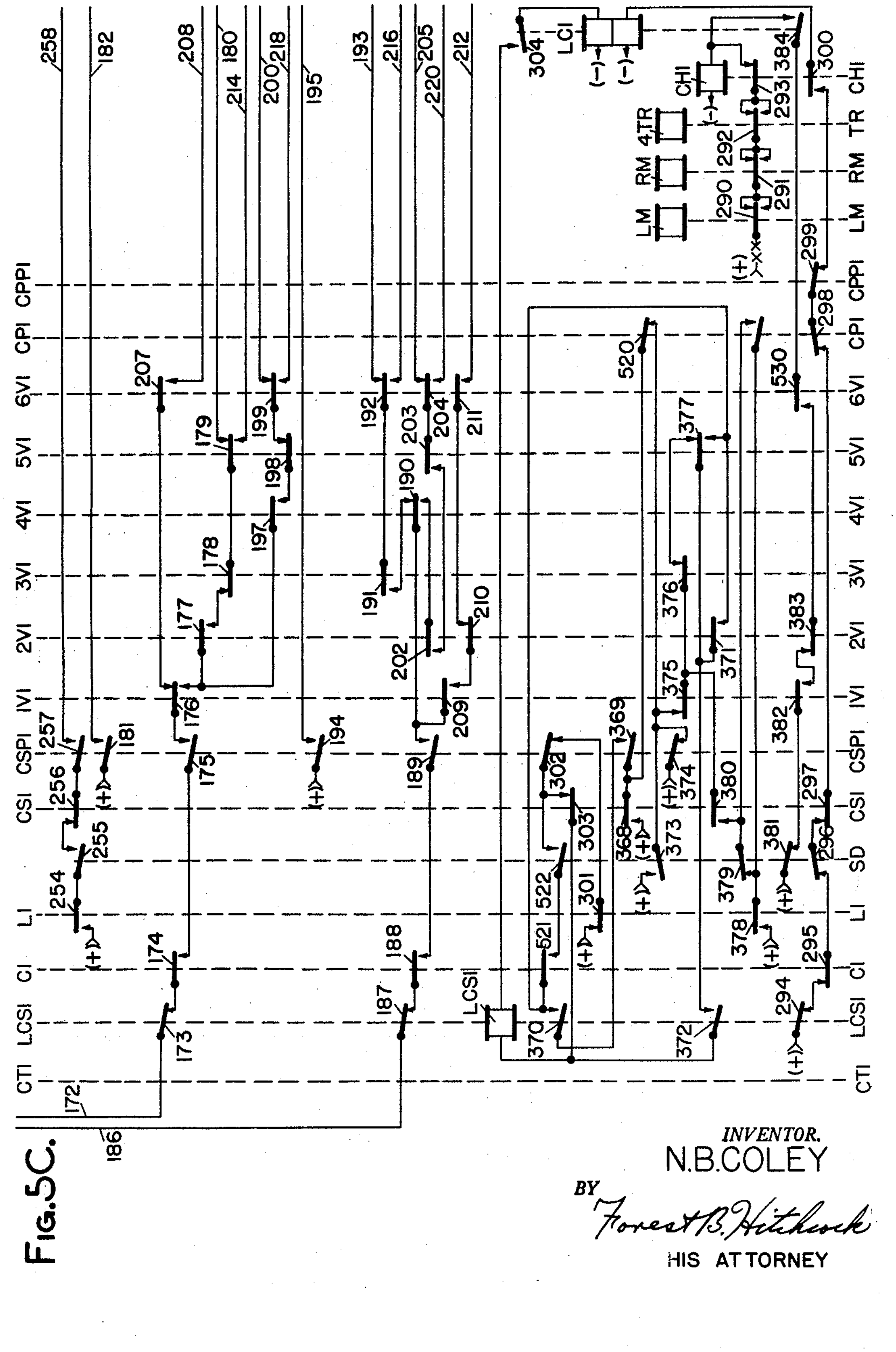
Figure 5D:
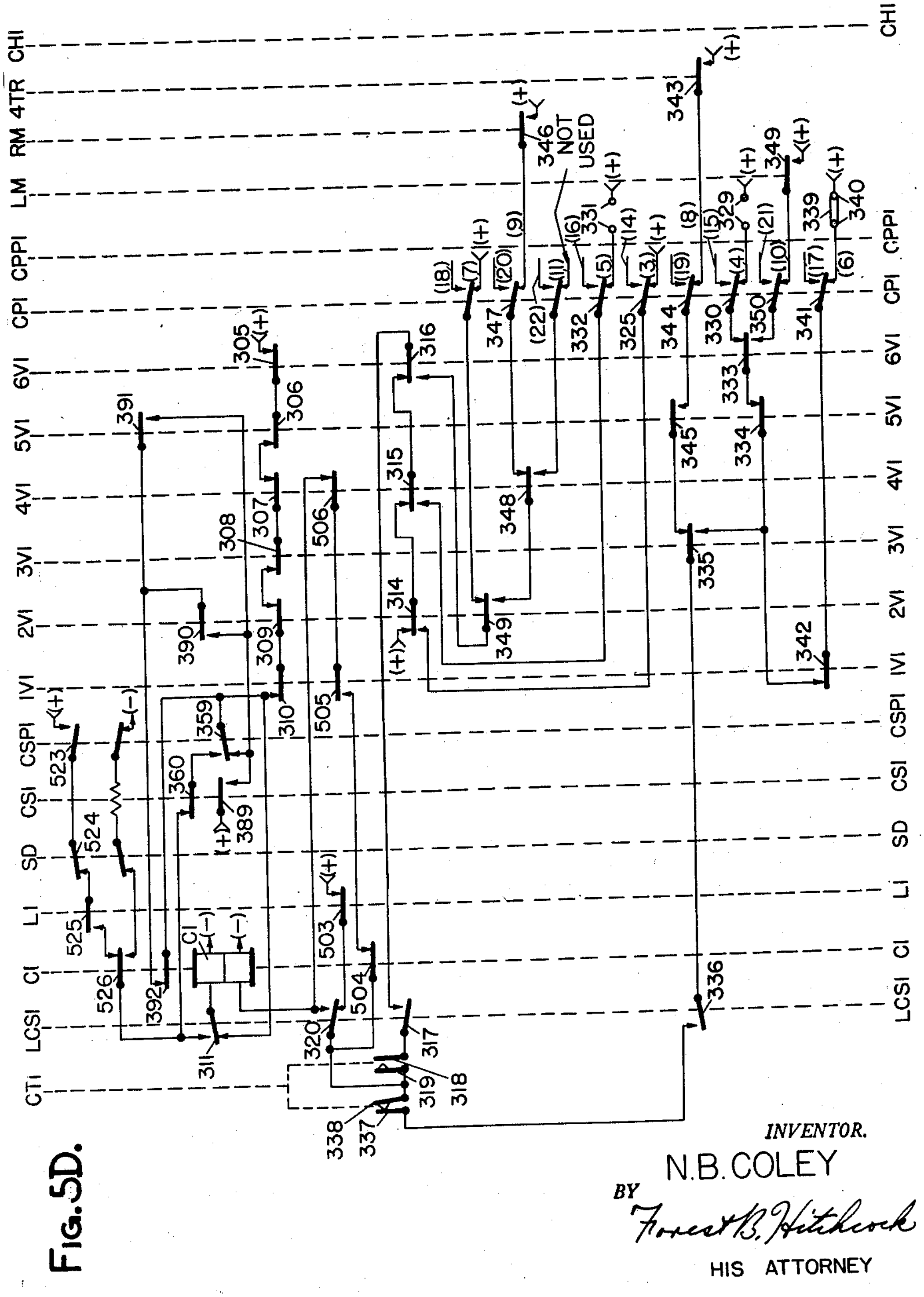
Figure 5E:
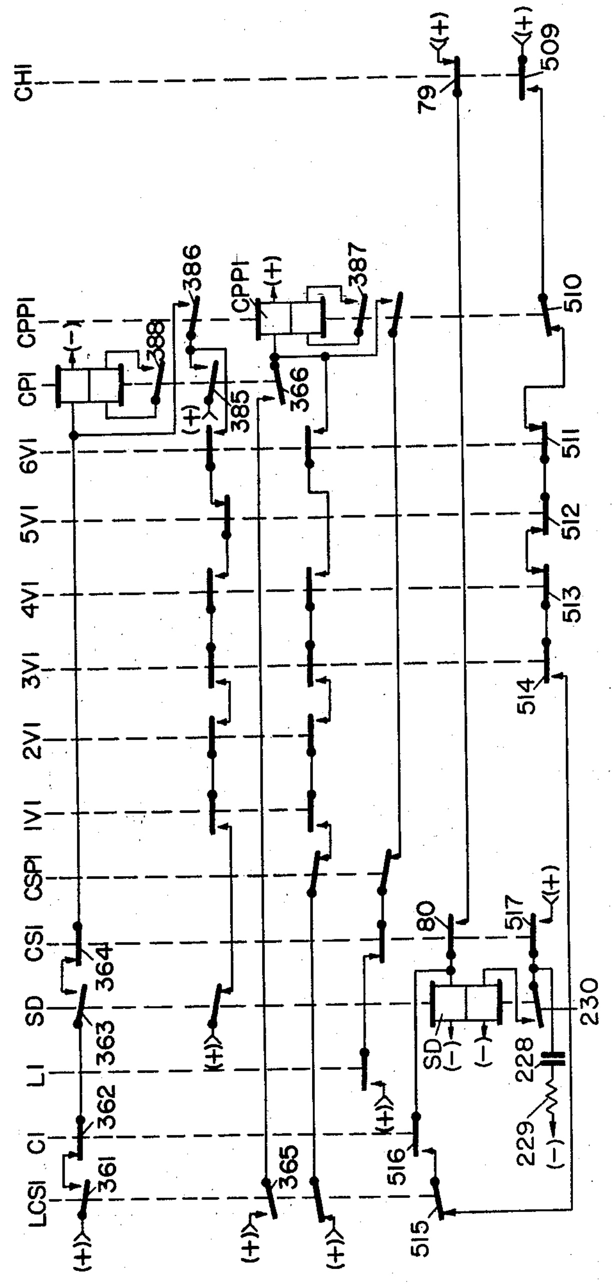
Figure 5F:
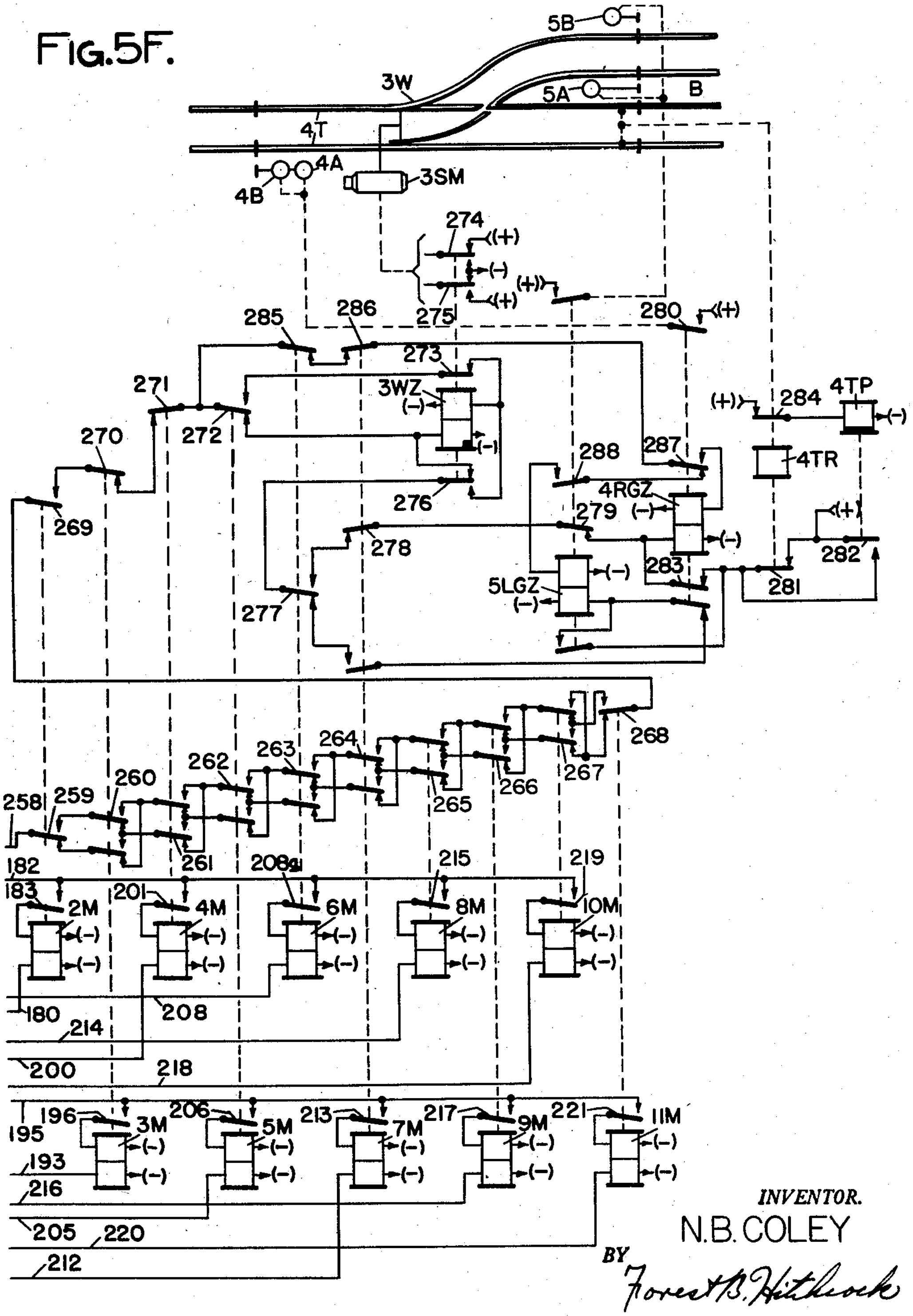

With reference to Fig. 5F, the connecting of one end of the siding B to the main track is illustrated as being provided by the track switch 3W which is shown as being operable by a conventional power switch machine 3SM. Traffic through the track switch 3W is assumed to be governed by signals 4A and 4B for governing eastbound traffic and signals 5A and 5B for governing westbound traffic. Although the signals illustrated are assumed to be of the searchlight type, it is to be understood that other types of signals such as semaphore, position light, and signals having individual color lamp units may as well be employed in accordance with the requirements of practice.

It is to be understood that the system includes a suitable centralized traffic control machine (not shown), such as is well known in the art, for use at the control office in governing traffic through the track layout for which the system is provided. This machine has a suitable control panel (not shown) having a track diagram constructed thereon with suitable indicator lamps being disposed along the trackway of the diagram as is typically illustrated at the top of Fig. 4A. The indicator lamps are used for indicating the conditions of occupancy of the respective track sections within the controlled territory, and other indicator lamps are provided on the control panel in accordance with the requirements of practice for indicating the positions of track switches, the locked conditions of the track switches, and the conditions of the signals governing traffic through the track layout for which the control machine is provided.

Also disposed on the control panel, either directly on the track diagram, or below the track diagram, in accordance with the requirements of practice, are suitable control levers or buttons for designation of the desired switch and signal controls for the respective track switches and signals of the track layout. Thus, for example, with reference to Fig. 4A, a switch control lever 3SML is provided for the control of the track switch 3W (see Fig. 5F), and a three position signal control lever 4–5SGL is provided for controlling the clearing of the signals governing traffic through the track switch 3W. The lever 3SML is a two-position lever, the left hand position as shown in Fig. 4A being used for governing the power operation of the track switch 3W (see Fig. 5F) to its normal position, and the right hand position of the lever 3SML being used for governing the power operation of the track switch 3W to its reverse position. The three-position signal control lever 4–5SGL has its center position used for putting the associated signals to stop, its left hand position for the clearing of a signal governing westbound traffic, and its right hand position being used for the clearing of a signal governing eastbound traffic. It is to be understood that these switch and signal control levers may be replaced by other types of manually operable switches, or by relays, or by buttons, or any other suitable means desired to be employed in practice for the designation of the controls that are to be transmitted for the control of the respective track switches and signals.

Figures 2, 3:
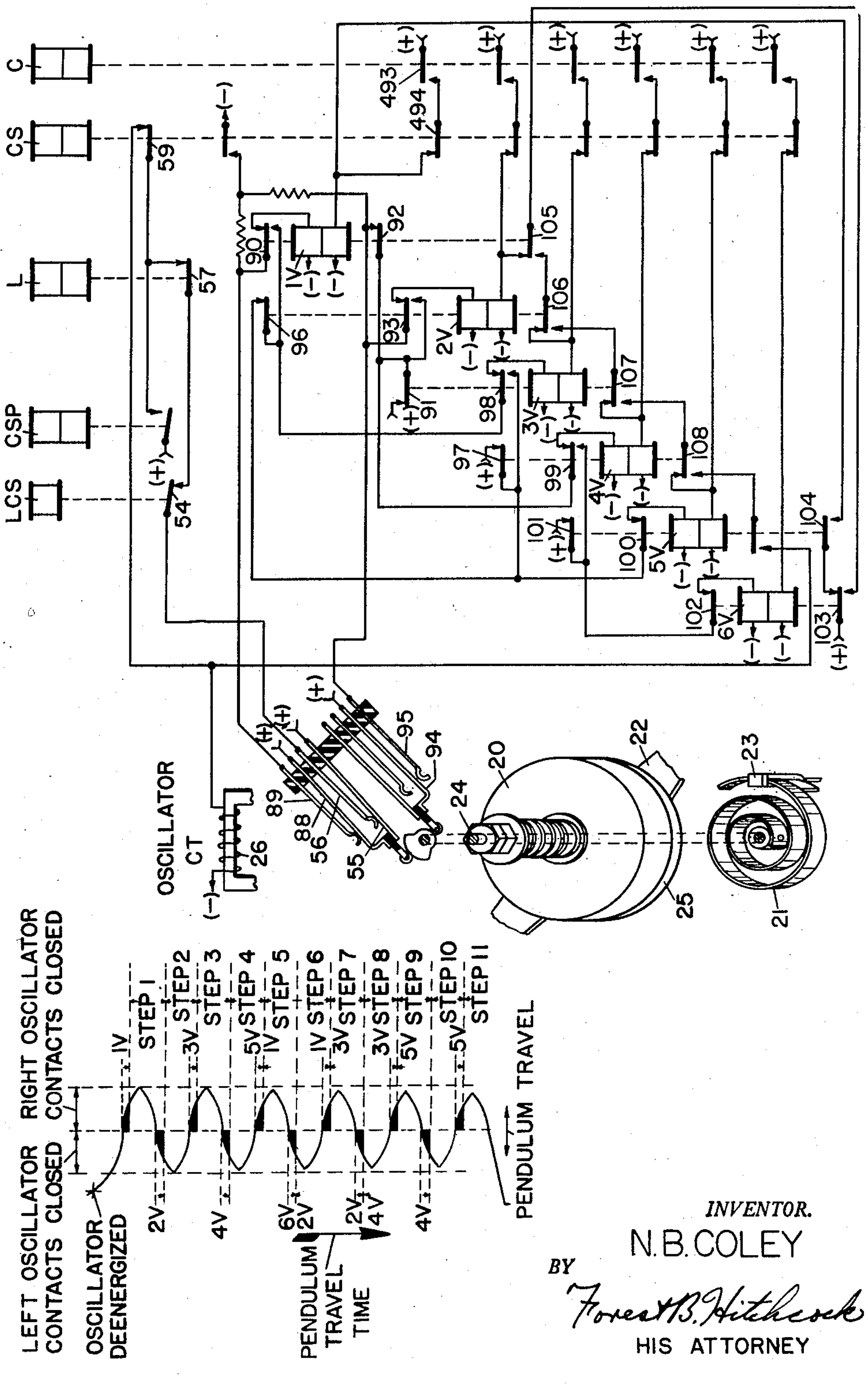
Fig. 2 is a pendulum travel diagram showing points in the travel of the pendulum of a typical timing device during a cycle of operation at which the respective stepping relays at the associated station are actuated.
Fig. 3 illustrates the manner in which a typical stepping relay bank can be operated in response to the free travel of the pendulum of an oscillatory timing device.

Although different types of timing devices may be used for governing the rate of operation of the stepping, the timing device employed in this embodiment of the present invention is illustrated in Fig. 3 as being of the torsional pendulum type such as is disclosed, for example, in my prior Patent No. 2,626,382, dated January 20, 1953. To use this type of an oscillator for a timing device, initial energization of the oscillator winds it up to a particular predetermined starting position from which it is released to permit a number of free oscillations of a torsional pendulum 20, the amplitude and periodicity of the oscillations being determined by the characteristics of a torsional involute spring such as the spring 21 of Fig. 3, for example, combined with the inertia of the torsional pendulum 20, to obtain the desired frequency of operation.

Each of the oscillators CT is provided with suitable stops (not shown) against which the armature 22 (see Fig. 3) is maintained when the system is at rest and the winding of the oscillators CT is steadily energized. Reference is to be made to my above mentioned prior patent for a more complete disclosure of the structure of the oscillatory timing devices CT.

Upon the deenergization of the oscillator CT at the beginning of a cycle of operation of the code communication system, six free swinging excursions of the oscillator are required during the cycle of operation for the complete operation of the stepper according to this embodiment of the present invention. There is no substantial decay in the amplitude of the excursions but each excursion is a little shorter in accordance with the friction, air resistance, etc., that is inherent in the timing device. Such reduction in amplitude is illustrated in the pendulum travel diagram of Fig. 2. This reduction in travel has no effect upon the rate of stepping because of the stepping taking place in response to the shifting of contact positions of contacts actuated by the oscillator only when the oscillator swings through its center position. By this arrangement, a highly accurate rate of stepping is set up based on the wellknown principle that a torsional pendulum has a constant period of oscillations for respective successive excursions of free oscillation, within certain limits of spring tension after the oscillator is unlocked from its normal position and permitted to swing free.

One of these oscillators CT is provided at the control office and at each field station for governing the operation of the stepping at the associated station, and each of these oscillators has two separate groups of contacts, conveniently called left and right groups because they are respectively closed when the oscillator is in a rotated position to the left or right of its center position which it assumed when allowed to come to rest after energy is removed from its winding. Thus, it will be seen that these two groups of contacts are alternately closed as free swinging of the oscillator progresses, the left group of contacts being closed normally when the oscillator CT is locked against its stops by energization of its winding. The active length of the torsional spring 21 can be adjusted by the adjusting lug 23, and the inertia of the pendulum 20 when the armature 22 strikes the stops (not shown) is absorbed by the pendulum 20 being friction coupled to the shaft 24 through the friction disc 25.

Although the oscillatory timing devices CT which are used in this embodiment of the present invention are well adapted for use in this connection, it is to be understood that other types of timing devices may be employed, provided that they may be effective to provide the accuracy in timing that may be required in practice. It will be readily apparent that the accuracy of the timing device for timing the respective steps is a determining factor with respect to the possible speed of code communication, and maximum speed of code transmission and reception can be accomplished only by the use of the most accurate timing device for timing the duration of the respective steps.

The field stations and the control office are connected by a single line circuit which will be hereinafter more specifically considered when considering the mode of operation of the system, and each station has a line relay L connected to the line circuit. Although different types of line relays can be used, a fast acting polar type of relay is generally considered preferable, such, for example, as is disclosed in the U.S. Patent of O. S. Field, No. 2,617,846, dated November 11, 1952.

All station, including the control office stations, have a group of relays CH, LC, LCS, CS and CSP, which are particularly involved in the intiation, or in providing special control features during a cycle of operation. A relay CH and a relay LC is provided at the control office for each field station, and is provided at each of the field stations for each indication station at the associated location. These relays are used in the storing of designated controls or indications for transmission, and in storing starts for successive cycles of operation. The relay LCS serves to prevent the interruption of a cycle of operation by the designation of controls for transmission at a time when the system is in use for the transmission of prior designated controls. The corresponding relay provides a similar function at each of the field stations with respect to the transmission of indications.

A transmitter relay C is provided at each of the field stations and at the control office as a code transmitter relay, the actuation of which is effective to pulse the line circuit in accordance with a particular code that is selected for transmission.

A bank of stepping relays V is provided at each station for counting the respective code characters communicated during a cycle of operation of the communication system. For the embodiment of the present invention illustrated, only six relays V are required for providing eleven steps.

Decoding relays M are provided at each of the field stations (see Fig. 5F) for the reception of control codes, these relays being provided for storing the reception of respective "mark" characters during a control cycle until the reception of a control code is complete, and until execution of the code can be rendered effective.

Similarly relays OM and EM are provided at the control office (see Fig. 4E) for energization when "nonshunt" characters are received as respective odd and even numbered characters of the different indication codes.

Relays CP and CPP are provided at the control office and at each field station for use particularly in governing the repeat of the complete operation of the stepping relay banks for indication cycles as compared to single operation for control cycles.

Various application relays WZ, LGZ, and RGZ (see Fig. 5F) are provided for governing the control of devices at the respective field stations in accordance with control codes communicated from the control office. Of these relays, the relay WZ is a magnetic stick relay used for the control of an associated power track switch, while the relays LGZ and RGZ are shown as neutral relays having stick windings which can be energized according to the usual practice for stick signal control purposes. Conventional track and track repeater relays TR and TP respectively are provided for governing the stick circuit control for the signal control relays LGZ and RGZ.

Registration relays R and a registration execution relay RX (see Fig. 4F) are provided at the control office for decoding indication station registration codes, and in accordance with their positions, station relays ST are selectively energized to select the respective groups of indication relays to be responsive to the indication codes that are received. Indication control relays RMK, LMK and TK are illustrated in Fig. 4F as being of the magnetic stick type and these relays govern associated indicator lamps RME, LME and TE which are suitably disposed on the control panel of the control machine (not shown).

Having thus considered the organization of the system in general, a consideration in detail as to the circuits involved for the control of the respective relays will be hereinafter given when considering the mode of operation of the system under typical operating conditions.

*Operation*

Before considering specifically the circuit organization and mode of operation during typical conditions, it is believed expedient to consider the mode of operation in general without specific reference to the circuits involved in such operation.

If it is desired to transmit controls to a particular field station to change the position of a track switch and/or a signal, the operator of the control machine first actuates the control levers SML and SGL as required for obtaining the controls desired and he then actuates a start button SPB for the associated station. In accordance with the actuation of this start button SPB, an associated change relay CH is picked up, and the picking up of this relay is effective to cause the picking up of the associated relay LC and the relay LCS. The picking up of the relay LCS initiates the oscillator CT at the control office and causes the dropping away of the normally energized relay C, which in turn shorts the line circuit so as to cause the dropping away of the line relay L at each of the field stations and thereby initiates the code oscillators at the respective field station.

With reference to the diagram of Fig. 2, it will be noted that when the pendulum of each of the oscillators CT first swings through its center position, the opening of the normally closed contacts of that oscillator CT is effective to deenergize the stepping relay 1V of the associated stepper so that the first step is taken, and similarly for each of the subsequent swings of the pendulum in the same direction through the center position, an odd numbered stepping relay V is dropped away. Upon the rotation of the pendulum 20 through center in the opposite direction to complete the first excursion of the pendulum 20, the second step is taken by the dropping away of relay 2V, and on subsequent similar operations of the oscillator pendulum 20 in the same direction through center, an even numbered step is taken by the dropping away of an even numbered stepping relay V.

It will be noted with reference to Fig. 2 that during the third excursion of the oscillator pendulum 20 from its initial position, the stepping relay 1V is picked up in response to the dropping away of relay 5V so that this relay can be used a second time for defining the beginning of a step. Similarly, the dropping away of relay 6V causes the picking up of relay 2V so that relay 2V can be used again to form an additional step. Similarly this mode of operation progresses until the first five relays are used over again to form additional steps. Thus the stepping relays are deenergized successively in numerical order to form the respective steps, the relays 1V, 2V, 3V, 4V and 5V being used over for the second time to form a complete complement of eleven steps when the following distinctive eleven conditions of the stepping relays are established:

| Step No. | Stepping Relay Positions |
|---|---|
| 1 | 1V down—6V up. |
| 2 | 2V down—6V up. |
| 3 | 3V down—6V up. |
| 4 | 4V down—6V up. |
| 5 | 5V down—6V up. |
| 6 | 6V down—1V up. |
| 7 | 1V down—6V down. |
| 8 | 2V down—6V down. |
| 9 | 3V down—6V down. |
| 10 | 4V down—6V down. |
| 11 | 5V down—6V down. |

It can thus be said that the respective steps are effectively coded in that they are made up of respective distinctive combinations of front and back stepper relay contacts in eleven different combinations, these combinations being so selected that eleven distinctive channels are formed for the communication of control and indication codes without requiring circuit selection outside of the bank of stepping relays to form the different channels.

At the control office, when a control cycle of operation is in progress, the transmitter relay C is selectively energized or deenergized through these channel circuits in accordance with the code characters selected for transmission by the switch and signal control lever positions in combination with the energization of a code determining relay LC for a particular field station. The energization of a relay C during any particular step determines that the corresponding code element transmitted over the line circuit is a "mark," and the deenergization of the relay C during any particular step provides that the character transmitted is a "space."

At each of the field locations, a line relay is normally energized such as the line relay L1 of Fig. 5A, and the deenergization of this relay in accordance with the start of transmission of a control cycle at the control office is effective to initiate the operation of the code oscillator CT1 at the associated field station. Thus the stepping becomes intiated at each field station, and it takes place in a manner comparable to that which has been described for the stepping at the control office. Although the field stations and the control office have their stepping initiated at substantially the same time, where line propagation time is considered, the steppers may be initiated somewhat out of step with each other for the various stations under conditions to be hereinafter considered.

At each of the field stations, a decoding relay M is picked up for each mark that is received during the particular step with which the relay M is associated, the picking up of this relay being rendered effective in response to the dropping away of the stepping relay for the associated step, provided that the line relay L1 is picked up at this time.

It will be noted with reference to Fig. 5F that there is no relay M provided for the first step because the first character transmitted during a control cycle is always a mark for lockout purposes under a condition of simultaneous starts between the control office and a field station. The lockout condition is satisfied in the control of the relay CSP1 (see Fig. 5A) particularly so as not to require a relay M for the reception of this first character. Each relay M when picked up is maintained energized by a suitable stick circuit until the end of the cycle and until execution has been made of the code that has been received.

It will be noted that relays M are provided for all of the control code steps and for the station selection steps and, therefore, each of the field stations operates through to completion during a control cycle, irrespective of which station is being called. In other words, station selection is not accomplished until the execution of the code, at which time the execution is effective for only the station corresponding to the station call code, and all other stations do not have their controls executed.

The general mode of operation of the communication of indications is similar to that which has been described for the transmission of controls, except that the initiation of the respective indication cycles is automatic by the dropping away of a relay such as relay CH1 of Fig. 5C. This initiation can, of course, take place at any field station, or at several field stations simultaneously, at which time the line circuit is shunted so as to cause the starting of an indication cycle. The shunting of the line circuit is effective to cause a start of the oscillators at all more distant stations because of the line relays for these stations being shunted out, and the line relay at the control office is actuated through an impulse transformer to start the operation of the control office oscillator. The control office, upon detecting a field start removes energy from the line circuit so as to insure the initiation of a cycle at each of the intermediate stations between the field station causing the start and the control office.

An indication cycle of operation progresses in much the same manner as that which has been described for operation during a control cycle in that all field stations and the control office station operate through to completion. The communication of codes during an indication cycle, however, is by selectively shunting the line circuit by the station or stations doing the transmitting.

Upon the reception at the control office during an indication cycle, the relays OM and EM (see Fig. 4E) are selectively energized in accordance with the line circuit being unshunted during the respective odd and even numbered steps. It will be noted that this pair of relays can serve for reception during all steps as compared to separate mark relays M being required for the respective channels for the reception of controls at a field station during a control cycle.

Having thus considered in a general manner the mode of operation of the system for the communication of controls and indications, consideration will now be given as to the specific organizations involved in providing the general mode of operation that has been described.

*Normal-at-rest conditions.*—When the system is at rest, the line circuit is maintained energized to allow any field station to register at the control office the start of an indication cycle by the application of a shunt across the line wires at the field station desiring to initiate an indication cycle.

The line circuit can be an independent line circuit solely for centralized traffic control purposes, or the line circuit can be superimposed upon a closed line which may be used for other purposes such as telephone communication as is shown in Figs. 1A and 1B, and Figs. 4B and 5A. This circuit provides for the connection of telephone apparatus to the opposite ends of a single closed line by suitable coupling transformers 30, and the code communication apparatus is connected at the control office and at the respective field stations to the line wires 31 and 32 through low-pass filters to effectively isolate the code communication apparatus from the higher frequency alternating currents which may be applied in telephone communication over the line wires 31 and 32. Energy is applied at the control office, when the system is at rest, from the positive terminal of the line battery LB to the line wire 32 through a suitable limiting resistor 33, front contact 34 of relay CS, and elements of a suitable low-pass filter 35. The negative terminal of the line battery LB is connected to line wire 31 through the primary winding of impulse transformer 36, back contact 37 of relay EM, front contact 38 of relay C, and through elements of low-pass filter 35.

Figure 1A:
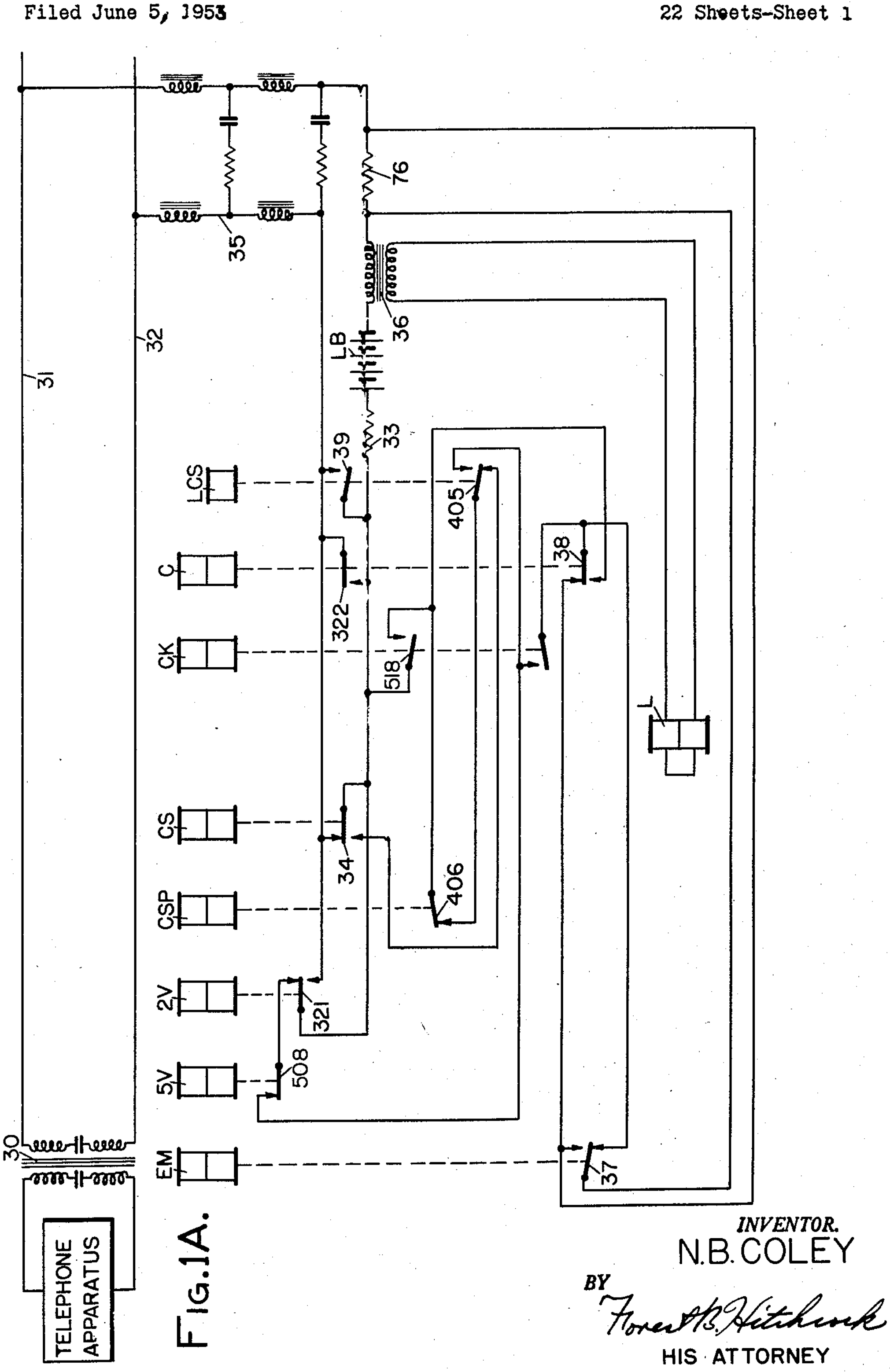
Figure 1B:
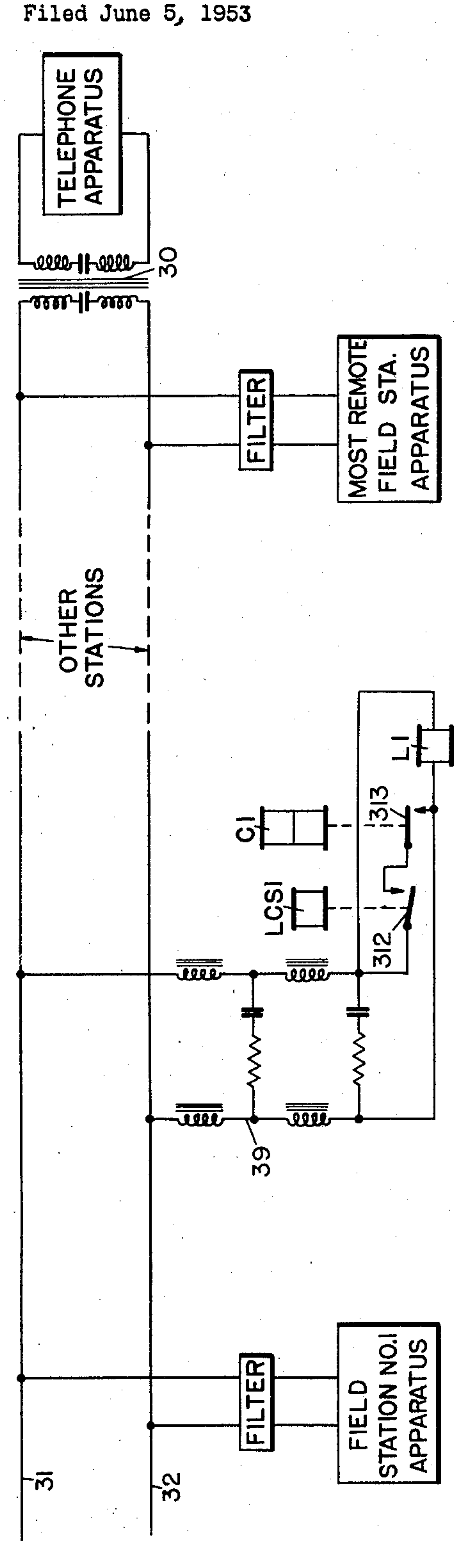

In accordance with the energization of the line wires 31 and 32, a line relay L at each of the field stations is normally energized, such as the relay L1 which is shown for a typical field station in Fig. 1B as being connected across the line wires 31 and 32 through a suitable low-pass filter 39.

*Initiation of control cycle.*—When the operator of the control machine desires new switch and signal controls for transmission to any particular field station, he actuates the respective switch and signal control levers SML and SGL (see Fig. 4A) to positions to correspond with the desired controls to be transmitted, and then actuates the start button SPB for the corresponding field station.

To consider initiation under a typical specific condition, it will be assumed that it is desired to transmit controls selected by the levers 3SML and 4–5SGL to their associated field stations and after having positioned these levers, the start button 3SPB is actuated. The actuation of this button causes the picking up of relay 3CH by the energization of its upper winding through normally closed contact 40 of cancel button CAN. The picking up of this relay closes a stick circuit for its lower winding extending through back contact 41 of relay 3LC, front contact 42 of relay 3CH, and contact 40 of the cancel button CAN. Relay 3CH also has another stick circuit that is used if relay 3LC is picked up during an indication cycle. This stick circuit extends through back contact 507 of relay LCS, front contact 41 of relay 3LC, front contact 42 of relay 3CH, and contact 40 of the cancel button CAN.

Upon the picking up of relay 3CH, if it is assumed that the system has been at rest, the relay 3LC is picked up by the energization of a circuit extending from (+), including back contact 43 of relay CSP (see Fig. 4D), back contact 44 of relay LCS, wire 45, front contact 46 of relay 3CH, lower winding of relay 3LC, and contact 40 of the cancel button CAN, to (−). Relay 3LC when picked up is maintained energized by a stick circuit which also provides for the picking up of the relay LCS (see Fig. 4D). This stick circuit extends from (+), including back contact 47 of relay CPP, back contact 48 of relay CP, back contact 49 of relay CSP, front contact 50 of relay CS, front contact 51 of relay L, winding of relay LCS, wire 52, front contact 53 of relay 3LC, upper winding of relay 3LC, and contact 40 of the cancel button CAN, to (−).

The picking up of relay LCS starts the stepping at the control office by the deenergization of the oscillator CT (see Fig. 4D) at back contact 54. The circuit by which the oscillator CT is energized during a period of rest extends from (+), including contact fingers 55 and 56 of the oscillator CT, back contact 54 of relay LCS, front contact 57 of relay L, front contacts 58 and 59 of relay CS and winding of oscillator CT, to (−).

The picking up of relay LCS causes the dropping away of the transmitter relay C at the control office (see Fig. 4D) by the opening of its circuit at back contact 60. Relay C is energized while the system is at rest by a circuit extending from (+), including front contacts 61, 62, 63, 64, 65, and 66 of relays 6V, 5V, 4V, 3V, 2V, and 1V respectively, back contact 60 of relay LCS, and lower winding of relay C, to (−). It will be noted that contacts 64, 65, and 66 are effectively shunted out of the circuit just described by the stick contact 67 for reasons to be more readily apparent as the description of the invention progresses.

The check relay CK is picked up by the picking up of relay LCS. The pick up circuit for relay CK extends from (+), including contact fingers 55 and 56 of oscillator CT, front contact 54 of relay LCS, front contact 68 of relay 1V, front contact 69 of relay 5V, and lower winding of relay CK, to (−).

Upon the picking up of relay CK, a circuit by which the relay CS has been normally energized is opened at back contact 70. The circuit by which relay CS is energized when the system is at rest extends from (+), including back contact 70 of relay CK, front contact 71 of relay L, front contact 72 of relay CS, and lower winding of relay CS, to (−).

Upon the dropping away of relay CS, the relay CSP (see Fig. 4B) is picked up. The circuit for the energization of relay CSP extends from (+), including back contact 73 of relay CS, front contact 74 of relay CK, front contact 75 of relay 5V, and lower winding of relay CSP, to (−).

Upon the dropping away of relay C at the control office, the shunt around the resistor 76 (see line circuit of Fig. 1A or Fig. 4B) is opened at front contact 38 of relay C, and thus, because of the resistor 76 being of relatively high value, the line circuit becomes effectively deenergized so as to cause the dropping away of the line relay at each field station. Thus, at the typical field station having its circuits shown in detail, the relay L1 is dropped away (see Fig. 5A) and the dropping away of this relay deenergizes relay CS1 by opening its stick circuit at front contact 77. The stick circuit by which the relay CS1 is held up when the system is at rest includes front contact 77 of relay L1, and front contact 78 of relay CS1.

Upon the dropping away of relay C at the control office, the line circuit is shunted by a circuit including the drainage resistor 76, back contact 37 of relay EM, back contact 38 of relay C, back contact 406 of relay CSP, front contact 405 of relay LCS, front contact 508 of relay 5V, front contact 321 of relay 2V, and back contact 322 of relay C. It will be noted that this is also a shunt on the line battery LB through the limiting resistor 33. With the line circuit shunted, the line relay L1 at each field station becomes dropped away (see Fig. 5A) and the dropping away of this relay deenergizes relay CS1 by opening its stick circuit at front contact 77. The stick circuit by which the relay CS1 is held up when the system is at rest includes front contact 77 of relay L1 and front contact 78 of relay CS1.

Upon the dropping away of relay CS1 at the field station for which the circuits are shown in detail, the cycle distribution relay SD is picked up. Relay SD is energized by a circuit extending from (+), including front contact 79 of relay CH1, back contact 80 of relay CS1, and upper winding of relay SD, to (−).

Another pick-up circuit for relay SD extends from (+), including back contact 509 of relay CH1, back contact 510 of relay CPP1, front contact 511 of relay 6V1, front contact 512 of relay 5V1, front contact 513 of relay 4V1, back contact 514 of relay 3V1, back contact 515 of relay LCS1, back contact 516 of relay C1, and upper winding of relay SD, to (−). This pick-up circuit is used to pick up relay SD at a field station that has had a simultaneous start with the start of a control cycle at the control office so that the control office has control of the system to transmit successive control cycles, it being required that each field station wait until the cycle distribution relay SD at the associated station is dropped away at the end of a cycle, before an indication cycle can be initiated. Relay SD is maintained picked up by a stick circuit for its lower winding including back contact 517 of relay CS1, and front contact 230 of relay SD.

The oscillators at the respective field stations are started upon the dropping away of the line relays at the associated stations, and thus the dropping away of the line relay L1 shown in Fig. 5A deenergizes the oscillator CT1 at the associated station. The circuit by which the oscillator CT1 is energized when the system is at rest extends from (+), including front contact 81 of relay L1, back contact 82 of relay LCS1, contact fingers 83 and 84 of oscillator CT1, front contact 85 of relay 1V1, front contact 86 of relay 6V1, front contact 87 of relay CS1, and winding of oscillator CT1, to (−). By the same general mode of operation, corresponding oscillatory timing devices at the other field stations are rendered active in response to the control office start of a control cycle.

*Stepping.*—The circuit organizations for the stepping relay banks at the control office and field stations are similar, and thus a consideration in detail of the stepping at the control office should be sufficient for an understanding of the organization and mode of operation of the stepper at each of the field stations. To consider stepping at the control office, it will be assumed that initiation is made for a control cycle as has been described and that the oscillator CT at the control office has been deenergized. When the pendulum 20 of the oscillator CT first rotates through its center position, the contact fingers 88 and 89 (see Fig. 4C) are opened, and the opening of these contact fingers causes the dropping away of relay 1V. The circuit by which the relay 1V is normally maintained energized during a period of rest extends from (+), including contact fingers 88 and 89 of oscillator CT, front contact 90 of relay 1V1 and upper winding of relay 1V1, to (−). Relay 1V1 in dropping away marks the beginning of the first step, and the dropping away of this relay conditions the relay 2V so that it can be dropped away when the pendulum 20 passes through center on the return swing during the first excursion of the pendulum 20. The circuit by which the relay 2V is normally energized extends from (+), including front contact 91 of relay 3V, front contact 92 of relay 1V, front contact 93 of relay 2V, and upper winding of relay 2V, to (−). At the time when the relay 1V is dropped away, the rotation of the pendulum 20 of the oscillator CT has closed the contact fingers 94 and 95, and thus the relay 2V is maintained energized until it is time for the second step to be taken by a circuit extending from (+), through contact fingers 94 and 95 of oscillator CT, front contact 93 of relay 2V, and upper winding of relay 2V, to (−).

Upon the return swing of the pendulum 20 of the oscillator CT through center for the last half of its first excursion, the contact fingers 94 and 95 are opened, and thus the relay 2V is dropped away for the second step in the operation of the stepping relay bank. Upon the dropping away of relay 2V, a stick circuit by which relay 3V is normally energized becomes opened at front contact 96. This stick circuit extends from (+), including front contact 97 of relay 4V, front contact 96 of relay 2V, front contact 98 of relay 3V, and upper winding of relay 3V, to (−). Prior to the opening of this stick circuit, however, the contact fingers 88 and 89 of the oscillator CT are closed and relay 3V is held by a stick circuit extending from (+), including contact fingers 88 and 89 of oscillator CT, back contact 90 of relay 1V, front contact 98 of relay 3V, and upper winding of relay 3V, to (−).

Relay 3V is dropped away for the third step when its stick circuit is opened by the opening of contact fingers 88 and 89 of the oscillator CT when the oscillator pendulum 20 swings through its center position during the first half of the second free excursion of the oscillator pendulum 20. Upon the dropping away of relay 3V, a stick circuit that is normally energized for the relay 4V is opened. This stick circuit extends from (+), including front contact 91 of relay 3V, front contact 99 of relay 4V, and upper winding of relay 4V, to (−). Just prior to the opening of this stick circuit, however, the oscillator contacts 94 and 95 have been closed so that the relay 4V is maintained energized until it is time for the fourth step by a circuit extending from (+), including contact fingers 94 and 95 of oscillator CT, back contact 93 of relay 2V, front contact 99 of relay 4V, and upper winding of relay 4V, to (−).

When the oscillator pendulum 20 passes through center during the last half of the second excursion of the oscillator pendulum 20 the opening of contact fingers 94 and 95 cause the dropping away of relay 4V for the fourth step. Relay 4V when dropped away opens a circuit which is normally energized for the relay 5V extending from (+), including front contact 97 of relay 4V, front contact 100 of relay 5V, and upper winding of relay 5V, to (−). Just prior to the opening of this circuit, however, the contact fingers 88 and 89 of oscillator CT have been closed and thus the upper winding of relay 5V is energized at this time by a circuit extending from (+), including contact fingers 88 and 89 of oscillator CT, back contact 90 of relay 1V, back contact 98 of relay 3V, front contact 100 of relay 5V, and upper winding of relay 5V, to (−).

Upon the opening of the oscillator contact fingers 88 and 89 during the first half of the third excursion of the oscillator pendulum 20, the relay 5V becomes dropped away for the fifth step. The dropping away of relay 5V opens a circuit that is normally energized for the relay 6V including front contact 101 of relay 5V and front contact 102 of relay 6V. Just prior to the opening of this circuit, however, the contact fingers 94 and 95 of the oscillator CT have become closed and thus the relay 6V is maintained energized by a circuit extending from (+), including contact fingers 94 and 95 of oscillator CT, back contact 93 of relay 2V, back contact 99 of relay 4V, front contact 102 of relay 6V, and upper winding of relay 6V, to (−). Relay 5V upon dropping away for the fifth step closes a pick up circuit for relay 1V to condition that relay for a second stepping operation. The pick up circuit for the relay 1V under these conditions includes front contact 103 of relay 6V, and back contact 104 of relay 5V.

Upon the opening of the contact fingers 94 and 95 of the oscillator CT when the pendulum 20 of the oscillator CT rotates through center during the second half of the third excursion of the pendulum, the stick circuit just described for the relay 6V is opened and this relay becomes dropped away for the sixth step. It will be noted that the dropping away of relay 6V opens the circuit just described for the relay 1V at front contact 103, but the relay 1V is maintained energized by a stick circuit that has been described for its upper winding extending through contact fingers 88 and 89 of oscillator CT. Thus the relay 1V is conditioned so that it can be dropped away for the seventh step by a mode of operation similar to that which has been described for the dropping away of this relay during the first step. Relay 6V when dropped away closes a pick up circuit for the relay 2V so as to condition that relay so that it can be used for a second time during the cycle. The relay 2V is picked up at this time by the energization of a circuit extending from (+), including back contact 103 of relay 6V, front contact 105 of relay 1V, and lower winding of relay 2V, to (−).

The seventh step is taken by the dropping away of relay 1V for a second time when the pendulum of the oscillator rotates through center during the first half of the fourth excursion of the oscillator so as to open the contact fingers 88 and 89 in the stick circuit of relay 1V. It will be noted that although the dropping away of relay 1V opens the pick up circuit that has been described for relay 2V at front contact 105, the relay 2V is held at this time through a stick circuit that has been described, including contact fingers 94 and 95 of oscillator CT. The dropping away of relay 1V causes the picking up of relay 3V so that it can be used for a second time in the stepping. The pick up circuit for relay 3V includes contact 103 of relay 6V, back contact 105 of relay 1V, and front contact 106 of relay 2V.

The eighth step is formed by the dropping away of relay 2V when the contact fingers 94 and 95 of the oscillator CT are opened during the last half of the fourth excursion of the oscillator pendulum 20. The dropping away of relay 2V at this time opens the pick up circuit just described for relay 3V at front contact 106, but the relay 3V is maintained energized by a stick circuit that has been described dependent upon the contact fingers 88 and 89 of the oscillator CT being closed. Upon the dropping away of relay 2V for the eighth step, relay 4V is picked up by the energization of a circuit extending from (+), including back contact 103 of relay 6V, back contact 105 of relay 1V, back contact 106 of relay 2V, front contact 107 of relay 3V, and lower winding of relay 4V, to (−).

The ninth step is taken when the oscillator pendulum 20 rotates through center during the first half of the fifth excursion of the oscillator pendulum 20 during the cycle in accordance with the opening of the contact fingers 88 and 89. Relay 3V when dropped away opens the circuit that has been described for the energization of relay 4V at front contact 107, but the relay 4V is maintained energized at this time by a stick circuit that has been described including the contact fingers 94 and 95 of oscillator CT. Relay 3V when dropped away closes a pickup circuit for relay 5V extending from (+), including back contact 103 of relay 6V, back contacts 105, 106 and 107 of relays 1V, 2V and 3V respectively, front contact 108 of relay 4V, and lower winding of relay 5V, to (−).

When the oscillator CT opens the contact fingers 94 and 95 during the last half of the fifth excursion of the oscillator pendulum 20, relay 4V is dropped away to mark the tenth step, and the dropping away of this relay opens the circuit that has been described by the picking up of relay 5V at front contact 108. Relay 5V is maintained picked up, however, by a stick circuit that has been described including contact fingers 88 and 89 of oscillator CT which are closed at this time.

The eleventh step is taken when the oscillator pendulum 20 rotates through its center position during the first half of the sixth excursion of the oscillator during the cycle of operation in accordance with the opening of contact fingers 88 and 89 of oscillator CT in the stick circuit for relay 5V. Thus the relay 5V when dropped away at this time forms the last step, and the stepping is terminated with all stepper relays being in their dropped away positions.

*Control code transmission.*—The selection of code characters used for transmission of switch and signal control codes from the control office is in accordance with whichever one of the relays LC (see Fig. 4A) is picked up. This is because each of the characters transmitted except for the transmission of a mark during the first step, is determined by a circuit through a front contact of a relay LC, only one relay LC being picked up at a time in accordance with the chain circuit organization for the picking up of the relays LC. Thus the relay 3LC, for example, when picked up provides connections for the respective channels which determine as to whether the respective characters transmitted during a control cycle are marks or spaces in accordance with a predetermined code. If energy is applied through these contacts to a mark bus MB, the character transmitted is a mark, and if the character selected for transmission is a space, energy is applied to the space bus SB rather than the mark bus MB.

The first group of characters of a control code transmitted is used for station selection according to the present embodiment, and the last group of characters is used for identifying the position for the device or devices to be controlled upon reception of the code.

The character during the first step is always a mark because of the unshunting of the line circuit through resistor 76 (see Fig. 4B) by the opening of back contact 37 of relay EM. The relay EM is picked up to remove the shunt from the line circuit when the pendulum of the oscillator CT rotates through center for the first time during a control cycle. At this time, relay EM (see Fig. 4E) is picked up upon the closure of a circuit extending from (+), including contact fingers 109 and 110 of oscillator CT, front contact 111 of relay LCS, front contact 112 of relay 6V, front contact 113 of relay 2V, back contact 114 of relay CS, lower winding of relay EM, front contact 115 of relay 3V, front contact 116 of relay LCS, and front contact 117 of relay 6V, to (−). The mark that is thus transmitted during the first step is terminated when the relay EM is dropped away because of the opening of the contact fingers 109 and 110 of oscillator CT during the second half of the first excursion of the oscillator pendulum. The dropping away of relay EM recloses a shunt on the line circuit that has been described by the closure of back contact 37 (see Fig. 1A). This shunt is maintained for only a short time, as is indicated by the sequence chart of Fig. 6A, it being terminated by the dropping away of relay 2V which opens the shunt at front contact 321.

Inasmuch as the station call code for the field station with which the relay 3LC (see Fig. 4A) is associated is "mark-space-space," it is determined that the second character transmitted is a mark and the third and fourth characters transmitted are both spaces.

Upon the closure of the contact fingers 55 and 56 of the oscillator CT (see Fig. 4D) during the second half of the first excursion of the oscillator pendulum 20, relay C is picked up to transmit a mark by the energization of a circuit extending from (+), including contact fingers 55 and 56 of oscillator CT, front contact 118 of relay LCS, front contact 119 of relay 5V, back contact 120 of relay 1V, front contact 121 of relay 3V, wire 122, front contact 123 of relay 3LC (see Fig. 4A), code jumper 124, mark bus MB, and upper winding of relay C, to (−). Relay C when thus picked up causes transmission of a mark by unshunting the line circuit by the closure of back contact 38. If the next character is a space as is the case under consideration, the relay C becomes dropped away upon the opening of the contact fingers 55 and 56 of oscillator CT (see Fig. 4D) when the oscillator pendulum rotates through center during the first half of the second excursion of the oscillator pendulum 20.

When it is desired to transmit a space, as is assumed for the third and fourth steps, the relay C remains dropped away and thus the line circuit is shunted through resistor 76, back contact 37 of relay EM, back contact 38 of relay C, front contact 518 of relay CK and front contact 39 of relay LCS. To check the integrity of the code communication apparatus to insure that it has been predetermined that a space is to be transmitted (as compared to the failure of the relay C to be picked up when it should be for the transmission of a mark character) the check relay CK is maintained energized by stick circuits closed through the respective channels during transmission of space characters to insure that no faulty transmission takes place. The mode of operation of relay CK is that it is picked up at the beginning of a cycle of operation for the transmission of controls, and it is maintained picked up for the transmission of marks by stick circuit means energized in accordance with the relay C being picked up, and it is maintained picked up during the transmission of space characters by other stick circuits. Should this relay CK become dropped away at any time during the cycle, it thereby detects faulty transmission of the code, and in accordance with this relay being in its dropped away position during the execution of the code received at the field station it is determined as will be hereinafter considered that the line relays at the field stations cannot be dropped away at the time of execution of the code received, and thus the execution of the code at any field station is prevented.

The pick up circuit for relay CK has been described when considering the initiation of the system into a cycle of operation. Relay CK is maintained picked up during the first step when relay EM is picked up by the energization of a stick circuit extending from (+), including back contact 125 of relay 1V, front contact 126 of relay EM, front contact 127 of relay CK, front contact 128 of relay CSP, and lower winding of relay CK, to (−). It will be noted that there is a momentary deenergization of relay CK during the dropping away time of relay 1V, but the relay CK is maintained picked up during this momentary interruption in its energization by the shunting of its upper winding through front contact 129.

During the transmission of the mark in the second step, relay CK is maintained picked up by a stick circuit extending from (+), including back contact 125 of relay 1V, front contact 130 of relay C, front contact 127 of relay CK, front contact 128 of relay CSP, and lower winding of relay CK, to (−).

During the third step, when a space is transmitted, relay CK obtains stick energy from the space bus SB in accordance with the energization of a circuit extending from (+), including contact fingers 131 and 132 of oscillator CT, front contact 133 of relay LCS, back contact 134 of relay 2V, front contact 135 of relay 4V, front contact 136 of relay 6V, wire 137, front contact 138 of relay 3LC, code jumper 139, space bus SB, front contact 127 of relay CK, front contact 128 of relay CSP, and lower winding of relay CK, to (−). It will be noted that both prior stick circuits for relay CK are open at this time in accordance with front contact 130 of relay C being opened.

A similar stick circuit is provided during the fourth step, but through a different channel, for the transmission of a space. The stick circuit for relay CK under these conditions extends from (+), including contact fingers 55 and 56 of oscillator CT, front contact 118 of relay LCS, front contact 119 of relay 5V, back contact 120 of relay 1V, back contact 121 of relay 3V, front contact 140 of relay 6V, wire 141, front contact 142 of relay 3LC, code jumper 143, space bus SB, front contact 127 of relay CK, front contact 128 of relay CSP and lower winding of relay CK, to (−).

The character transmitted during the fifth step is for control of the track switch 3W (see Fig. 5F), and a mark is transmitted during this step if it is designated that the track switch 3W is to be operated to its reverse position, while a space is transmitted if it is designated that the track switch 3W is to be operated to its normal position. Thus, with the switch control lever 3SML in its left-hand position as illustrated in Fig. 4A, it is selected that a space is maintained during the fifth step wherein the relay C remains dropped away, and a stick circuit is provided for maintaining the check relay CK energized during this step. This stick circuit extends from (+), including contact fingers 131 and 132 of oscillator CT, front contact 133 of relay LCS, back contact 134 of relay 2V, back contact 135 of relay 4V, front contact 144 of relay 6V, wire 145, front contact 146 of relay 3LC, contact 147 of lever 3SML in its left-hand position, space bus SB, front contact 127 of relay CK, front contact 128 of relay CSP, and lower winding of relay CK, to (−).

If the lever 3SML is in its right-hand position for designation of the reverse position of the track switch 3W, a mark is transmitted during the fifth step in accordance with the picking up of the code transmitter relay C when the step is initiated. The circuit by which relay C is picked up under these conditions extends from (+), including contact fingers 131 and 132 of oscillator CT, front contact 133 of relay LCS, back contact 134 of relay 2V, back contact 135 of relay 4V, front contact 144 of relay 6V, wire 145, front contact 146 of relay 3LC, contact 147 of lever 3SML in its right-hand position, mark bus MB and upper winding of relay C, to (−).

The characters transmitted during the sixth and seventh steps are used for the control of the signals illustrated in Fig. 5F, the sixth and seventh steps being respectively mark and space characters if the control is for clearing a signal governing eastbound traffic, the characters are respectively space and mark if the signal control lever has been actuated to designate the clearing of a signal for westbound traffic, and these characters are respectively space and space if the control selected for transmission is for the putting of a signal to stop rather than for the clearing of a signal.

If it is assumed that the lever 4–5SGL has been actuated to its right hand position for governing the clearing of a signal for eastbound traffic, relay C is picked up for the transmission of a mark during the sixth step upon the closure of the contact fingers 55 and 56 of oscillator CT (see Fig. 4D) during the last half of the third excursion of the oscillator pendulum during the cycle of operation. The circuit for the energization of relay C at this time extends from (+), including contact fingers 55 and 56 of oscillator CT, front contact 118 of relay LCS, back contact 119 of relay 5V, back contact 148 of relay 3V, front contact 149 of relay 1V, wire 150, front contact 151 of relay 3LC, contact 152 of lever SGL in its right hand position, mark bus MB, and upper winding of relay C, to (−). Should the lever 4–5SGL have been operated to its left hand position for designation of the clearing of a signal for westbound traffic, the relay C would have been deenergized during the sixth step and a stick circuit would have been provided for maintaining the relay CK energized extending from (+), including contact fingers 55 and 56 of oscillator CT, front contact 118 of relay LCS, back contact 119 of relay 5V, back contact 148 of relay 3V, front contact 149 of relay 1V, wire 150, front contact 151 of relay 3LC, contact 152 of lever 4–5SGL in its left hand position, space bus SB, front contact 127 of relay CK, front contact 128 of relay CSP, and lower winding of relay CK, to (−). It will be noted that the same circuit would be energized if the lever 4–5SGL were in its center position for designation of a stop control to be transmitted because of the transmission of a space being required for such code during the sixth step.

During the seventh step, a space is transmitted if the lever 4–5SGL is in its right hand position, and stick energy is provided for the relay CK at this time by a circuit extending from (+), including contact fingers 131 and 132 of oscillator CT, front contact 133 of relay LCS, front contact 134 of relay 2V, back contact 153 of relay 6V, wire 154, front contact 155 of relay 3LC, contact 156 of lever 4–5SGL in its right hand position, space bus SB, front contact 127 of relay CK, front contact 128 of relay CSP, and lower winding of relay CK, to (−).

If the lever 4–5SGL has been operated to its left hand position, a mark is transmitted during the seventh step in accordance with the energization of relay C by a circuit extending from (+), including contact fingers 131 and 132 of oscillator CT, front contact 133 of relay LCS, front contact 134 of relay 2V, back contact 153 of relay 6V, wire 154, front contact 155 of relay 3LC, contact 156 of lever 4–5SGL in its left hand position, mark bus MB, and upper winding of relay C, to (−).

If the lever 4–5SGL is in its center position during a control cycle, the seventh step is a space, and the relay CK is maintained picked up by the same stick circuit that has been described for the energization of this relay when the lever 4–5SGL is in its right hand position.

The eighth, ninth and tenth steps are not used in this embodiment of the present invention, but they may be used in accordance with the requirements of practice for the control of other devices. As illustrated these steps are always marks because of the connection of their their respective channels to the mark bus MB. Relay C is therefore picked up during the eighth step for the transmission of a mark by the energization of a circuit extending from (+), including contact fingers 55 and 56 of oscillator CT, front contact 118 of relay LCS, back contact 119 of relay 5V, front contact 148 of relay 3V, wire 157, front contact 158 of relay 3LC, mark bus MB and upper winding of relay C, to (−).

The ninth step is a mark because of the energization of relay C by a circuit extending from (+), including contact fingers 131 and 132 of oscillator CT, front contact 133 of relay LCS, back contact 134 of relay 2V, front contact 135 of relay 4V, back contact 136 of relay 6V, wire 159, front contact 160 of relay 3LC, mark bus MB, and upper winding of relay C, to (−).

A mark is transmitted during the tenth step when relay C is picked up by the energization of a circuit extending from (+), including contact fingers 55 and 56 of oscillator CT, front contact 118 of relay LCS, back contact 161 of relay 1V, back contact 162 of relay 3V, front contact 163 of relay 5V, back contact 164 of relay 6V, wire 165, front contact 166 of relay 3LC, mark bus MB, and upper winding of relay C, to (−).

The last character of the code transmitted is selected as a mark or a space in order to determine that the complement of the code always contains an odd number of marks. Thus in selecting the code character to be transmitted, the positions of both the switch and signal control levers must be taken into consideration so as to determine whether an odd number of an even number of marks has been transmitted up to the time of transmission of the last character. If it is an even number of marks that have been transmitted up to this time, a mark is transmitted during the eleventh step, but if an odd number of marks have been transmitted up to the last step, it is determined that a space is transmitted during the eleventh step. In counting the odd or even number of marks, the mark that is transmitted during the first step is not counted because this is always transmitted during a control cycle, and, therefore, forms no part of a control code. Inasmuch as a large number of different combinations of positions of the levers 3SML and 4–5SGL have to be taken into account in selecting as to whether the last character is a mark or a space, only typical combinations will be considered, as the circuits involved will be readily understood as being similarly employed for selections with the other combinations of the positions of the switch and signal control levers.

If the lever 3SML is in its normal position and the lever 4–5SGL is on center, a mark is transmitted during the eleventh step, during which relay C is energized by a circuit extending from (+), including contact fingers 131 and 132 of oscillator CT, front contact 133 of relay LCS, back contact 134 of relay 2V, back contact 135 of relay 4V, back contact 144 of relay 6V, wire 167, front contact 168 of relay 3LC, contact 169 of lever 3SML in its left-hand position, contact 170 of lever 4–5SGL in its center position, mark bus MB, and upper winding of relay C, to (−).

If, however, the lever 3SML is in its right-hand position and the lever 4–5SGL is on center during a cycle of operation, it is selected that the last character transmitted is a space in order to complete the complement of marks to make an odd number. Thus, under these conditions, relay CK is maintained energized during transmisson of a space during the last step by the energization of a circuit extending from (+), including contact fingers 131 and 132 of oscillator CT (see Fig. 4D), front contact 133 of relay LCS, back contact 134 of relay 2V, back contact 135 of relay 4V, back contact 144 of relay 6V, wire 167, front contact 168 of relay 3LC, contact 169 of lever 3SML in its right-hand position, contact 171 of lever 4–5SGL in its center position, space bus SB, front contact 127 of relay CK, front contact 128 of relay CSP, and lower winding of relay CK, to (−). Having thus described how either a mark or a space is transmitted during the last step of a control cycle of operation to satisfy the requirement of providing an odd number of marks, it should be readily apparent that a similar mode of operation is effective to always provide an odd number of marks in accordance with other combinations of the positions of the switch and signal control levers.

*Reception of controls.*—With reference to Fig. 5A, the line relay L1 at a typical field station is indicative during the respective steps of a control cycle as to whether the respective characters transmitted are marks or spaces, this relay being picked up for a mark and being in its dropped away position for a space. It is in accordance with the position of this line relay L1 during each of the steps that a mark relay M belonging to that step is picked up in response to the actuation of the corresponding stepping relay V1. Inasmuch as the first step is not used as a part of the code, there is no decoding relay M provided for that step and thus the decoding starts when the second step is taken.

It is, therefore, provided that upon the dropping away of the second step relay 2V1, the relay 2M is picked up, provided that the line relay L1 is picked up at this time. The pick up circuit for relay 2M (see Fig. 5F) extends from (+), including front contact 81 of relay L1 (see Fig. 5A), back contact 82 of relay LCS1, contact fingers 83 and 84 of oscillator CT1, wire 172, back contact 173 of relay LCS1, back contact 174 of relay C1, front contact 175 of relay CSP1, back contact 176 of relay 1V1, back contact 177 of relay 2V1, front contact 178 of relay 3V1, front contact 179 of relay 5V1, wire 180, and lower winding of relay 2M, to (−). When the relay 2M is picked up, a stick circuit is closed to maintain this relay energized until the end of the cycle. This stick circuit includes front contact 181 of relay CSP1 (see Fig. 5C), wire 182, front contact 183 of relay 2M, and upper winding of relay 2M. It will be readily apparent that when a space is transmitted during the second step, the circuit just described for relay 2M cannot be closed because of its being open at front contact 81 of relay L1 (see Fig. 5A).

If a mark is transmitted during the third step, the relay 3M (see Fig. 5F) is picked up upon the dropping away of the stepping relay 3V1 by the energization of a circuit extending from (+), including front contact 81 of relay L1 (see Fig. 5A), back contact 82 of relay LCS1, contact fingers 184 and 185 of oscillator CT1, wire 186, back contact 187 of relay LCS1, back contact 188 of relay C1, front contact 189 of relay CSP1, front contact 190 of relay 4V1, back contact 191 of relay 3V1, front contact 192 of relay 6V1, wire 193, and lower winding of relay 3M, to (—). When relay 3M is picked up, a stick circuit is closed to maintain this relay picked up until the end of the cycle including front contact 194 of relay CSP1, wire 195, front contact 196 of relay 3M, and upper winding of relay 3M.

If a mark is received during the fourth step, relay 4M is picked up upon the dropping away of the stepping relay 4V1 by the energization of a circuit extending from (+), including front contact 81 of relay L1 (see Fig. 5A), back contact 82 of relay LCS1, contact fingers 83 and 84 of oscillator CT1, wire 172, back contact 173 of relay LCS1, back contact 174 of relay C1, front contact 175 of relay CSP1, back contact 176 of relay 1V1, back contact 197 of relay 4V1, front contact 198 of relay 5V1, front contact 199 of relay 6V1, wire 200, and the lower winding of relay 4M, to (—). Stick energy is applied to the upper winding of relay 4M through front contact 201 to maintain this relay picked up until the end of the cycle.

If a mark is received during the fifth step, the relay 5M is picked up by the energization of a circuit extending from (+), including front contact 81 of relay L1, back contact 82 of relay LCS1, contact fingers 184 and 185 of oscillator CT1, wire 186, back contact 187 of relay LCS1, back contact 188 of relay C1, front contact 189 of relay CSP1, back contact 190 of relay 4V1, back contact 202 of relay 2V1, back contact 203 of relay 5V1, front contact 204 of relay 6V1, wire 205, and lower winding of relay 5M, to (—). The picking up of relay 5M establishes a stick circuit through front contact 206 to maintain this relay picked up until the end of the cycle.

If a mark is received during the sixth step, the relay 6M is picked up by the energization of a circuit extending from (+), including front contact 81 of relay L1, back contact 82 of LCS1, contact fingers 83 and 84 of oscillator CT1, wire 172, back contact 173 of relay LCS1, back contact 174 of relay C1, front contact 175 of relay CSP1, front contact 176 of relay 1V1, back contact 207 of relay 6V1, wire 208, and lower winding of relay 6M, to (—). The picking up of this relay closes a stick circuit including front contact 208a to maintain this relay picked up until the end of the cycle.

Relay 7M is picked up during the seventh step, if a mark is received, by the energization of a circuit extending from (+), including front contact 81 of relay L1 (see Fig. 5A), back contact 82 of relay LCS1, contact fingers 184 and 185 of oscillator CT1, wire 186, back contact 187 of relay LCS1, back contact 188 of relay C1, front contact 189 of relay CSP1, back contact 209 of relay 1V1, front contact 210 of relay 2V1, back contact 211 of relay 6V1, wire 212, and lower winding of relay 7M, to (—). Upon the picking up of this relay, the closure of its front contact 213 provides for stick energization of the relay until the end of the cycle.

If a mark is received during the eighth step, relay 8M is picked up by the energization of a circuit extending from (+), including front contact 81 of relay L1 (see Fig. 5A), back contact 82 of relay LCS1, contact fingers 83 and 84 of oscillator CT1, wire 172, back contact 173 of relay LCS1, back contact 174 of relay C1, front contact 175 of relay CSP1, back contact 176 of relay 1V1, back contact 177 of relay 2V1, front contact 178 of relay 3V1, back contact 179 of relay 5V1, wire 214, and lower winding of relay 8M, to (—). This relay when picked up is maintained energized until the end of the cycle through front contact 215.

If a mark is received during the ninth step, relay 9M is picked up by the energization of a circuit extending from (+), including front contact 81 of relay L1, back contact 82 of relay LCS1, contact fingers 184 and 185 of oscillator CT1, wire 186, back contact 187 of relay LCS1, back contact 188 of relay C1, front contact 189 of relay CSP1, front contact 190 of relay 4V1, back contact 191 of relay 3V1, back contact 192 of relay 6V1, wire 216, and lower winding of relay 9M, to (—). The picking up of this relay closes a stick circuit to maintain relay 9M energized until the end of the cycle through front contact 217.

If a mark is received during the tenth step, relay 10M is picked up by the energization of a circuit extending from (+), including front contact 81 of relay L1 (see Fig. 5A), back contact 82 of relay LCS1, contact fingers 83 and 84 of oscillator CT1, wire 172, back contact 173 of relay LCS1, back contact 174 of relay C1, front contact 175 of relay CSP1, back contact 176 of relay 1V1, back contact 197 of relay 4V1, front contact 198 of relay 5V1, back contact 199 of relay 6V1, wire 218, and lower winding of relay 10M, to (—). This relay when picked up is maintained energized by a stick circuit including front contact 219 until the end of the control cycle.

If a mark is received during the eleventh step, relay 11M is picked up by the energization of a circuit extending from (+), including front contact 81 of relay L1 (see Fig. 5A), back contact 82 of relay LCS1, contact fingers 184 and 185 of oscillator CT1, wire 186, back contact 187 of relay LCS1, front contact 188 of relay C1, front contact 189 of relay CSP1, back contact 190 of relay 4V1, back contact 202 of relay 2V1, back contact 203 of relay 5V1, back contact 204 of relay 6V1, wire 220, and lower winding of relay 11M, to (—). Upon the picking up of this relay a stick circuit is closed for its upper winding through front contact 221 to maintain the relay energized until after the execution period at the end of the cycle.

To consider the execution of a particular code as the relays M have been conditioned according to the mode of operation that has been described, it will be assumed that the code "mark-space-space-mark-mark-space-mark-mark-mark-mark" has been transmitted for the power operation of the track switch 3W (see Fig. 5F) to its reverse position and for the clearing of signal 4B for governing traffic over the track switch 3W. The reception of this code causes the energization as has been described of the decoding relays 2M, 5M, 6M, 8M, 9M, 10M and 11M.

The beginning of the execution period is defined by the picking up of relay CS1 (see Fig. 5A), this relay being picked up in response to the passage of the rotating mechanism of the oscillator CT1 through center for the last time during the cycle of operation. Thus the relay CS1 is picked up at this time by the energization of a circuit extending from (+), including contact fingers 222 and 223 of oscillator CT1, back contacts 224, 225, 226 and 227 of relays 5V, 4V, 3V, and 1V, respectively, and lower winding of relay CS1, to (—). Relay CS1 when picked up is maintained energized for the duration of the execution period by a stick circuit including front contact 519 of relay CSP1, and front contact 78 of relay CS1. Other requisites for the closure of the execution circuit are that relays SD and CSP1 should both be picked up. Relay SD is held up throughout the cycle by the energization of a pick-up circuit that has been described, but this circuit has been opened by the picking up of relay CS1. Relay SD, however, has been made slow to drop away by the connection of the condenser 228 in series with the resistor 229 across the lower winding of the relay SD through front contact 230. This makes the relay SD extremely slow in dropping away for purposes to be more readily apparent as the description progresses, and thus relay SD is maintained picked up during the execution period. Relay CSP1 is picked up during the first step of a control cycle, upon the dropping away of relay 1V, by the energization of a circuit extending from (+), including front contact 81 of relay L1 (see Fig. 5A), back contact 82 of relay LCS1, contact fingers 184 and 185 of oscillator CT1, front contact 231 of relay 2V1, front contact 232 of relay 6V1, front contact 233 of relay 3V1, back contact 234 of relay 1V1, back contact 235 of relay CS1, and lower winding of relay CSP1, to (−). When thus picked up the relay CSP1 is maintained picked up by a stick circuit until the fifth step through back contact 236 of relay CS1, front contact 237 of relay 5V1, back contact 238 of relay LCS1, front contact 239 of relay CSP1, and lower winding of relay CSP1. Upon the dropping away of relay 5V, another stick circuit for relay CSP1 is closed extending from (+), including back contact 236 of relay CS1, front contact 240 of relay 6V1, front contact 241 of relay 1V1, back contact 237 of relay 5V1, back contact 238 of relay LCS1, front contact 239 of relay CSP1, and lower winding of relay CSP1, to (−). Although there is a short interruption in the continuity of the stick circuits for relay CSP1 upon the dropping away of relay 5V1 and the picking up of relay 1V1, relay CSP1 does not drop away because it is made slightly slow in dropping away by reason of the upper winding of the relay being shunted through front contact 242. It is thus provided that relay CSP1 checks the picking up of the stepping relays for their second operation. That is, if relay 1V1, for example, should fail to pick up for the second time, the above described stick circuit for relay CSP1 would be open at front contact 241 of relay 1V1. With relay CSP1 dropped away, execution of the code received is prevented by the opening of front contact 257 (see Fig. 5C) of relay CSP1.

Upon the dropping away of relay 6V1, another stick circuit is closed for maintaining relay CSP1 picked up. This stick circuit extends from (+), including back contact 236 of relay CS1, front contact 243 of relay 2V1, back contact 240 of relay 6V1, front contact 241 of relay 1V1, back contact 237 of relay 5V1, back contact 238 of relay LCS1, front contact 239 of relay CSP1, and lower winding of relay CSP1, to (−). When the seventh step is taken and relay 1V1 is dropped away and relay 3V1 is picked up, relay CSP1 is maintained picked up by a stick circuit extending from (+), including back contact 236 of relay CS1, front contact 243 of relay 2V1, back contact 240 of relay 6V1, back contact 241 of relay 1V1, front contact 244 of relay 3V1, back contact 238 of relay LCS1, front contact 239 of relay CSP1, and lower winding of relay CSP1, to (−). Relay CSP1 is maintained picked up by another stick circuit when relay 2V1 is dropped away for the eighth step extending from (+), including back contact 236 of relay CS1, front contact 245 of relay 4V1, back contact 243 of relay 2V1, back contact 240 of relay 6V1, back contact 241 of relay 1V1, front contact 244 of relay 3V1, back contact 238 of relay LCS1, front contact 239 of relay CSP1, and lower winding of relay CSP1, to (−). When the ninth step is taken, the dropping away of relay 3V1 opens the stick circuit just described for relay CSP1, and the dropping away of this relay causes the picking up of relay 5V1 to establish a stick circuit for relay CSP1 that has been described. When the tenth step is taken, the dropping away of relay 4V1 conditions a circuit so that when the oscillator pendulum passes through center in the first half of its sixth excursion another stick circuit is closed for relay CSP1 extending from (+), including contact fingers 246 and 247 of oscillator CT1, back contact 248 of relay 2V1, back contact 249 of relay 4V1, back contact 250 of relay 6V1, back contact 244 of relay 3V1, back contact 241 of relay 1V1, back contact 240 of relay 6V1, back contact 243 of relay 2V1, back contact 245 of relay 4V1, front contact 251 of relay CSP1, back contact 235 of relay CS1, and lower winding of relay CSP1, to (−).

During the clearing out period following the last step, the line relay L1 is dropped away, and relay CS1 is picked up as has been described. When relay CS1 is picked up, another stick circuit is closed for relay CSP1 to maintain that relay picked up during the execution period. This stick circuit extends from (+), including back contact 81 of relay L1, front contact 252 of relay CS1, front contact 253 of relay CSP1, and lower winding of relay CSP1, to (−).

If, for some reason, such as will be hereinafter explained, it should be desirable to prevent execution at the end of a control cycle, the control office, by maintaining the line circuit energized during the first part of the clear out period, can prevent execution by holding the execution circuit open at back contact 250 of relay L1 (see Fig. 5C).

To consider further the execution at the end of a typical normal control cycle, it will be assumed that the relays CS1 and CSP1 are both in their picked up positions and the line relay L1 is dropped away at the end of a control cycle in which the above mentioned code has been received. Under these conditions, upon the picking up of relay CS1, an execution circuit is closed for energization of the switch control relay 3WZ (see Fig. 5F) with a polarity to cause that relay to be actuated to its dropped away position for operation of the associated track switch 3W to its reverse position. The circuit for the energization of relay 3WZ with this polarity extends from (+), including back contact 254 of relay L (see Fig. 5C), front contact 255 of relay SD, front contact 256 of relay CS1, front contact 257 of relay CSP1, wire 258, front contact 259 of relay 2M, back contact 260 of relay 3M, back contact 261 of relay 4M, front contact 262 of relay 5M, front contact 263 of relay 6M, back contact 264 of relay 7M, front contact 265 of relay 8M, front contact 266 of relay 9M, front contact 267 of relay 10M, front contact 268 of relay 11M, front contact 269 of relay 2M, back contact 270 of relay 3M, back contact 271 of relay 4M, front contact 272 of relay 5M, front contact 273 of relay 3WZ, and upper winding of relay 3WZ, to (−). Relay 3WZ when energized with this polarity is actuated to its dropped away position, thus opening the circuit that has been described for its upper winding at front contact 273. When dropped away relay 3WZ pole changes the circuit for the switch machine 3SM by the operation of contacts 274 and 275 to cause the switch machine 3SM to actuate the track switch SW to its reverse position.

With the relay 3WZ actuated to its dropped away position, the execution circuit feeds energy further through the execution circuit network for the enerization of relay 4RGZ through back contact 276 of relay 3WZ, front contact 277 of relay 6M, back contact 278 of relay 7M, back contact 279 of relay 5LGZ, and lower winding of relay 4RGZ, to (−). Relay 4RGZ, when picked up, applies energy to signal 4B through front contact 280. Signal 4B is selected in preference to signal 4A by reason of the position of the track switch 3W, and other conventional signal control selections are provided as indicated by the dotted line connecting contact 280 with the signals 4A and 4B. These conventional selections are well known to those familiar with the art. Relay 4RGZ when picked up is maintained energized by a stick circuit including front contact 281 and back contact 282 of relays 4TR and 4TP respectively connected in multiple, and through front contact 283 of relay 4RGZ. Thus it is provided that the relay 4RGZ can be maintained picked up until the entrance of the detector track section 4T by a train which accepts the signal after it becomes cleared.

Having thus described specifically the circuit organization provided for the control of respective switch and signal control relays during an execution period at the end of a typical control cycle, it should be readily apparent that a similar mode of operation is effective for the operation of the switch control relay 3WZ to its picked up position for governing the power operation of the track switch 3W to its normal position, and that the energization of relay 5LGZ for governing the clearing of a signal for westbound traffic can be effected upon the reception of the proper code by a mode of operation comparable to that which has been described for the energization of the signal control relay 4RGZ. It will be noted that the use of the relay 4TP which is energized through front contact 284 of the track relay 4TR in the stick circuit for the relays 4RGZ and 5LGZ provides for the dropping away of these relays upon passage of trains for both directions of traffic but a signal control relay 4RGZ or 5LGZ can be picked up and maintained energized upon reception of a signal clearing control when the detector track section 4T is occupied by a train.

If the signal control code received during the execution period is for putting a signal to stop, the relays 6M and 7M are both in their dropped away positions because of the reception of spaces during the sixth and seventh steps respectively. Thus, assuming the parity check reiterative network to be properly closed upon reception of a stop control code, energy is applied from back contact 271 of relay 4M through back contacts 285 and 286 of relays 6M and 7M respectively and through front contact 287 of relay 4RGZ (if relay 4RGZ is in its picked up position) for the energization of the upper winding of relay 4RGZ with a polarity to neutralize the flux set up by the energization of the lower winding so as to cause that relay to be dropped away and thus restore the associated signal to stop by the opening of front contact 280. Similarly, if it is the relay 5LGZ that is to be dropped away, the circuit extends through back contact 287 of relay 4RGZ and front contact 288 of relay 5LGZ to the upper winding of relay 5LGZ so as to neutralize the flux in that relay and cause that relay to be dropped away. It will be noted that when a signal control relay 4RGZ or 5LGZ is dropped away by neutralization of the flux as has been described, the stick circuit by which that relay was previously energized is opened and similarly the knockdown circuit is opened because this circuit also includes a front contact of the particular signal control relay that is to be dropped away. It is, therefore, provide that such a relay when dropped away cannot be picked up by the opposite polarity because all energy is removed by the opening of the front contacts of the relay.

It will be noted from the circuits that have been described, that the station call code has been decoded, and therefore application relays such as relays 4RGZ and 5LGZ and 3WZ can be energized during the execution period, only provided the associated station call code has been received. In other words, all field stations receive the complete code during a control cycle, but the execution circuit for only the station called is permitted to govern the switch and signal control relays WZ and GZ at the associated station.

*Transmission of indications.*—Because of this system being of the simplex type wherein the controls and indications are transmitted at different times, the same line circuit, and the same stepping and oscillatory timing devices are used for the communication of indications as for the communication of controls. Thus it is believed to be unnecessary in considering the transmission of indications to specifically consider the mode of operation of the stepping and other circuit organizations that have been heretofore considered. Therefore, for the transmission of indications, specific reference will be more particularly made to those circuits and functions which are different from circuits and functions that have been heretofore described.

A code communication system of this character for centralized traffic control for railroads requires that substantially twice the number of channels be provided for the communication of indications as compared to the number of channels required for the communication of switch and signal controls to the various field stations. Even if double the capacity of channels is provided for the communication of indications, it is generally required that several indication stations or groups of indications, be provided at one or more of the field locations wherein a different indication cycle is transmitted for each of the groups. Also where a large number of field stations is involved, more steps have to be assigned to the transmission of registration codes for identifying the respective indication stations. It is, therefore, provided that there is a complete repeat operation of the stepping so that an indication cycle of operation for this embodiment of the present invention comprises twenty-two steps as compared to eleven steps used for a control cycle.

Comparable to the organization for the transmission of controls, each indication station has a change relay CH1 (see Fig. 5C) and an associated code determining relay LC1, the relay LC1 being maintained picked up for the complete indication cycle, and being effective to determine the code selections for governing the characters transmitted during the cycle. If there is a plurality of indication stations at one field location, there is a relay corresponding to relay LC1 provided for each indication station thus formed, and the relays LC1 are energized in a chain circuit network comparable to the chain circuit organization which is illustrated in Fig. 4A for governing the order of operation of the relays LC when there are a plurality of stations at a particular location which may have simultaneous starts.

As has been heretofore pointed out, the code characters transmitted by a field station during an indication cycle are conveniently termed "shunt" and "non-shunt" characters.

A field station momentarily shunts the line circuit to start an indication cycle. The control office then opens the line circuit until the second step is taken at the control office. The line circuit is unshunted at the transmitting field station during the first step so that if the office should have a simultaneous control start as will hereinafter be considered, each field station would receive a mark during the first step, which, in turn, would be effective to condition each station for the reception of controls, including any station or stations that had initiated an indication cycle of operation.

The second and third steps during an indication cycle are always shunt and non-shunt respectively for automatically retiring all stations without permitting any station to transmit its indications, if the stations are too far out of synchronism with the control office. Thus the fourth step is the first step during which a selected indication station registration code character is transmitted. The first character of the indication station registration code, therefore, is transmitted during the fourth step, the station registration codes being assigned in a predetermined order of superiority progressing outwardly from the control office for the respective stations as is indicated by the code chart of Fig. 9.

The circuits shown in detail for a field station in Figs. 5A to 5F inclusive are to be considered as typical for any field station, except that the station registration code used is for the indication station nearest the control office. Thus the registration code assigned to this station is the code "shunt-shunt-non-shunt."

There is no indication transmitted during the step following the last character of the station registration code because this period is required for the execution of the registration code as received at the control office to select a station relay ST (see Fig. 4E), and for the restoration of the change relay CH1 (see Fig. 5C) at the superior field station transmitting.

To consider specifically the circuits involved in the transmission of a typical indication code, it will be assumed that there has been a change in a device at field station No. 2 to be indicated at the control office. This provides for the momentary interruption of the stick circuit for the change relay CH1 of Fig. 5C. This relay is normally maintained energized by a stick circuit extending from (+), including contacts not shown (indicated by XX in Fig. 5C), contact 290 of relay LM, contact 291 of relay RM, contact 292 of relay 4TR, front contact 293 of relay CH1, and winding of relay CH1, to (—). Relay CH1 is quick acting so that the shifting of contact 290, 291 or 292 is effective to cause relay CH1 to be dropped away for the initiation of an indication cycle.

Relay CH1 when dropped away closes a pick-up circuit for relay LC1 extending from (+), including back contact 294 of relay LCS1, front contact 295 of relay C1, back contact 296 of relay SD, front contact 297 of relay CS1, back contact 298 of relay CP1, back contact 299 of relay CPP1, back contact 300 of relay CH1, and lower winding of relay LC1, to (—). This relay when picked up is maintained energized by a stick circuit including the winding of relay LCS1. This stick circuit extends from (+), including front contact 301 of relay L1, back contact 302 of relay CSP1, front contact 303 of relay CS1, winding of relay LCS1, front contact 304 of relay LC1, and upper winding of relay LC1, to (—).

Relay C1 which is normally energized, is dropped away upon the picking up of relay LCS1. The circuit by which the relay C1 is normally energized extends from (+), including front contacts 305, 306, 307, 308, 309, and 310 of relays 6V1, 5V1, 4V1, 3V1, 2V1, and 1V1 respectively, back contact 311 of relay LCS1, and upper winding of relay C1, to (—). Relay C1 is dropped away at this time by the opening of back contact 311 of relay LSC1 in the circuit just described.

With reference to Fig. 5A, the dropping away of relay C1, with the relay LCS1 picked up, applies a shunt across the line wires 31 and 32 through front contact 312 of relay LCS1, back contact 313 of relay C1, and the low pass filter 35.

By the application of this shunt, the line relay L1 at the associated station and the line relays L1 for the more distant field stations are dropped away, and the dropping away of these relays is effective to initiate the code oscillators CT1 at the associated stations. The shunt may also be effective to cause the line relays L1 to drop away for some intermediate stations between the station transmitting and the control office, but, to make sure that each intermediate field station initiates a cycle, the control office opens the line circuit to insure the starting of the oscillators CT1 for all of the field stations. Thus, in response to the application of the shunt, the line relay L at the control office (see Fig. 4B) is actuated to its dropped away position through the impulse transformer 36.

When relay L is dropped away at the control office the oscillator CT (see Fig. 4D) at the control office is initiated upon the opening of its circuit at front contact 57 of the line relay L. Also, in response to the dropping away of the line relay L at the control office relay CS is dropped away, and the dropping away of this relay opens the line circuit at front contact 34.

The opening of the line circuit at the control office positively calls for the initiation of any field stations between the control office and the nearest transmitting station which may not have been initiated by reason of the application of the shunt to the line circuit by the transmitting station. Thus the line relay L1 at each of these field stations is dropped away in response to the dropping away of relay CS at the control office, and the dropping away of each line relay L1 is effective to cause the dropping away of relay CS1 at the associated station (see Fig. 5A) by the opening of front contact 77. This relay when dropped away initiates the oscillator CT1 at the associated station by the opening of its circuit at front contact 87. It has thus been provided by the opening of the line circuit at the control office that the balance of the field stations have been initiated into a cycle of operation so that at this time all field stations are initiated into respective cycles of operation, and all of these field stations will operate their steppers to completion, even though some of the stations are not transmitting.

When the pendulum of the oscillator CT1 at each of the field stations rotates through center during the first half of the first excursion of the pendulum during the cycle, the relay 1V1 is dropped away in accordance with the mode of operation of the stepping as has been heretofore described. Also upon the rotation of the oscillator pendulum through center for the first time, relay C1 is picked up at each station that is attempting to transmit. The circuit for the energization of the relay C1 (see Fig. 5D) extends from (+), including front contact 314 of relay 2V1, front contact 315 of relay 4V1, front contact 316 of relay 6V1, front contact 317 of relay LCS1, contact fingers 318 and 319 of oscillator CT1, front contact 320 of relay LCS1, and lower winding of relay C1, to (—). This relay when picked up removes the shunt that has been applied at the associated station to the line circuit by the opening of back contact 313 (see Fig. 5A).

The shunt is removed at each of the transmitting field stations during the first step as has been described so that the control office can transmit a mark during this period in case there is a simultaneous start of a control cycle at the control office. In this case, the control office can be effective to convert the field indication start into a control cycle and cause the indication start to be stored for future transmission. This is accomplished by a method to be more readily apparent hereinafter when considering specifically the mode of operation under simultaneous start conditions.

When the pendulum of the oscillator CT1 at each of the transmitting field stations rotates through center during the second half of the first excursion of the pendulum, the second step is taken by a mode of operation which has been described, and the relay C1 is dropped away upon the opening of the circuit that has just been described for this relay at contact fingers 318 and 319 of oscillator CT1 (see Fig. 5D). Upon the dropping away of the relay C1 at each of the transmitting field stations, a shunt is applied across the line wires 31 and 32 (see Fig. 5A) by the closure of back contact 313. According to the timing of relay operations as illustrated in the indication cycle sequence charts of Fig. 7A, this shunt becomes applied at the field station transmitting prior to the closing of the line circuit at the control office, as the line circuit at the control office is closed only upon the dropping away of relay 2V for marking the beginning of the second step.

Figure 4B:
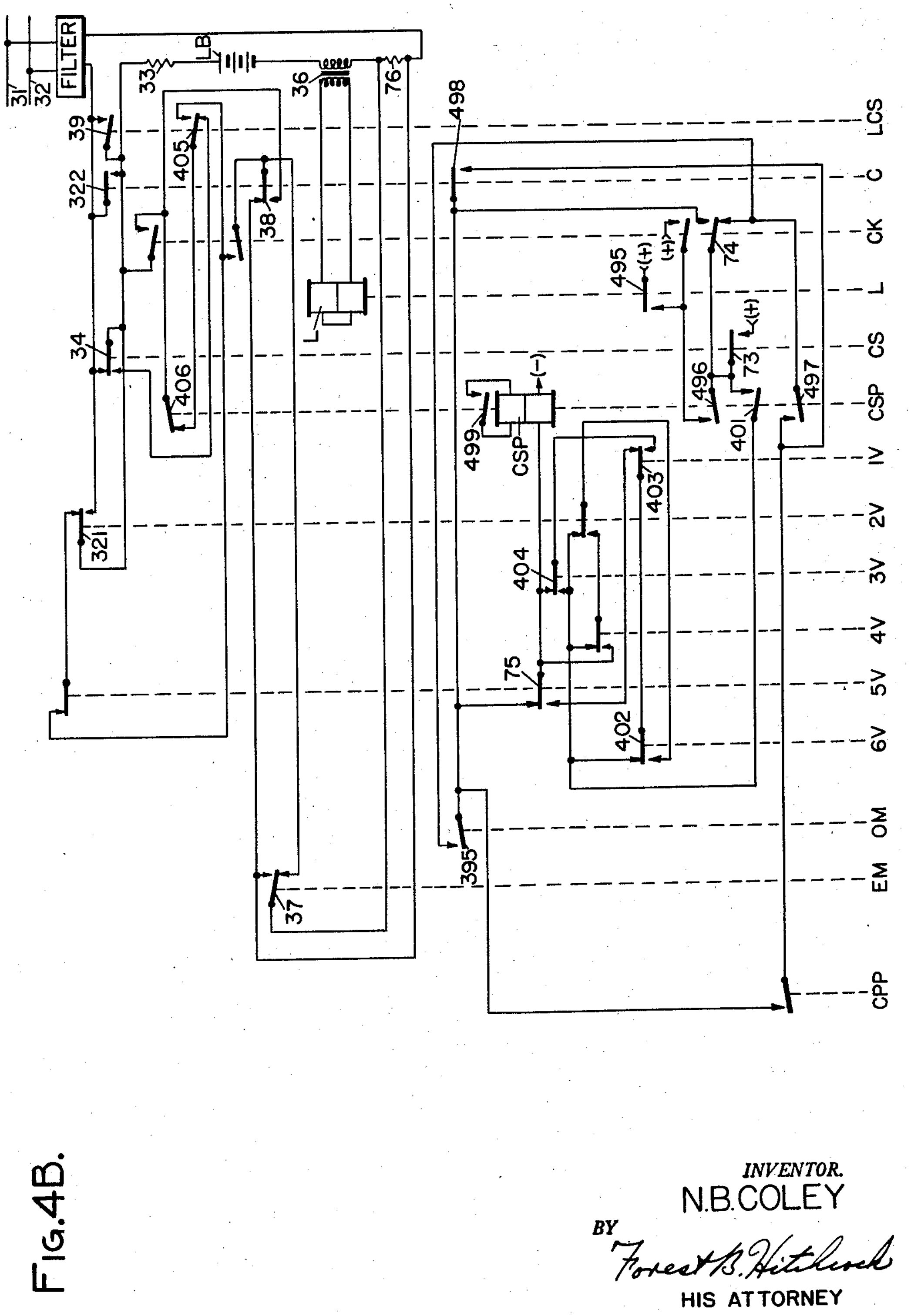
Figure 4C:
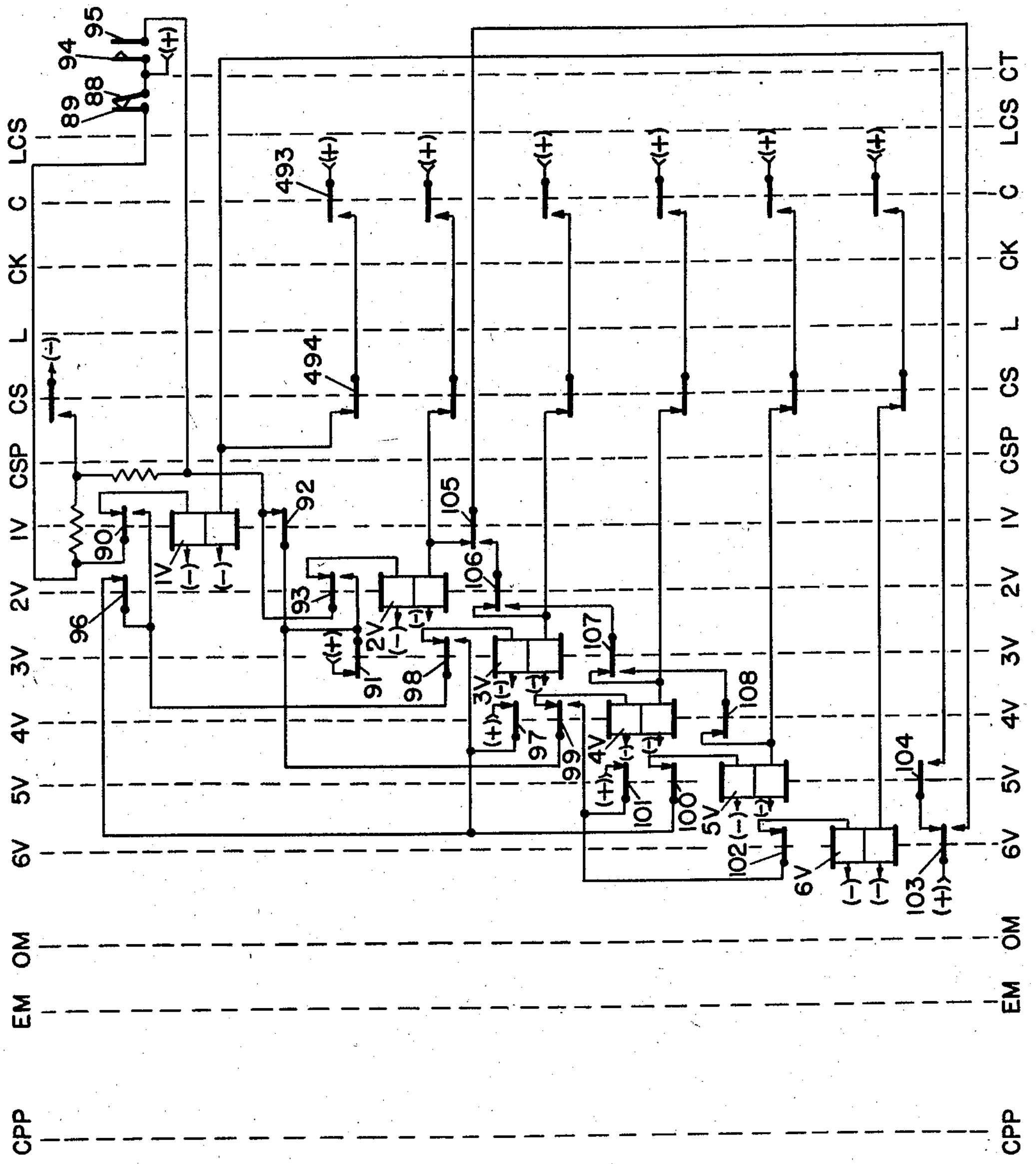
Figure 4D:
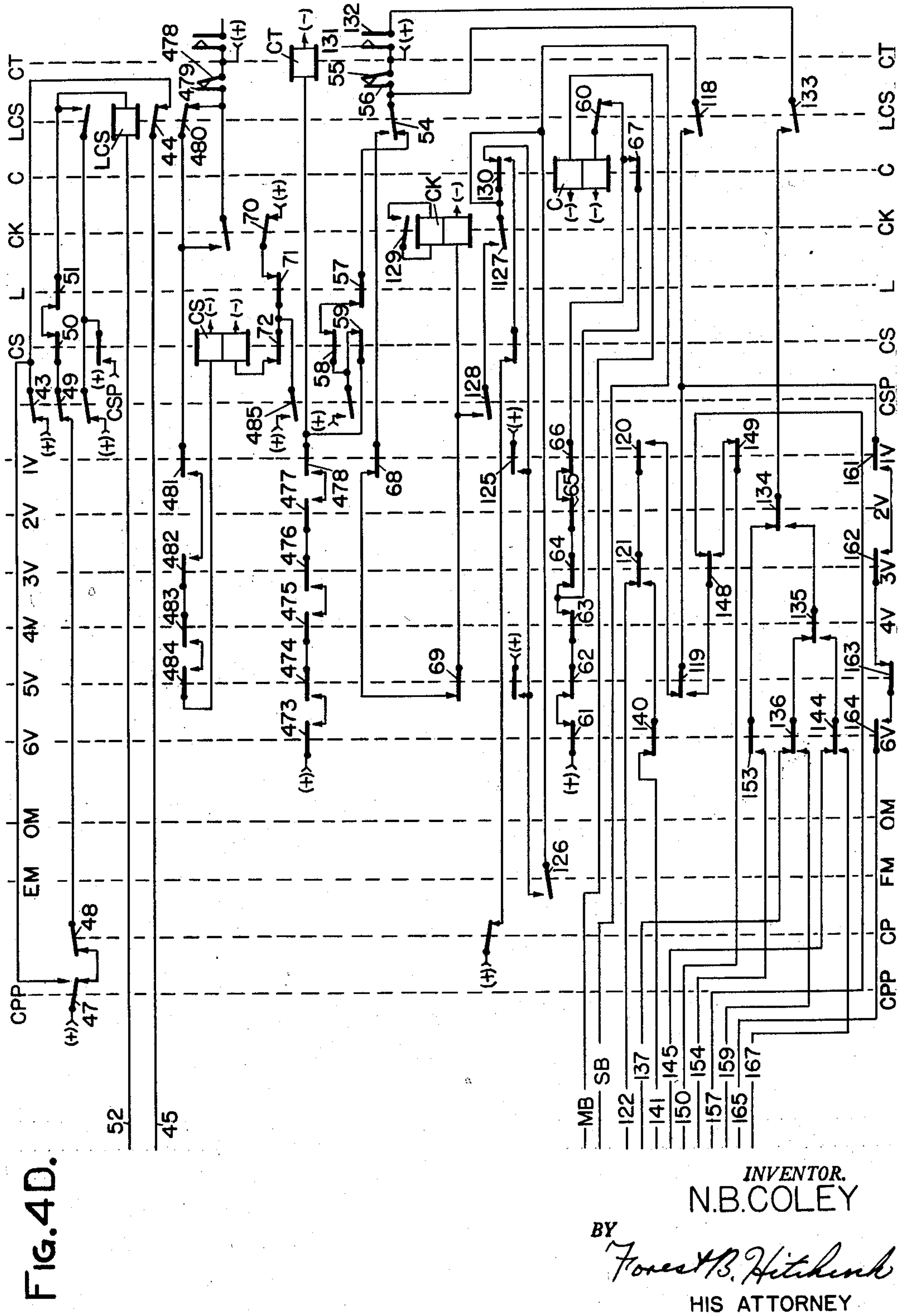

With reference to Fig. 4B the dropping away of relay 2V at the control office closes the line circuit at back contact 321, and this contact continues to close the line circuit until the dropping away of relay C in response to the dropping away of relay 4V at the beginning of the fourth step is effective to close the line circuit at back contact 322, this contact being connected in multiple with back contact 321 of relay 2V. In other words, when the line circuit is closed at the control office at the beginning of the second step, it is maintained closed for the remainder of the cycle. The increase in the current flowing through the impulse transformer 36 at the control office at this time causes the relay L to be energized with a polarity to cause that relay to be operated to its dropped away position.

At the the field station that is transmitting, the dropping away of relay 2V1 to mark the beginning of the second step causes the picking up of relay CSP1 (see Fig. 5A). The circuit by which relay CSP1 is picked up at this time extends from (+), including front contact 323 of relay LCS1, back contact 231 of relay 2V1, front contact 232 of relay 6V1, front contact 233 of relay 3V1, back contact 234 of relay 1V1, back contact 235 of relay CS1, and lower winding of relay CSP1, to (—).

In accordance with it being required that a nonshunt character be applied to the line circuit during the third step by a transmitting field station, each of the field stations initiating transmission picks up its relay C1 when the pendulum of the associated oscillator rotates through center for the first time during the second excursion of the pendulum. Under these conditions, relay C1 (see Fig. 5D) is picked up by the energization of a circuit which extends from (+), including back contact 325 of relay CP, back contact 314 of relay 2V1, front contact 315 of relay 4V1, front contact 316 of relay 6V1, front contact 317 of relay LCS1, contact fingers 318 and 319 of oscillator CT1, front contact 320 of relay LCS1, and lower winding of relay CS1, to (−). This relay when picked up removes the shunt that has been applied during the second step by the opening of back contact 313 (see Fig. 5A).

Should a transmitting field station and the control office be sufficiently out of step so that the shunt condition of the line circuit cannot be effective to actuate the line relay L at the control office during the second step as has been described, prior to the picking up of relay C for initiation of the nonshunt period during the third step, the line relay L at the control office would not be actuated and thus would become out of correspondence in the third step with the line relay L1 at the transmitting field station, this line relay L1 being picked up at the beginning of the third step in accordance with the removal of the line shunt at the associated field station, or at some nearer field station that may be transmitting. The detection of an out of correspondence condition between a transmitting field station and the control office will be hereinafter more specifically considered.

For normal transmission, however, the removal of the shunt causes the picking up of the line relay L at the control office as well as the picking up of the line relay L1 at the transmitting field station at the beginning of the third step, and thus with these two relays in correspondence, the conditions of normal operation are set up indicative of the respective transmitting and receiving stations being sufficiently in correspondence to properly communicate indication codes. The normal operation of the system then continues for the transmission of indication station registration codes from the different stations having initiated an indication cycle, followed by the particular codes indicative of the positions of respective devices to have their positions indicated at the control office.

The ability of a field station to continue to transmit during an indication cycle is dependent upon the relay CSP1 being maintained picked up. Thus, it is this relay that detects code superiority, and when dropped away because of code superiority, this relay prevents further transmission from the associated station during an indication cycle. The pick up circuit for relay CSP1 whereby this relay is picked up at the beginning of the second step has been described, this circuit being maintained closed until the dropping away of relay 3V1 to mark the beginning of the third step.

With reference to the sequence chart of Fig. 7A, it will be noted that the relay C1 becomes picked up before the relay 3V1 becomes dropped away, and the picking up of relay C1 under these conditions establishes a stick circuit for maintaining relay CSP1 energized during the third step. This stick circuit extends from (+), including front contact 326 of relay L1, front contact 327 of relay C1, back contact 328 of relay CP1, front contact 238 of relay LCS1, front contact 239 of relay CSP1, and lower winding of relay CSP1, to (−).

If it is assumed that the fourth character to be transmitted is a shunt character, back contact 313 of relay C1 is closed and relay CSP1 is maintained energized by a stick circuit extending from (+), including back contact 236 of relay CS1, front contact 237 of relay 5V1, back contact 327 of relay C1, back contact 328 of relay CP1, front contact 238 of relay LCS1, front contact 239 of relay CSP1, and lower winding of relay CSP1, to (−). If, however, a nonshunt character is transmitted during the fourth step, relay CSP1 is maintained picked up by a stick circuit heretofore described including front contact 326 of relay L1 and front contact 327 of relay C1.

If a shunt character is transmitted during the fifth step, stick energy is applied to the relay CSP1 through back contact 236 of relay CS1, front contact 240 of relay 6V1, front contact 241 of relay 1V1, back contact 237 of relay 5V1, back contact 327 of relay C1, back contact 328 of relay CP1, front contact 238 of relay LCS1, front contact 239 of relay CSP1, and lower winding of relay CSP1. If a nonshunt character is transmitted during the fifth step, relay CSP1 is maintained picked up by a stick circuit that has been described including front contact 326 of relay L1 and front contact 327 of relay C1.

If a shunt character is transmitted during the sixth step, relay CSP1 is maintained picked up during this step by a stick circuit extending from (+), including back contact 236 of relay CS1, front contact 243 of relay 2V1, back contact 240 of relay 6V1, front contact 241 of relay 1V1, back contact 237 of relay 5V1, back contact 327 of relay C1, back contact 328 of relay CP1, front contact 238 of relay LCS1, front contact 239 of relay CSP1, and lower winding of relay CSP1, to (−). If a nonshunt character is transmitted during the sixth step, relay CSP1 is maintained picked up by a stick circuit that has been described including front contact 326 of relay L1 and front contact 327 of relay C1.

If a shunt character is transmitted during the seventh step, relay CSP1 has a stick circuit closed for its lower winding including back contact 236 of relay CS1, front contact 243 of relay 2V1, back contact 240 of relay 6V1, back contact 241 of relay 1V1, front contact 244 of relay 3V1, back contact 327 of relay C1, back contact 328 of relay CP1, front contact 238 of relay LCS1, front contact 239 of relay CSP1, and lower winding of relay CSP1. If a nonshunt character is transmitted during the seventh step, relay CSP1 is maintained picked up by a stick circuit that has been described for this relay including front contact 326 of relay L1 and front contact 327 of relay C1.

If a shunt character is transmitted during the eighth step, relay CSP1 has a stick circuit closed from (+), including back contact 236 of relay CS1, front contact 245 of relay 4V1, back contact 243 of relay 2V1, back contact 240 of relay 6V1, back contact 241 of relay 1V1, front contact 244 of relay 3V1, back contact 327 of relay C1, back contact 328 of relay CP1, front contact 238 of relay LCS1, front contact 239 of relay CSP1, and lower winding of relay CSP1, to (−). If a nonshunt character is transmitted during the eighth step, relay CSP1 is maintained picked up by a stick circuit that has been described including front contact 326 of relay L1 and front contact 327 of relay C1.

If a shunt character is transmitted during the ninth step, relay CSP1 is maintained picked up by a stick circuit extending from (+), including back contact 236 of relay CS1, front contact 237 of relay 5V1, back contact 327 of relay C1, back contact 328 of relay CP1, front contact 238 of relay LCS1, front contact 239 of relay CSP1, and lower winding of relay CSP1, to (−). If a nonshunt character is transmitted during the ninth step, relay CSP1 is maintained picked up by a stick circuit that has been described including front contact 326 of relay L1 and front contact 327 of relay C1.

If a shunt character is transmitted during the tenth step, relay CSP1 is maintained energized during this step by a stick circuit extending from (+), including back contact 236 of relay CS1, front contact 237 of relay 5V1, back contact 327 of relay C1, back contact 328 of relay CP1, front contact 238 of relay LCS1, front contact 239 of relay CSP1, and lower winding of relay CSP1, to (−). If a nonshunt character is transmitted during the tenth step, the relay CSP1 is maintained picked up by a stick circuit that has been described including front contact 326 of relay L1 and front contact 327 of relay C1.

If a shunt character is transmitted during the 11 step, relay CSP1 is maintained energized during this step by a stick circuit extending from (+), including contact fingers 246 and 247 of oscillator CT1, back contact 248 of relay 2V1, back contact 249 of relay 4V1, back contact 250 of relay 6V1, back contact 244 of relay 3V1, back contact 241 of relay 1V1, back contact 240 of relay 6V1, back contact 243 of relay 2V1, back contact 245 of relay 4V1, front contact 251 of relay CSP1, back contact 235 of relay CS1, and lower winding of relay CSP1, to (—). If a nonshunt character is transmitted during the eleventh step, the relay CSP1 is maintained picked up by a stick circuit that has been described including front contact 326 of relay L1 and front contact 327 of relay C1. This completes the description of the holding of the relay CSP1 during the first half of an indication cycle.

For a consideration of the specific circuit selections for applying a typical registration code during an indication cycle, it will be assumed that the code "shunt-shunt-nonshunt," which is the code assigned to the first field station (see Fig. 9), is transmitted.

Relay C1 is in its deenergized position during the fourth step to shunt the line circuit for the first element of this code because the channel for the control of this relay during the fourth step is open at the jumper terminals 329. If a nonshunt character had been assigned to this station as the first character of the registration code, a jumper would have been placed across the terminals 329 and thus have provided a circuit for the energization of the lower winding of relay C1 through this jumper, back contact 330 of relay CP1, front contact 333 of relay 6V1, front contact 334 of relay 5V1, back contact 335 of relay 3V1, front contact 336 of relay LCS1, contact fingers 337 and 338 of oscillator CT1, front contact 320 of relay LCS1, and lower winding of relay C1, to (—).

During the fifth step, a shunt character is transmitted because of there being no jumper across the terminals 331 at the station under consideration. For stations requiring a nonshunt character during the fifth step, a jumper is placed across terminals corresponding to the terminals 331, and thus the relay C1 can be energized by a circuit including this jumper, back contact 332 of relay CP1, back contact 315 of relay 4V1, front contact 316 of relay 6V1, front contact 317 of relay LCS1, contact fingers 318 and 319 of oscillator CT1, front contact 320 of relay LCS1, and lower winding of relay C1.

The character transmitted during the sixth step is a nonshunt character for the station under consideration because of the closure of a circuit for the energization of the transmitter relay C1 during this step in accordance with the jumper 339 being applied across the terminals 340. The circuit by which relay C1 is energized at this time extends from (+), including jumper 339, back contact 341 of relay CP1, front contact 342 of relay 1V1, back contact 335 of relay 3V1, front contact 336 of relay LCS1, contact fingers 337 and 338 of oscillator CT1, front contact 320 of relay LCS1, and lower winding of relay C1, to (—). For stations wherein the registration code calls for the transmission of a shunt character during the sixth step, the jumper 339 is removed so that the relay C1 is in its dropped away position to shunt the line circuit at the associated station. This completes the transmission of a three element registration code, and it is to be understood that where a larger number of indication stations are provided than can be handled by a three element code, additional elements are added as required.

For the step following the transmission of the last character of the indication station registration code, no indication code is transmitted as this step is required at the field station for restoration of relay CH1 and at the control office for the execution of the registration code so as to select a station relay ST for energization in a manner to be hereinafter considered. Thus, for this embodiment of the present invention, the seventh step is not used, and as a matter of choice is always a shunt character because of there being no circuit closed for the energization of relay C1 during this step.

The eighth step has been illustrated as being used for transmission of an indication of the condition of occupancy of the detector track section, and thus the selection of whether the character transmitted during the eighth step is a shunt or a nonshunt character is selected by contact 343 of track relay 4TR. If this track relay is picked up, there is no circuit closed for the energization of the code transmitter relay C1 during the eighth step, but after track relay 4TR is dropped away, a pick-up circuit is provided for relay C1 which is maintained energized during the eighth step for the transmission of a nonshunt character. This circuit extends from (+), including back contact 343 of relay 4TR, back contact 344 of relay CP1, back contact 345 of relay 5V1, front contact 335 of relay 3V1, front contact 336 of relay LCS1, contact fingers 337 and 338 of oscillator CT1, front contact 320 of relay LCS1, and lower winding of relay C1, to (—).

The ninth step has been assigned to the transmission of an indication of the clear or stop conditions of the signals governing eastbound traffic as indicated by the position of the signal repeater relay RM. If this relay is picked up to repeat the signals at stop, relay C1 is in its deenergized position during the ninth step, and if a signal is clear for governing eastbound traffic the relay C1 is energized during the ninth step for the transmission of a nonshunt character. The circuit by which relay C1 can be energized at this time extends from (+), including back contact 346 of relay RM, back contact 347 of relay CP1, front contact 348 of relay 4V1, back contact 349 of relay 2V1, back contact 316 of relay 6V1, front contact 317 of relay LCS1, contact fingers 318 and 319 of oscillator CT1, front contact 320 of relay LCS1, and lower winding of relay C1, to (—).

Relay LM is provided for repeating the conditions of signals for governing westbound traffic and the energization or deenergization condition of this relay determines the character to be transmitted during the tenth step. Thus, if this relay is picked up during the tenth step, no energy is applied to the code transmitter relay C1 and a shunt character is transmitted. If this relay is dropped away at this time relay C1 is picked up for the transmission of a nonshunt character during the tenth step by the energization of a circuit extending from (+), including back contact 349 of relay LM, back contact 350 of relay CP1, back contact 333 of relay 6V1, front contact 334 of relay 5V1, back contact 335 of relay 3V1, front contact 336 of relay LCS1, contact fingers 337 and 338 of oscillator CT1, front contact 320 of relay LCS1, and lower winding of relay C1, to (—).

In this same manner, additional indications can be transmitted during the respective different steps formed as the stepping progresses, each device to be indicated being assigned a different channel for the control of the code transmitter relay C1. The eleventh step is not used for the communication of an indication as a shunt character is always transmitted at this time. If a nonshunt character were transmitted during the eleventh step, and the transmitting station should be lagging the control office, the control office might misinterpret this character for the start of the second half of the indication cycle.

When the eleventh step is taken, energy is applied to the winding of the oscillator CT1 at each of the field stations, and to the winding of the oscillator CT at the control office to condition these oscillators for operation during the second half of an indication cycle of operation. The oscillator CT1 (see Fig. 5A) is energized when the stepping relay 5V1 becomes dropped away for the second time during the cycle. The circuit by which oscillator CT1 is energized at this time includes back contacts 357, 352, 353, 354, 355, and 356 of relays 6V1, 5V1, 4V1, 3V1, 2V1, and 1V1 respectively.

When the pendulum of the oscillator CT1 rotates through center for the last time during the first half of an indication cycle, relay CS1 is picked up. The circuit by which the relay CS1 is energized extends from (+), including contact fingers 222 and 223 of oscillator CT1, back contacts 224, 225, 226, and 227 of relays 5V1, 4V1, 3V1, and 1V1 respectively, and lower winding of relay CS1, to (−).

Relay CS1 when picked up closes pick up circuits for all of the stepping relays whereby the stepping relays all become picked up. The pick up circuits for the stepping relays V1 also include back contacts of the code transmitter relay C1, and this relay is always deenergized at the end of the eleventh step by the opening of contact fingers 318 and 319 (see Fig. 5D). With reference to Fig. 5B, a pick up circuit is closed for relay 1V1, for example, upon the picking up of relay CS1 through back contact 357 of relay C1 and front contact 358 of relay CS1. Each of the other stepping relays is picked up by the energization of a similar circuit.

When the stepping relays 1V become picked up at the midpoint in an indication cycle, relay C1 (see Fig. 5D) is picked up by the energization of a circuit extending from (+), including front contacts 305, 306, 307, 308, 309 and 310 of relays 6V1, 5V1, 4V1, 3V1, 2V1, and 1V1 respectively, front contact 359 of relay CSP1, front contact 360 of relay CS1, front contact 311 of relay LCS1, and upper winding of relay C1, to (−).

The picking up of relay C1 removes the shunt from the line circuit and thus permits the picking up of the line relay L1, which in turn, deenergizes relay CSP1 (see Fig. 5A). Relay CSP1 has been maintained picked up subsequent to the picking up of relay CS1 by a circuit including back contact 81 of relay L1, front contact 252 of relay CS1, and front contact 253 of relay CSP1. This circuit is opened at back contact 81 of relay L1 upon the removal of the shunt across the line wires 31 and 32 by the opening of back contact 313 of relay C1.

The picking up of relay C1 is also effective to cause the picking up successively of the relays CP1 and CPP1. This pick up circuit for the relay CP1 (see Fig. 5E) extends from (+), including front contact 361 of relay LCS1, front contact 362 of relay C1, front contact 363 of relay SD, front contact 364 of relay CS1, and upper winding of relay CP1, to (−). Relay CPP1 is picked up by the energization of a circuit extending from (+), including front contact 365 of relay LCS1, front contact 366 of relay CP1, and upper winding of relay CPP1, to (−).

Relay CSP1 is slow to drop away as has been described because of the shunting of its upper winding by front contact 242 (see Fig. 5A). The oscillator CT1 has been maintained energized subsequent to the picking up of the stepping relays by a circuit including front contact 367 of relay CSP1, and front contact 87 of relay CS1. The dropping away of relay CSP1 initiates the operation of the oscillator CT1 for the second half of the indication cycle by the opening of its circuit at front contact 367.

Relay C1 is also deenergized by the dropping away of relay CSP1 by the opening of its circuit at front contact 359 (see Fig. 5D). Thus relay C1 becomes dropped away to again apply a shunt to the line circuit which causes the deenergization of the line circuit and the dropping away of the line relay L1. Relay L1 when dropped away opens the circuit by which the relay CS1 (see Fig. 5A) has been maintained picked up at front contact 77, thus causing the dropping away of this relay to complete the conditioning of the apparatus at the field station under consideration for entering the second half of the indication cycle of operation.

The mode of operation of the system during the last half of the indication cycle for the transmission of indications is substantially the same as that which has been described for the first half of the cycle, except that the circuits for the control of the code transmitter relay C1 (see Fig. 5D) are selected through front contacts of relay CP1, as compared to these circuits being selected through back contacts of relay CP1 during the first half of the indication cycle.

The stick circuits for the relay CSP1 during the second half of an indication cycle are substantially the same as the stick circuits used during the first half of this cycle, except that it is no longer necessary to include contact 327 of relay C1 (see Fig. 5A) in the stick circuits because this contact is used primarily to detect transmission by a superior station as has been heretofore described, and station registration having been completed by the time the first half of the cycle is completed, it is no longer necessary to use this selection. Therefore, the stick circuits for relay CSP1 shunt around this selection by being taken through front contact 328 of relay CP1. Otherwise, the stick circuits provided for maintaining relay CSP1 picked up during the respective steps of the last half of the indication cycle correspond to stick circuits that have been described for maintaining relay CSP1 picked up during corresponding steps of the first half of the cycle.

Upon termination of the 22nd step by the rotation of the pendulum of the oscillator CT1 through center during the last half of the last excursion of the pendulum, relay C1 is dropped away (assuming a nonshunt character had been transmitted during the last step). This relay is dropped away because of the opening of its circuit at contact fingers 318 and 319 of oscillator CT1 (see Fig. 5D). The dropping away of this relay shunts the line wires 31 and 32 by the closure of back contact 313 (see Fig. 5A), and thus causes the dropping away of the line relay L1 at the associated field station.

The rotation of the pendulum of the oscillator CT1 through center for the last time during the cycle also is effective to cause the picking up of relay CS1 (see Fig. 5A). The circuit for the energization of relay CS1 at this time extends from (+), including contact fingers 222 and 223 of oscillator CT1, back contacts 224, 225, 226 and 227 of relays 5V1, 4V1, 3V1 and 1V1 respectively, and lower winding of relay CS1, to (−).

Relay CS1 when picked up causes the dropping away of relay LCS1 and relay LC1 by opening a stick circuit at back contact 368 of relay CS1. This stick circuit by which the relays LCS1 and LC1 have been maintained picked up extends from (+), including back contact 368 of relay CS1, front contact 369 of relay CSP1, front contact 370 of relay LCS1, back contact 371 of relay 2V1, front contact 372 of relay LCS1, winding of relay LCS1, front contact 304 of relay LC1 and upper winding of relay LC1, to (−). The stick circuit that has just been described is effective for maintaining relays LCS1 and LC1 picked up after the second step in both the first and second halves of the indication cycle. During the period prior to that, the relays are maintained picked up by a stick circuit including front contact 373 of relay SD and back contact 374 of relay CSP1 connected in multiple, front contact 375 of relay 1V1, front contact 376 of relay 3V1, front contact 377 of relay 5V1, front contact 372 of relay LCS1, winding of relay LCS1, front contact 304 of relay LC1, and upper winding of relay LC1. This circuit just described is open during the first step, but at this time relays SD and CSP1 have not as yet been picked up and therefore, with line relay L1 in its dropped away position, a stick circuit is closed for relays LCS1 and LC1 including back contact 378 of relay L1, back contact 379 of relay SD, back contact 380 of relay CS1, front contact 376 of relay 3V1, front contact 377 of relay 5V1, front contact 372 of relay LCS1, winding of relay LCS1, front contact 304 of relay LC1, and upper winding of relay LC1, to (−).

At the midpoint in the indication cycle, relay LCS1 is held during the picking up of relay CS1 through front contact 373 of relay SD, back contact 520 of relay CP1, front contact 369 of relay CSP1, front contact 370 of relay LCS1, back contact 377 of relay 5V1, front contact 372 of relay LCS1, winding of relay LCS1, front contact 304 of relay LC1, and upper winding of relay LC1. Upon the picking up of relay CS1, another stick circuit is closed for relay LCS1 to maintain that relay picked up during the picking up of the stepper relays V1. This stick circuit includes front contact 373 of relay SD, back contact 520 of relay CP1, front contact 369 of relay CSP1, front contact 370 of relay LCS1, back contact 521 of relay C1, front contact 522 of relay SD, front contact 303 of relay CS1, winding of relay LCS1, front contact 304 of relay LC1, and upper winding of relay LC1. When the stepper relays V1 are all picked up at the midpoint in the cycle, another stick circuit is closed for relay LCS1 to maintain that relay energized until the stepping is initiated for the second half of the cycle. This stick circuit extends from (+), including front contact 373 of relay SD, front contact 375 of relay 1V1, front contact 376 of relay 3V1, front contact 377 of relay 5V1, front contact 372 of relay LCS1, winding of relay LCS1, front contact 304 of relay LC1, and upper winding of relay LC1, to (−).

The station that has been successful by way of code superiority in transmitting its indications during the cycle has had its change relay CH1 restored to its picked up position when the seventh step has been taken during the cycle. The circuit by which this relay is picked up includes back contact 381 of relay SD, back contact 382 of relay 1V1, front contact 383 of relay 2V1, back contact 530 of relay 6V1, front contact 384 of relay LC1, and winding of relay CH1.

The stepping relays 1V1 to 6V1 inclusive are picked up upon the picking up of relay CS1 by a mode of operation that has been described when considering specifically the mode of operation of the stepping relay banks.

With reference to the line circuit at a field station as illustrated in Fig. 5A, it will be noted that the dropping away of relay LCS1 removes the shunt that has been applied to the line circuit by the opening of front contact 312, and thus the line relay L1 is restored to its picked up position. Relay LCS1 in dropping away also causes the dropping away of relays CPP1 and CP1 respectively because of the opening of the circuit of the relay CPP1 at front contact 365 of relay LCS1. Although the circuit that has been described for relay CP1 is also opened at front contact 361 of relay LCS1, relay CP1 is maintained picked up until the relay CPP1 is dropped away by an obvious stick circuit including front contact 385 of relay CP1 and front contact 386 of relay CPP1. Relays CPP1 and CP1 are made slow in dropping away by having their respective lower windings shunted by front contacts 387 and 388 respectively.

Relay CSP1 becomes dropped away in response to the picking up of the line relay L1 in the clearout period at the end of the indication cycle because of the opening of the stick circuit that has been described for this relay at back contact 81 (see Fig. 5A).

Relay C1 is picked up at the end of an indication cycle when all of the stepping relays have been restored to their picked up positions in accordance with the energization of a circuit that has been described including front contacts of all of the stepping relays in series with back contact 311 of relay LCS1 (see Fig. 5D). This completes a consideration of the normal mode of operation at a transmitting field station during an indication cycle, except that the cycle distribution relay SD becomes dropped away after a time, provided the system is at rest for a predetermined length of time.

*Indication station selection.*—Having thus considered specifically the mode of operation at a superior field station, consideration will now be given more specifically to the mode of operation at an inferior field station which has a simultaneous start with a superior station. The general mode of operation at the inferior station is substantially the same as that which has been described, except that the transmission from that station is suppressed when its registration code becomes out of correspondence with the registration code transmitted by a superior station. This condition is detected by the relay CSP1 (see Fig. 5A) in that this relay becomes dropped away at an inferior station when the line relay L1 and the code transmitter relay C1 are out of correspondence in their positions for a sufficient time to permit the dropping away of relay CSP1. Relay CSP1 is made slow in dropping away as has been described by the shunting of its upper winding through front contact 242.

More specifically, if a shunt is applied to the line circuit by a superior station when a nonshunt character is called for by the energized condition of the code transmitter relay C1 at the inferior station, the line relay L1 at the inferior station fails to become picked up. This failure of the line relay L1 to respond, is, of course, due to the shunt being applied across the line circuit between the associated station and the control office, and because of this relay failing to be picked up under these conditions, front contact 326 in a stick circuit that has been described for relay CSP1 is open, and therefore, the relay CSP1 becomes dropped away because of the shunt by the superior station.

The dropping away of relay CSP1 in response to a superior code causes the dropping away of relays LCS1 and LC1 (see Fig. 5C) at the associated station by the opening of front contact 369. With relay LCS1 dropped away, the line shunting circuit at the associated station is open for the remainder of the cycle at front contact 312 (see Fig. 5A).

To insure sufficient time for the rejection of an inferior station in case the stepping may be substantially out of correspondence at the various stations, a stick circuit is provided on the relay C1 which will hold that relay up as long as the line remains shunted by a superior station. This stick circuit extends from (+), including front contact 523 (see Fig. 5D) of relay CSP1, back contact 524 of relay SD, back contact 525 of relay L1, front contact 526 of relay C1, front contact 311 of relay LCS1, and upper winding of relay C1, to (−). It is, therefore, provided that there is always sufficient time for the relay CSP1 to be dropped away at an inferior station while indication station selection is taking place.

At the midpoint in the indication cycle, at an inferior station, the relay C1 is dropped away when relay CS1 is picked up so as to close circuits for picking up the stepping relays as has been described, and after the stepping relays have all been picked up, relay C1 is again energized by a pick up circuit extending from (+), including front contacts 305, 306, 307, 308, 309, and 310 of relays 6V1, 5V1, 4V1, 3V1, 2V1, and 1V1 respectively, back contact 311 of relay LCS1, and upper winding of relay C1, to (−). The relay CS1 is then dropped away, and stick circuit is closed for maintaining the relay C1 picked up for the remainder of the indication cycle.

*Reception of indications.*—When an indication cycle is first initiated by the opening of the line circuit by a field station, the line relay L (see Fig. 4B) at the control office becomes dropped away, and the dropping away of this relay causes the dropping away of relay CS, which in turn opens the line circuit by the opening of front contact 34. The stepping is initiated by the dropping away of the line relay L in accordance with the opening of the circuit for the oscillator CT (see Fig. 4D) at front contact 57.

Upon the opening of the line circuit at the control office, the decay of flux in the impulse transformer 36 (see Fig. 4B) causes the picking up of the line relay L (see Fig. 4B).

Figure 4E:
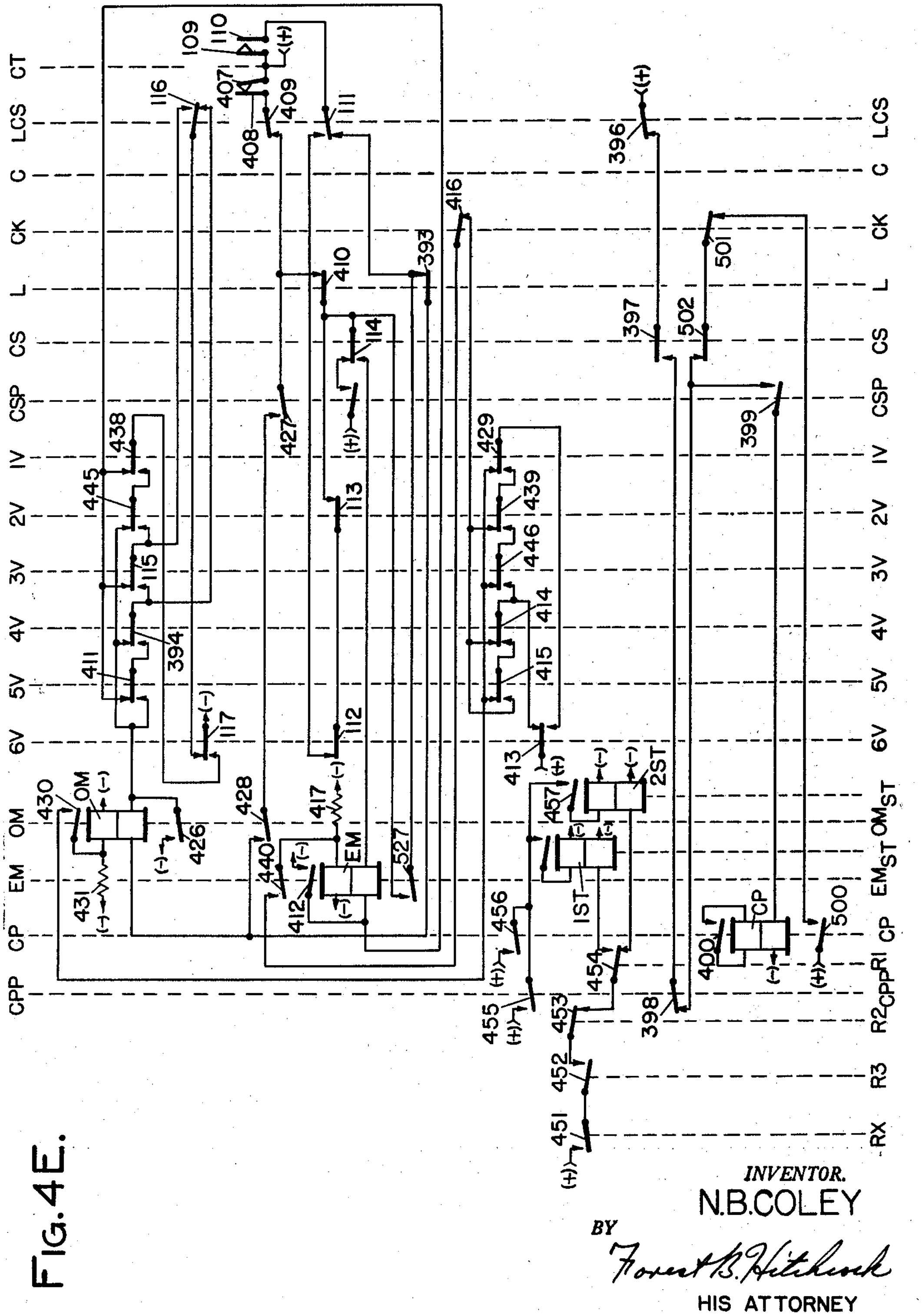
Figure 4F:
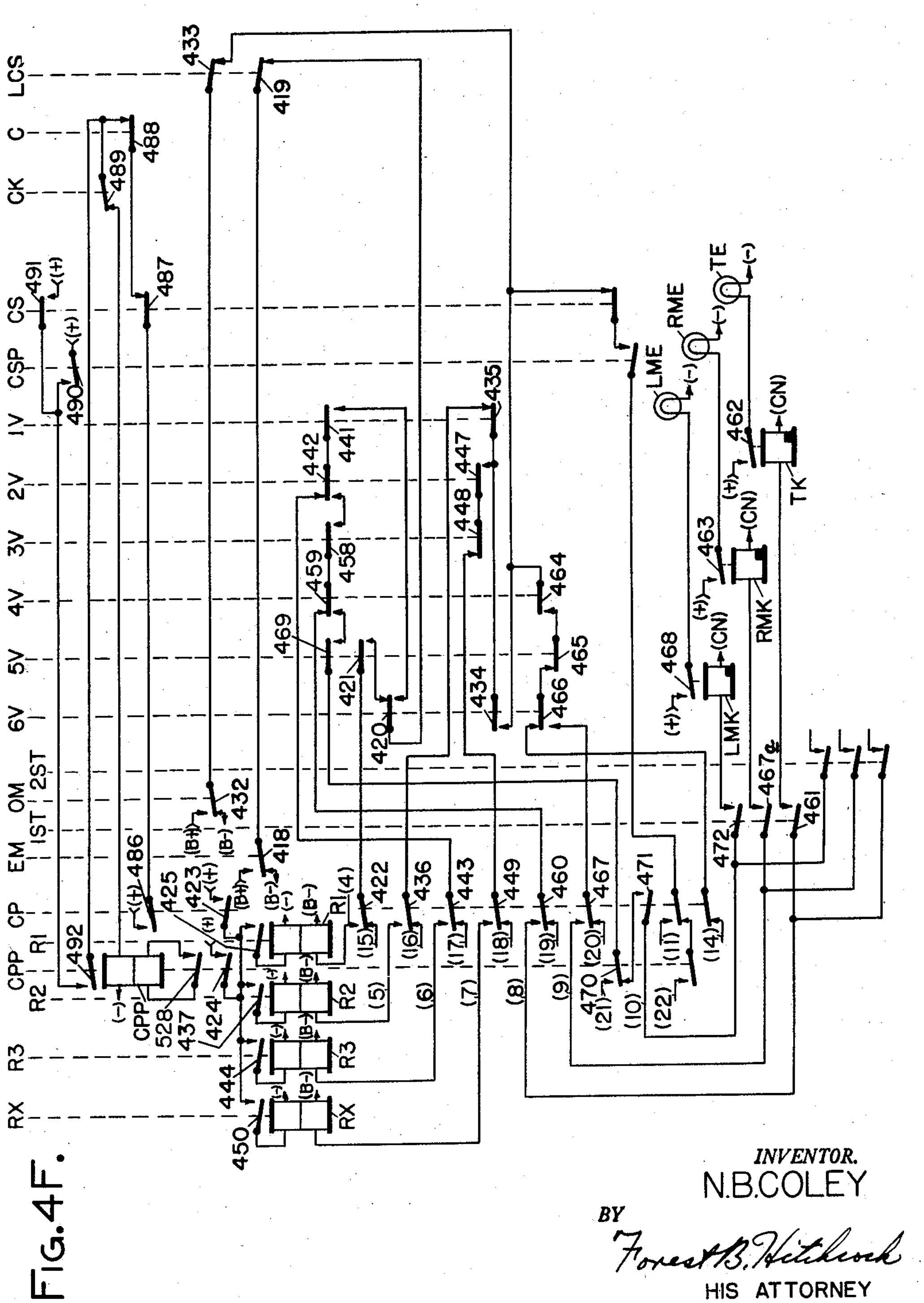

When the oscillator pendulum rotates through center for the first time during the cycle, in addition to causing the first step to be taken, a circuit is also closed for the energization of relay OM (see Fig. 4E). This circuit extends from (+), including contact fingers 109 and 110 of oscillator CT, back contact 111 of relay LCS, front contact 393 of relay L, lower winding of relay OM, front contact 394 of relay 4V, back contact 116 of relay LCS, and front contact 117 of relay 6V, to (—). This relay when picked up is maintained energized until the opening of the contact fingers 109 and 110 of oscillator CT.

In accordance with the picking up of relay OM, relay CSP (see Fig. 4B) has its pick-up circuit closed from back contact 73 of relay CS, back contact 74 of relay CK, front contact 395 of relay OM, front contact 75 of relay 5V, and lower winding of relay CSP, to (—).

In response to the picking up of relay CSP, relay CP (see Fig. 4E) is picked up by the energization of a circuit extending from (+), including back contact 396 of relay LCS, back contact 397 of relay CS, back contact 398 of relay CPP, front contact 399 of relay CSP, and lower winding of relay CP, to (—). Relay CP is made slow to drop away by the shunting of its upper winding through its front contact 400.

Relay CSP is maintained picked up during the second step by a stick circuit extending from (+), including back contact 73 of relay CS, front contact 401 of relay CSP, front contact 402 of relay 6V, back contact 403 of relay 1V, front contact 404 of relay 3V, and lower winding of relay CSP, to (—).

It will be noted that the line circuit is closed at the control office as has been described upon the dropping away of relay 2V at the beginning of the second step. Relay 2V closes the line circuit at back contact 321 (see Fig. 4B). In accordance with the closure of the line circuit, the increase in flux in the impulse transformer 36 causes the line relay L to be actuated to its dropped away position, in which position it remains until the removal of the shunt by the field at the end of the second step. The removal of the shunt causes a decrease in the line current, and thus the relay L is actuated to its picked up position at the beginning of the third step. When the third step is taken, the circuit last described for the relay CSP is opened at front contact 404 of relay 3V, and thus the relay CSP is dependent for energization upon the pick-up circuit that has been described including front contact 395 of relay OM.

In accordance with the line relay L having been picked up at the control office during the third step, relay OM becomes picked up as has been described. The picking up of relay OM is effective provided that the line circuit is not shunted during the third step, thus proving that the field transmitting station is sufficiently in synchronism with the receiving apparatus at the control office so that the control office can properly decode that which is transmitted during the remainder of the cycle.

Should the line relay L at the control office fail to become picked up during the third step as has been described, the relay OM could not be picked up because its pick-up circuit would be open at front contact 393 of relay L and thus the pick-up circuit that has been described for relay CSP could not be closed because of front contact 395 of relay OM being opened. Under these conditions, the relay CSP would become dropped away and thus apply a shunt across the line battery through the limiting resistor 33 so as to retire all field stations that are transmitting and cause all of these field stations to initiate another cycle of operation simultaneously, under which conditions they will be sufficiently in synchronism with the stepping at the control office to provide for proper communication of the indications. This shunt circuit extends from the positive terminal of the line battery LB, through resistor 33, back contact 34 of relay CS, back contact 405 of relay LCS, back contact 406 of relay CSP, back contact 38 of relay C, back contact 37 of relay EM, and primary winding of impulse transformer 36 to the negative terminal of the line battery LB.

As the stepping progresses, beginning with the character received during the fourth step, the relays OM and EM are selectively governed during the respective odd and even steps in accordance with the respective characters that are received. Each of these relays is picked up during its associated steps only provided that line relay L at the control office is picked up, and this relay is picked up only during steps in which the line circuit is not shunted by a transmitting field station.

If there is no shunt applied to the line circuit during the fourth step, relay EM is picked up by the energization of a circuit extending from (+), including contact fingers 407 and 408 of oscillator CT, back contact 409 of relay LCS, front contact 410 of relay L, back contact 114 of relay CS, winding of relay EM, front contact 411 of relay 5V, back contact 394 of relay 4V, back contact 116 of relay LCS, and front contact 117 of relay 6V, to (—). This relay when picked up is maintained energized by the closure of front contact 412 of relay EM which shunts the selections that have been described in the negative side of the pick up circuit. Relay EM, when picked up during an even step is maintained energized during the next following odd step during which the indication that has been received is executed.

The stick circuit by which relay EM is maintained picked up during the fifth step extends from (+), including front contact 413 of relay 6V, back contact 414 of relay 4V, back contact 415 of relay 5V, back contact 416 of relay CK, front contact 440 of relay EM, and upper winding of relay EM, to (—). This circuit is closed until the dropping away of relay 6V at the beginning of the sixth step, and although the relay EM is maintained slow in dropping away by the upper winding being shunted by the resistor 417, this relay will have plenty of time to drop away in case there is a shunt character received during the sixth step so as to cause the relay L to be dropped away, and thus prevent the closure of a pick up circuit during this step. Prior to the closure of back contact 415 of relay 5V, relay EM is held by a stick circuit including contact fingers 109 and 110 of oscillator CT, back contact 111 of relay LCS, front contact 527 of relay EM, back contact 114 of relay CS, lower winding of relay EM and front contact 412 of relay EM. This stick circuit is effective at a comparable time during any odd step when relay EM has been picked up during a preceding even step.

If relay EM has been picked up during the fourth step, because of this relay being maintained energized during the fifth step, the registration relay R1 (see Fig. 4F) is picked up by the energization of a circuit extending from (B+), including front contact 418 of relay EM, back contact 419 of relay LCS, front contact 420 of relay 6V, back contact 421 of relay 5V, front contact 422 of relay CP, and lower winding of relay R1, to (B—). This relay when picked up is maintained energized for the remainder of the cycle by a stick circuit including front contacts 423 and 424 of relays CP and CPP respectively connected in multiple, front contact 425 of relay R1, and upper winding of relay R1. It will be noted that the relay R1 would not be picked up during the fifth step if the relay EM were in its dropped away position so as to select the connection of the negative terminal (B—) through back contact 418 of relay EM to the lower winding of relay R1 for the energization of relay R1 with the opposite polarity.

If the fifth character transmitted is a shunt character, the relay OM is not picked up during the fifth step, and thus the relay R2 (see Fig. 4F) remains in its dropped away position. If a nonshunt character is transmitted during the fifth step, however, the relay OM (see Fig. 4E) is picked up by a circuit extending from (+), including contact fingers 109 and 110 of oscillator CT, back contact 111 of relay LCS, front contact 393 of relay L, lower winding of relay OM, back contact 411 of relay 5V, back contact 394 of relay 4V, back contact 116 of relay LCS, and front contact 117 of relay 6V, to (−). Upon the picking up of this relay, the closure of front contact 426 shunts the selections in the negative side of the circuit just described out of the circuit. Relay OM is maintained picked up irrespective of the condition of energization of the line relay L when the oscillator pendulum rotates through center at the end of the fifth step by a stick circuit extending from (+), including contact fingers 407 and 408 of oscillator CT, back contact 409 of relay LCS, front contact 427 of relay CSP, front contact 428 of relay OM, lower winding of relay OM and front contact 426 of relay OM, to (−). When the relay 6V is dropped away another stick circuit is closed to maintain relay OM picked up during the sixth step. This stick circuit extends from (+), including back contact 413 of relay 6V, front contact 429 of relay 1V, front contact 430 of relay OM, and upper winding of relay OM, to (−). Relay OM is made slightly slow in dropping away by the resistor 431 which is shunted across its upper winding.

If relay OM is maintained picked up during the sixth step as has been described, relay R2 is picked up during the sixth step by the energization of a circuit extending from (B+), including front contact 432 of relay OM, back contact 433 of relay LCS, back contact 434 of relay 6V, front contact 435 of relay 1V, front contact 436 of relay CP, and lower winding of relay R2, to (B−). This relay when picked up is maintained energized through an obvious stick circuit including its front contact 437.

If the line circuit is shunted by the field station transmitting during the sixth step, the line relay L is dropped away at the control office, and thus the system enters the seventh step with the relay EM in its dropped away position. With relay EM in its dropped away position during the seventh step, the registration relay R3 remains in its dropped away position.

If the line circuit is not shunted during the sixth step, the line relay L is in its energized position, and thus the relay EM is picked up by the energization of a circuit extending from (+), including contact fingers 407 and 408 of oscillator CT, back contact 409 of relay LCS, front contact 410 of relay L, back contact 114 of relay CS, lower winding of relay EM, front contact 438 of relay 1V, and back contact 117 of relay 6V, to (−). This relay is maintained energized during the seventh step by a stick circuit extending from (+), including back contact 413 of relay 6V, back contact 429 of relay 1V, front contact 439 of relay 2V, back contact 416 of relay CK, front contact 440 of relay EM, and upper winding of relay EM, to (−). With relay EM picked up, relay R3 is picked up during the seventh step by the energization of a circuit extending from (B+), including front contact 418 of relay EM, back contact 419 of relay LCS, back contact 420 of relay 6V, back contact 441 of relay 1V, front contact 442 of relay 2V, front contact 443 of relay CP, and lower winding of relay R3, to (B−). This relay when picked up is maintained energized through an obvious stick circuit including its front contact 444.

A nonshunt character is transmitted during the seventh step as an arbitrarily selected character to permit the execution during this step of the station registration code so as to pick up a selected station relay ST (see Fig. 4E) and thus identify the particular field station that is transmitting for the reception of the indications that are to follow during the cycle. Relay OM is picked up during the seventh step in accordance with the line relay L being maintained energized at this time. The pick-up circuit for relay OM extends from (+), including contact fingers 109 and 110 of oscillator CT, back contact 111 of relay LCS, front contact 393 of relay L, lower winding of relay OM, front contact 445 of relay 2V, back contact 438 of relay 1V, and back contact 117 of relay 6V, to (−). Relay OM is maintained picked up during the eighth step by a stick circuit extending from (+), including back contact 413 of relay 6V, back contact 429 of relay 1V, back contact 439 of relay 2V, front contact 446 of relay 3V, front contact 430 of relay OM, and upper winding of relay OM, to (−).

Relay RX is picked up during the eighth step by the energization of a circuit extending from (B+), including front contact 432 of relay OM, back contact 433 of relay LCS, back contact 434 of relay 6V, back contact 447 of relay 2V, front contact 448 of relay 3V, front contact 449 of relay CP, and lower winding of relay RX, to (B−). This relay when picked up closes an obvious stick circuit at front contact 450. The picking up of relay RX closes a circuit to apply energy to the fan for the energization of a station relay ST (see Fig. 4E). Thus, if it is assumed that the station registration code "shunt-shunt-nonshunt" is applied, relay 2ST (second station) is picked up by the energization of a circuit extending from (+), including front contact 451 of relay RX, front contact 452 of relay R3, back contact 453 of relay R2, back contact 454 of relay R1, and lower winding of relay 2ST, to (−). The picking up of this relay closes a stick circuit to maintain this relay energized for the remainder of the indication cycle. This stick circuit includes front contacts 455 and 456 of relays CPP and CP respectively connected in multiple and front contact 457 of relay 2ST.

The first indication code character is received during the eighth step, and if this character is a shunt character, the relay EM remains dropped away. If, however, a nonshunt character is received during the eighth step, the relay EM is picked up (see Fig. 4E) by the energization of a circuit extending from (+), including contact fingers 407 and 408 of oscillator CT, back contact 409 of relay LCS, front contact 410 of relay L, back contact 114 of relay CS, lower winding of relay EM, front contact 115 of relay 3V, back contact 445 of relay 2V, back contact 438 of relay 1V, and back contact 117 of relay 6V, to (−).

Relay EM, when picked up during the eighth step is maintained energized during the ninth step by the energization of a circuit extending from (+), including back contact 413 of relay 6V, back contact 429 of relay 1V, back contact 439 of relay 2V, back contact 446 of relay 3V, front contact 414 of relay 4V, back contact 416 of relay CK, front contact 440 of relay EM, and upper winding of relay EM, to (−). Assuming that the indication received is from a field station which has caused the energization of relay 1ST in response to its registration code, relay TK is picked up, if relay EM is energized, by the energization of a circuit extending from (B+), including front contact 418 of relay EM, back contact 419 of relay LCS, back contact 420 of relay 6V, back contact 441 of relay 1V, back contact 442 of relay 2V, back contact 458 of relay 3V, front contact 459 of relay 4V, front contact 460 of relay CP, front contact 461 of relay 1ST, and winding of relay TK, to (CN). This relay when picked up energizes the track indication lamp TE upon the closure of its front contact 462 to indicate that the corresponding track section in the field is occupied. If the character transmitted during the eighth step had been a shunt character, the relay EM would not have been picked up, and thus the indication relay TK would have been energized with a polarity to cause that relay to be actuated to its dropped away position.

This would have been accomplished by the energization of the same circuit that has been described for relay TK except that the circuit is energized by the opposite polarity because of (B—) being applied through back contact 418 of relay EM.

If a shunt character is received during the ninth step, the relay OM remains dropped away because of its circuit being opened at front contact 393 of relay L; but, if a nonshunt character is received during the ninth step, relay OM is picked up by the energization of a circuit extending from (+), including contact fingers 109 and 110 of oscillator CT, back contact 111 of relay LCS, front contact 393 of relay L, lower winding of relay OM, front contact 394 of relay 4V, back contact 115 of relay 3V, back contact 445 of relay 2V, back contact 438 of relay 1V, and back contact 117 of relay 6V, to (—). This relay when picked up is maintained energized during the tenth step by a stick circuit extending from (+), including back contact 413 of relay 6V, back contacts 429, 439, 446, and 414 of relays 1V, 2V, 3V, and 4V respectively, front contact 415 of relay 5V, front contact 430 of relay OM, and upper winding of relay OM, to (—).

If the relay OM is in its energized position during the tenth step, the magnetic stick indication relay RMK is energized with a polarity to cause this relay to close its front contact 463 and energize its associated indicator lamp RME. The circuit by which relay RMK is energized with this polarity extends from (B+), including front contact 432 of relay OM, back contact 433 of relay LCS, back contact 464 of relay 4V, front contact 465 of relay 5V, back contact 466 of relay 6V, front contact 467 of relay CP, and front contact 467*a* of relay 1ST, and winding of relay RMK, to (CN). Should the relay OM have been in its dropped away position during the tenth step, relay RMK would have been energized by the opposite polarity by the circuit just described, with (B—) applied through back contact 432. Under these conditions, relay RMK would have been energized with a polarity to cause it to be dropped away and thus open the circuit at front contact 463 of its associated indicator lamp RME.

If a shunt character is received during the tenth step, the relay EM is not picked up but if the character received is a nonshunt character, relay EM is picked up during the tenth step by the energization of a circuit extending from (+), including contact fingers 407 and 408 of oscillator CT, back contact 409 of relay LCS, front contact 410 of relay L, back contact 114 of relay CS, lower winding of relay EM, front contact 411 of relay 5V, back contacts 394, 115, 445, 438, and 117 of relays 4V, 3V, 2V, 1V, and 6V respectively, to (—). Relay EM is maintained energized during the eleventh step by a stick circuit extending from (+), including back contact 413 of relay 6V, back contacts 429, 439, 446, and 415 of relays 1V, 2V, 3V, 4V, and 5V respectively, back contact 416 of relay CK, front contact 440 of relay EM, and upper winding of relay EM, to (—).

If the relay EM is in its picked up position during the eleventh step, the magnetic stick relay LMK (see Fig. 4F) is energized with a polarity that causes that relay to be picked up and thus provide for energization of the associated indicator lamp OM through front contact 468. The circuit by which the magnetic stick relay is energized during the eleventh step extends from (B+), through front contact 418 of relay EM, back contact 419 of relay LCS, back contacts 420, 441, 442, 458, 459, and 469 of relays 6V, 1V, 2V, 3V, 4V, and 5V respectively, back contact 470 of relay CPP, front contact 471 of relay CP, front contact 472 of relay 1ST, and winding of relay LMK, to (CN). Relay LMK would have been energized with the opposite polarity through the same circuit had the relay EM been in its dropped away position during the eleventh step so as to apply (B—) through its back contact 418.

When the last step is taken at the control office during the first half of an indication cycle, the oscillator CT is momentarily energized, and other operations take place to condition the code communication apparatus at the control office for the reception of the second half of the indication cycle. When relay 5V becomes dropped away for the second time, all of the stepping relays are in their dropped away positions, and an energizing circuit is closed for the oscillator CT extending from (+), including back contacts 473, 474, 475, 476, 477 and 478 of relays 6V, 5V, 4V, 3V, 2V and 1V respectively and the winding of oscillator CT, to (—).

When the pendulum of the oscillator CT rotates through center for the last time during the first half of the indication cycle, a pick up circuit is closed for relay CS extending from (+), including contact fingers 478 and 479 of oscillator CT, back contact 480 of relay LCS, back contacts 481, 482, 483 and 484 of relays 1V, 3V, 4V and 5V respectively and upper winding of relay CS, to (—). This relay when picked up is maintained energized as long as front contact 485 of relay CSP remains closed, and also as long as the line relay L maintains front contact 71 closed in the stick circuit for relay CS.

Upon the picking up of relay CS, a pick up circuit is closed for relay CPP (see Fig. 4F) extending from (+), including front contact 486 of relay CP, front contact 487 of relay CS, front contact 488 of relay C, back contact 489, of relay CK, and upper winding of relay CPP, to (—). This relay when picked up is maintained energized for the remainder of the indication cycle by a stick circuit having energy applied thereto by either front contact 490 of relay CSP or back contact 491 of relay CS, and including front contact 492 of relay CPP, back contact 489 of relay CK, and upper winding of relay CPP.

The picking up of relay CS at the midpoint in the indication cycle also causes the picking up of the stepping relays, each of the stepping relays being energized by a circuit comparable to the circuit for the energization of relay 1V (see Fig. 4C) including back contact 493 of relay C, front contact 494 of relay CS, and lower winding of relay 1V, to (—).

After all of the stepping relays have become picked up, relay C (see Fig. 4D) becomes picked up by the energization of a circuit that has been described including the front contacts of all of the stepping relays.

Relay C, in picking up, opens a stick circuit by which relay CSP has been maintained picked up. This stick circuit extends from (+), including back contact 495 of relay L, front contact 496 of relay CSP, back contact 74 of relay CK, front contact 497 of relay CSP, back contact 498 of relay C, front contact 75 of relay 5V, and lower winding of relay CSP, to (—). All other stick circuits for the relays CSP are open at this time. Relay CSP is slow to drop away because of having its upper winding shunted by the front contact 499, and after it has become dropped away, relay CP is deenergized (see Fig. 4E) by the opening of a stick circuit for this relay at front contact 399. The stick circuit which is open at this time extends from (+), including front contact 500 of relay CP, back contact 501 of relay CK, front contact 502 of relay CS, front contact 399 of relay CSP, and lower winding of relay CP, to (—). The pick up circuit for relay CP is open at this time at back contact 398 of relay CPP.

Upon the dropping away of relay CSP, relay CP is dropped away because of the opening of its circuit at front contact 399 (see Fig. 4E). This relay, when dropped away, remains in its dropped away position for the remainder of the cycle.

The stick circuit for relay CPP has been opened by the dropping away of relay CSP at front contact 490 (see Fig. 4F), but according to the normal operation of the system, relay CS is shortly dropped away in response to the initiation of the second half of the indication cycle. The dropping away of relay CS applies energy through back contact 491 to the stick circuit for relay CPP. Relay CPP is made slow to drop away by the shunting of its lower winding through front contact 528 of relay CPP in order to hold over this short time interval during which its stick circuit is uncovered at the midpoint of the cycle. The principal reason for this circuit organization is to provide a means for automatically clearing out the apparatus at the control office in case there is no field start initiated for the second half of an indication cycle. This condition can exist where there has been a false start of the cycle of operation as by a momentary interruption of the line circuit. Under such a condition, where there would be no field station transmitting, there would be no field station properly conditioned to initiate the second half of an indication cycle. It has, therefore, been provided that the relay CPP will drop away under these conditions and effect the restoration to normal of the apparatus at the control office in order to properly condition the system for the next cycle of operation. A similar mode of operation is effective at the midpoint in the cycle at each of the field stations. Another condition under which clear out takes place at the midpoint of a cycle is a condition that will be hereinafter more fully considered where the control office automatically detects an out of correspondence condition between the apparatus at the control office and the apparatus at a transmitting field station and applies a shunt across the line circuit to retire all transmitting field stations. Under this condition, there is an automatic clearout at the midpoint of the cycle and the relay CPP at the control office is dropped away because of there being no field start to reclose its stick circuit at back contact 491 of relay CS.

The relay OM is picked up at the beginning of the second half of an indication cycle in the same way that it is picked up at the beginning of the first half of the indication cycle when the oscillator rotates through center for the first time during its first excursion. Thus, with reference to Fig. 4E, relay OM is picked up by the energization of a circuit extending from (+), including contact fingers 109 and 110 of oscillator CT, back contact 111 of relay LCS, front contact 393 of relay L, lower winding of relay OM, front contact 394 of relay 4V, back contact 116 of relay LCS, and front contact 117 of relay 6C, to (−). This relay when picked up is maintained energized until the opening of the contact fingers 109 and 110 of oscillator CT, when the oscillator pendulum rotates through center for the second time during the second half of the indication cycle.

Upon the picking up of the relay OM, a pick-up circuit is closed for relay CSP (see Fig. 4B). This circuit extends from (+), including back contact 73 of relay CS, back contact 74 of relay CK, front contact 395 of relay OM, front contact 75 of relay 5V, and lower winding of relay CSP, to (−). Relay CSP is maintained picked up throughout the rest of the cycle by the energization of stick circuits that have been described when considering operation during the first part of the cycle.

The line circuit is opened at the control office at the beginning of the second half of the indication cycle in the same manner as has been described for the opening of the line circuit at the beginning of the cycle and the open condition is terminated by the dropping away of the relay 2V when the second step is taken. The dropping away of this relay closes the line circuit at back contact 321 (see Fig. 4B) in a manner comparable to that which has been described.

Because of the mode of operation in initiating the second half of an indication cycle being comparable to that for initiating the first half of the cycle, the first two steps of the second half are not used as those steps must be governed the same as corresponding steps at the beginning of the indication cycle. Subsequent to these steps, indications are received at the control office the same as has been described for the reception of typical indications during the first half of the indication cycle.

After the last step in an indication cycle has been taken, the next time that the pendulum of the oscillator rotates through center, relay CS is picked up by the energization of a circuit which has been described. Upon the picking up of this relay, the stepping relays are restored to their energized positions in a manner which has been described and relay CPP is dropped away by the opening of its stick circuit at front contact 490 (see Fig. 4F). Upon the picking up of relays 1V to 6V inclusive, relay CSP (see Fig. 4B) becomes dropped away because of all of its stick circuits being opened simultaneously with the picking up of the line relay L to remove energy from the stick circuits at back contact 495. Relay L is picked up when the line shunt is removed by the transmitting field station.

*Lockout of field stations when control office transmits.*—When a control cycle is initiated at the control office, the line circuit is deenergized as has been described, and this causes the dropping away of the relays CS1 (see Fig. 5A) at the respective field stations. These relays remain dropped away until the end of the control cycle, and when these relays are in their dropped away positions, field starts at the associated field stations are prevented. That is, the circuit for relay LC1 (see Fig. 5C) is maintained open at front contact 297 of relay CS1. The lockout of the field stations by the control office is initially accomplished, however, by the dropping of the line relay L1 at each of the field stations. This relay, when dropped away, opens the pick-up circuit for relay LCS1 at the associated station at front contact 301 (see Fig. 5C).

*Lockout of control office when field transmits.*—When the field transmits, the control office can pick up a control start relay LC (see Fig. 4A) during the time until the initiation of the stepping and the picking up of relay CSP (see Fig. 4B). After relay CSP has been picked up, the pick up circuits for the relays LC (see Fig. 4A) are open at back contact 43 (see Fig. 4D). A relay LC can be picked up, however, at the midpoint in an indication cycle when relay CSP is momentarily dropped away, but relay LCS cannot be picked up to actually initiate another control cycle until the dropping away of relay CPP at the end of the cycle.

If the control office, however, initiates a control cycle prior to the first step, even though a field start has been made prior to this time, a mark is transmitted during the first step which is effective in a manner that has been described to retire any transmitting field stations, and condition all field stations to receive a control rather than an indication cycle. The stations having initiated indication cycles have their relays LC1 and LCS1 dropped away, but their change relays CH1 cannot be restored to their picked up positions, and thus automatic indication cycle starts are stored until the system is available for the transmission of indications.

*Cycle distribution.*—In order to prevent any one field station having repeated indication starts from monopolizing the communication system for the transmission of indications, a cycle distribution relay SD (see Fig. 5E) is provided at each of the field stations and is picked up at the beginning of an indication cycle at each station not having made an indication start. This relay is not picked up at a field station making an indication start because of its circuit being opened at front contact 79 of relay CH1 at that time. For the station that is superior, however, and transmits its indications to the control office, relay SD is picked up during the cycle after the picking up of the relay CH1 at the associated station.

The system organization is such that all indication stations not having had simultaneous indication starts at the beginning of an indication cycle are prevented from starting by the slow dropping away characteristics of their associated relays SD. This is provided because of the inclusion of back contact 296 (see Fig. 5C) of relay SD in the pick up circuit for relay LC1. If, on the other hand, a field station having a simultaneous indication start, is inferior with respect to code superiority and this is retired during the cycle, the relay SD has not been picked up and thus the relay LC1 can be picked up directly upon the picking up of relay C1 at the end of the cycle to close front contact 295 in the circuit for relay LC1. Thus, it will be seen that the inferior stations do not have to wait for the timing of the slow drop away relays SD as do the other stations not having had an indication start originally established. In this way, the indication stations are automatically grouped, and each station of a group has an opportunity to transmit but one indication cycle prior to the setting up of a new group, at which time it is required that all stations wait for the dropping away of their associated cycle distribution relays SD.

*Out of correspondence conditions between control office and field station stepping.*—The greatest out of correspondence condition between that which is received over the line circuit at the control office and the stepping at the control office will be cause by an indication code transmitted from a near field location which started after the control office received a start from a remote field location, but just before that station has been locked out by the open line condition that the control office initiates when it begins to receive. This situation is peculiar to shunt line operation because of the inability of a near station to feel the shunt put on the line by a remote station. Because of this, it is necessary for the control office to advise all stations not having felt the shunt start that an indication cycle is starting.

This is accomplished as has been described by opening the line circuit as soon as an indication start is detected by the control office. Obviously, there is a delay, which increases with line propagation time before some near stations receive this information. If, just before this, a near station starts a cycle, it may actually be lagging the control office. Since the near station is always superior in code superiority, it will complete its indication cycle, and, after the first few steps, will have retired the remote station which started the cycle of operation. The indication cycle that the control office then receives may have the transmitted code lagging the control office stepping.

This condition should occur very infrequently, because it requires that a field start be made at a specific instant after an indication cycle has been initiated. Provision is made however, for the times when it may occur to retire all stations transmitting and thus cause an initiation of a new cycle, with all indication transmitting stations starting substantially at the same time. For the second cycle, therefore, the transmission will be sufficiently in correspondence with the stepping at the control office for proper reception.

This condition of automatically retiring all stations in case there is material out of correspondence is accomplished by requiring that each field station always shunts the line circuit during the second step of an indication cycle and remove the shunt during the third step. If the receiving appartaus at the control office is so far out of synchronism with that which is received over the line circuit as not to receive the nonshunt condition at the control office during the third step taken at the control office, the line battery is shunted for the remainder of the cycle as has been described, and thus relays LCS1 and LC1 (see Fig. 5C) are dropped away at all stations attempting to transmit. These relays are restored to their picked up positions at the end of the cycle so that a second indication cycle is initiated substantially simultaneously by all of these stations, and therefore all stations are sufficiently in correspondence with the stepping at the control office to provide for proper communication of indications from the indication station transmitting having the most superior code.

A somewhat similar out of correspondence condition may be set up during a control cycle if there is a field station start of an indication cycle just prior to the start of a control cycle, and if considerable propagation time is involved in the line circuit so that the field start pulse does not reach the control office until some time later. If it is assumed that just before this pulse is received at the control office, a control office start is initiated, the control office start is then lagging the field, and the control code, when it reaches the field station will further lag the receiving oscillator at that point by the propagation time over the line circuit from the office to the field station. The maximum lag possible will be twice the line propagation time between the station involved and the control office.

Obviously, if the lag were great enough, it would be possible to receive the code incorrectly, that is, the second code element might be received during the third step, for example. To avoid this, a rejection scheme is used whereby a message with too much lag is automatically discarded. Under these conditions, it will be required that the operator press the start button for a second time to retransmit the conrol.

Rejection of the code under these conditions is accomplished by the transmitting of a short space at the beginning of step 2 as has been described when considering transmission of codes from the control office. If this space is not received at the field station before the second step relay 2V1 is dropped away at the beginning of the station step, the dropping away of relay C1 (see Fig. 5D) is prevented, and because of the dropping away of relay C1 at this time being required in order that any decoding relay M may be picked up, the failure of relay C1 to drop away will prevent the decoding of any code that is received during the cycle.

To consider this mode of operation more specifically, relay C1 is energized during the first step of the control cycle by a stick circuit extending from (+), including front contact 503 of relay L1, back contact 320 of relay LCS1, front contact 504 of relay 4V1, and lower winding of relay C1, to (−). In order for relay C1 to become dropped away, and thus permit the selective energization of the relays M, this circuit that has just been described must be opened at front contact 503 prior to the dropping away of the stepping relay 2V1. This is because the dropping away of relay 2V1 applies stick energy to the upper winding of relay C1. This stick circuit extends from (+), including back contact 389 of relay CS1, back contact 390 of relay 2V1, front contact 392 of relay C1, back contact 311 of relay LCS1, and upper winding of relay C1, to (−).

It is, therefore, provided that if relay C1 is not dropped away at the beginning of the second step during a control cycle, no decoding relay M can be picked up, and, because each control requires at least one relay M to be picked up, there can be no execution of a control in accordance with the code received.

Having described a multiple station centralized traffic control system as one specific embodiment of the present invention, it is desired to be understood that this form is selected to facilitate in the disclosure of the invention rather than to limit the number of forms which the invention may assume, and it is to be further understood that various adaptations, alterations, and modifications may be applied to the specific form shown to meet the requirements of practice without in any manner departing from the spirit or scope of the present invention except as limited by the appending claims.

What I claim is:

1. A normally at rest code communication system for two-way communication between a control office station and several remotely spaced field stations comprising in combination, a line relay at each station, a single line circuit connecting the control office station to the field stations for governing said line relays, a code transmitting relay at each station, circuit means responsive to the actuation of said code transmitting relay at each of the field stations for shunting the line circuit at the associated field station and thereby causing the actuation of the line relays at other field stations and at the control office, a normally inactive timing device at each of the stations operable through a number of free oscillations when rendered active, said timing device having different sets of contacts closed alternately at regularly timed intervals during said free oscillations, initiating means at each station rendered effective by the actuation of the line relay at the associated station to render said timing device at the associated station active, a bank of stepping relays at each station, circuit means at each station including contacts of each of said sets of said timing device at the associated station for successively actuating said stepping relays at the associated station, and code transmitting and receiving means at each station including said code transmitting relay and including contacts of each of said sets of said timing device and contacts of said stepping relays at the associated station for respectively transmitting and receiving different code elements of equal duration over said line circuit.

2. A normally at rest code communication system for two-way communication between a control office station and several remotely spaced field stations comprising in combination, a line relay at each station, a single continuous line circuit having a source of energy at the control office station and connecting said stations for governing said line relays, a normally inactive timing device at each station operable through a number of free oscillations when rendered active, said timing device having different sets of contacts closed alternately at regularly timed intervals during said free oscillations, initiating means at the control office station for rendering said timing device at the associated station active through a number of free oscillations, said initiating means when actuated being effective over the line circuit to render said timing devices contemporaneously active at the other stations, initiating means at each of the field stations for rendering said timing device at the associated station active, said initiating means at each of the field stations being effective when actuated to shunt said line circuit and thereby render said timing device active at each of the field stations more distant from the control office, means at the control office including the associated line relay responsive to the shunting of said line circuit by a field station for initiating the timing device at the control office and for acting upon the line circuit to actuate the line relays and thereby initiate the timing devices for the stations between the control office station and the field station at which the line circuit has been shunted, a bank of stepping relays at each station, circuit means at each station and at the control office including contacts of said timing device at the associated station for successively actuating said stepping relays at the associated station in response to the free oscillations of the associated timing device, and transmitting and receiving means at each station including said initiating means and including contacts of each of said sets of said timing device and contacts of said stepping relays at the associated station for respectively transmitting and receiving different code elements over said line circuit.

3. A normally at rest code communication system for two-way communication between a control office station and several remotely spaced field stations for controlling and indicating the positions of devices at the different field stations comprising in combination, a line relay at each station, a single continuous line circuit including a source of energy at the control office station and connecting the control office station with the field stations for governing said line relays, a code transmitter relay at each station, circuit means responsive to the actuation of said code transmitter relay at each of the field stations for acting upon the line circuit at the associated field station and thereby causing the actuation of the line relays at other field stations and at the control office, a normally inactive timer at each of the stations operable through a number of free oscillations when rendered active, said timer having different sets of contacts closed alternately at regularly timed intervals during said free oscillations, initiating means at each station rendered effective by the actuation of said line relay at the associated station to render said timer at the associated station active, a bank of stepping relays at each station, circuit means at each station including contacts of each of said sets of said timer at the associated station for successively actuating said stepping relays at the associated station, code transmitting and receiving means at each station including said transmitter relay and including contacts of said stepping relays at the associated station for respectively transmitting and receiving different code elements over said line circuit, application circuit means effective to selectively energize said devices at each station in accordance with the codes received over the line circuit from the control office, and means for automatically rendering said application circuit means ineffective to energize any device at any station that has its stepping means materially out of correspondence with the code that is received over the line circuit.

4. A normally at rest code communication system for two-way communication between a control office station and several remotely spaced field stations during respective control and indication cycles of operation for respectively controlling and indicating the positions of devices at the different field stations comprising in combination, a line relay at each station, a single continuous line circuit including a source of energy at the control office station and connecting the control office station with the various field stations for governing said line relays, a code transmitter relay at each station, circuit means responsive to the initial actuation of said code transmitter relay at each of the field stations for shunting the line circuit at the associated field station and thereby causing the actuation of the line relays at other field stations and at the control office for the initiation of an indication cycle of operation, a normally inactive timer at each of the stations operable through a number of free oscillations when rendered active, said timer having different sets of contacts closed alternately at regularly timed intervals during said free oscillations, initiating means at each station rendered effective by the actuation of said line relay at the associated station to render said timer at the associated station active, a bank of stepping relays at each station, circuit means at each station including contacts of each of said sets of said timer at the associated station for successively actuating said stepping relays at the associated station, code transmitting and receiving means at each station including said transmitter relay and including contacts of said stepping relays at the associated station for respectively transmitting and receiving different code elements over said line circuit, and application circuit means effective to selectively energize said devices at each station at the end of a control cycle in accordance with the codes received over the line circuit from the control office, and means for automatically rendering said application circuit means ineffective in case the stepping at the associated station is materially out of correspondence with the code received over the line circuit at the beginning of a control cycle of operation.

5. A normally at rest code communication system for two-way code communication between a control office station and several remotely spaced field stations for controlling and indicating the positions of multiple position devices at the different field stations comprising in combination, a line relay at each station, a single line circuit connecting the control office station with the field stations for governing said line relays, a code transmitter relay at each station, circuit means responsive to the actuation of said code transmitter relay initially at each of the field stations for acting upon the line circuit at the associated field station and thereby causing the actuation of the line relays at other field stations and at the control office, a normally inactive timer at each of the stations operable through a number of free oscillations when rendered active, said timer having different sets of contacts closed alternately at regularly timed intervals during said free oscillations, initiating means at each station rendered effective by the actuation of said line relay at the associated station to render said timer at the associated station active, a bank of stepping relays at each station, circuit means at each station including contacts of each of said sets of said timer at the associated station for successively actuating said stepping relays at the associated station, whereby the rate of stepping is determined by the rate of operation of the associated timer, code transmitting and receiving means at each station including said transmitter relay and including contacts of said stepping relays at the associated station for respectively transmitting and receiving different code elements over said line circuit, application circuit means for governing the energization of said devices at each station in accordance with the codes received by said receiving means over the line circuit from the control office, and means for automatically rendering said application circuit means ineffective at any field station if the stepping at the associated station is materially out of correspondence with the code received over the line circuit during a certain step.

6. A normally at rest code communication system for two-way code communication between a control office station and several remotely spaced field stations operable through respective control and indication cycles of operation for respectively controlling and indicating the positions of devices at the different field stations comprising in combination, a line relay at each station, a single continuous line circuit including a source of energy at the control office station and connecting the control office station with the various field stations for governing said line relays, a code transmitter relay at each station, circuit means responsive to the initial actuation of said code transmitter relay at each of the field stations for shunting the line circuit at the associated station and thereby causing the actuation of the line relays at other field stations and at the control office, a normally inactive timer at each of the stations operable through a number of free oscillations when rendered active, said timer having different sets of contacts closed alternately at regularly timed intervals during said free oscillations, initiating means for rendering said timer active at each station in response to the actuation of said line relay at the associated station, a bank of stepping relays at each station, circuit means at each station including contacts of each of said sets of said timer at the associated station for successively actuating said stepping relays at the associated station during both control and indication cycles of operation, whereby the rate of stepping is determined by the rate of operation of said timer at the associated station, code transmitting and receiving means at each station including said transmitting relay and including contacts of said stepping relays at the associated station for respectively transmitting and receiving different code elements over said line circuit, correspondence means at the control office actuated during a predetermined initial step of an indication cycle unless a predetermined code character is received during that step, and circuit means responsive to the actuation of said correspondence means for shunting the line circuit at the control office for the period during which indication registration codes are transmitted, and thereby prevent the reception of any indications during the cycle of operation and cause initiation of another indication cycle of operation by all field stations that were transmitting during that cycle.

7. A normally at rest code communication system for two-way code communication between a control office station and several remotely spaced field stations operable through respective control and indication cycles of operation for respectively controlling and indicating the positions of devices at the different field stations comprising in combination, a line relay at each station, a single line circuit including a source of energy at the control office station and connecting the control office station with the various field stations for governing said line relays, cycle initiating means at each station including a code transmitter relay, circuit means responsive to the initial actuation of said code transmitter relay at each of the field stations for shunting the line circuit at the associated station and thereby causing the actuation of the line relays at other field stations and at the control office, a normally inactive timer at each of the stations operable through a number of free oscillations when rendered active, said timer having different sets of contacts closed alternately at regularly timed intervals during said free oscillations, initiating means for rendering said timer active at each station in response to the actuation of the line relay or the actuation of said cycle initiating means at the associated station, a bank of stepping relays at each station, circuit means at each station including contacts of each of said sets of said timer at the associated station for successively actuating said stepping relays at the associated station during both control and indication cycles of operation, code transmitting and receiving means at each station including said transmitting relay and including contacts of said stepping relays at the associated station for respectively transmitting and receiving different code elements over said line circuit, said code transmitting means at each of the field stations being always effective when transmitting during an indication cycle to transmit successively shunt and nonshunt characters prior to transmission of a station registration code, correspondence means at the control office responsive when and only when said nonshunt character is not received in its proper step to shunt the line circuit during the entire reception of the station registration code and thereby retiring all field stations transmitting so that they all initiate another indication cycle simultaneously.

8. A normally at rest code communication system for two-way communication between a control office station and several remotely spaced field stations operable when initiated through respective control and indication cycles of operation comprising in combination, a line relay at each station, a single continuous line circuit connecting the control office station with the field stations for governing said line relays, a normally inactive timing device at each of the stations operable through a number of free oscillations when rendered active, said timing device having different sets of contacts closed alternately at regularly timed intervals during said free oscillations, initiating means at each station effective when actuated to render said timing device at the associated station operable through a number of free oscillations, said initiating means also being effective in response to actuation of said line relays over said line circuit to render said timing device at each of the other field stations and at the control office contemporaneously active, a bank of stepping relays at each station, circuit means at each station and at the control office including contacts of each of said sets of said timing device at the associated station for successively actuating said stepping relays at the associated station, and transmitting and receiving means at each station including contacts of each of said sets of said timing device and contacts of said stepping relays at the associated station for respectively transmitting and receiving different selected series of code elements of equal duration over said line circuit, a slow acting cycle distribution relay at each of the field stations, circuit means at each field station for energizing said cycle distribution relay at the associated station at the beginning of a cycle of operation for the transmission of indication codes only provided that the associated station has not initiated transmission of indications to the control office, circuit means permitting the initiation of said transmitting means at any field station only provided that said cycle distribution relay is in its dropped away position.

9. In a normally at rest code communication system for communicating control codes from a control office station to a plurality of remotely spaced field stations, a line relay at each station, a line circuit connecting the control office to the field stations for governing the line relays, a normally inactive timing device at each of the stations operable through a number of free oscillations when rendered active, said timing device having different sets of contacts closed alternately at regularly timed intervals during said free oscillations, initiating means at the control office effective when actuated to render said timing device at the associated station active through a number of free oscillations, said initiating means being effective over the line circuit to actuate the line relays and thereby substantially simultaneously render said timing device active at each of the field stations, a bank of stepping relays at each station, circuit means at each of the stations including contacts of each of said sets of said timing device at the associated station for successively actuating said stepping relays at the associated station, transmitting means at the control office including contacts of each of said sets of said timing device and contacts of said stepping relays at the associated station for transmitting a code of selected characters of equal duration over the line circuit corresponding to the station call for a selected one of said field stations, and code responsive means at each of the field stations responsive to a distinctive station code call received over the line circuit from the control office.

10. In a normally at rest code communication system of the character described for communicating indication codes selectively from a plurality of remotely spaced field stations to a control office station, a line relay at each station, a line circuit connecting the control office to the field stations for governing the line relays, a normally inactive timing device at each of the stations operable through a number of free oscillations when rendered active, said timing device having different sets of contacts closed alternately at regularly timed intervals during said free oscillations, initiating means effective in response to actuation at any field station to render said timing device active at the associated station through a number of free oscillations, said initiating means being effective over the line circuit to actuate the line relay and thereby render said timing device active at each of the other stations, a bank of stepping relays at each of the stations, circuit means at each of the stations including contacts of each of said sets of said timing device at the associated stations for successively actuating said stepping relays at the associated station, transmitting means at each of the field stations including contacts of each of said sets of said timing device and contacts of said stepping relays at the associated station for transmitting a distinctive station registration code of characters of equal duration over the line circuit to the control office, and code responsive means at the control office station distinctively responsive to the different station code calls received over the line circuit from the various field stations.

11. In a normally at rest code communication system of the character described for communicating control codes from a control office station to a plurality of remotely spaced field stations, a line relay at each station, a line circuit connecting the control office with the field stations for governing the line relays, a normally inactive timing device at each of the stations operable through a number of free oscillations when rendered active, said timing device having different sets of contacts closed alternately at regularly timed intervals during said free oscillations, initiating means effective when actuated at the control office to render said timing device at the control office active through a number of free oscillations, said initiating means being effective over the line circuit to actuate the line relay and thereby render said timing device active at each of the field stations, a bank of stepping relays at each of the field stations, circuit means at each of the stations including contacts of each of said sets of said timing device at the associated station for successively actuating said stepping relays at the associated station, transmitting means at the control office including contacts of each of said sets of said timing device and contacts of said stepping relays at the associated station for transmitting a selected series of code characters over the line circuit corresponding to the station call of a selected one of said field stations, the codes transmitted being of selected mark and space characters of equal duration, and code responsive means at each of the field stations distinctively responsive to a distinctive station code call received over the line circuit from the control office.

12. A normally at rest code communication system for communicating control codes from a control office station to a plurality of remotely spaced field stations comprising in combination, a line relay at each station, a line circuit connecting the control office with the field stations for governing the line relays, a normally inactive timing device at each of the stations operable through a number of free oscillations when rendered active, said timing device at each of the stations having different sets of contacts closed alternately at regularly timed intervals during said free oscillations, initiating means effective when actuated at the control office to render said timing device active through a number of free oscillations, said initiating means being effective over the line circuit to actuate said line relay at each of the field stations to render said timing device active at the associated station, a bank of stepping relays at each of the stations, circuit means at each of the stations including contacts of each of said sets of said timing device at the associated station for successively actuating said stepping relays at the associated station, code transmitting means at the control office including contacts of each of said sets of said timing device and contacts of said stepping relays at the associated station for transmitting a code of selected characters over the line circuit corresponding to the station call of a selected one of said field stations, said transmitting means being operable to transmit the respective code characters by selectively shunting and unshunting said line circuit during the respective steps, and code responsive means at each of the field stations responsive only to a predetermined distinctive station code call received over the line circuit from the control office.

13. A normally at rest code communication system for communicating indication codes from any one of a plurality of remotely spaced field stations to a control office station comprising in combination, a line relay at each station, a line circuit connecting the control office station with the field stations for governing the line relays, a normally inactive timing device at each of the stations operable through a number of oscillations when rendered active, said timing device having different sets of contacts closed alternately at regularly timed intervals during said oscillations, initiating means at each of the field stations effective when actuated to render said timing device active at the associated station, said initiating means being effective over the line circuit by actuation of certain of said line relays to render said timing device active at each of the other stations, a bank of stepping relays at each of the stations, circuit means at each of the stations including contacts of each of said sets of said timing device at the associated station for successively actuating said stepping relays at the associated station, transmitting means at each of the field stations including contacts of said stepping relays at the associated station for transmitting a predetermined registration code of impulses of equal duration over the line circuit, and code responsive means at the control office station distinctively responsive to the station registration codes of the respective field stations.

14. A normally at rest code communication system for two-way code communication between a control office station and several remotely spaced field stations comprising in combination, a line relay at each station, a single line circuit connecting the control office station with the field stations for governing said line relays, a normally inactive timing device at each of the stations operable through a number of free oscillations when rendered active, said timing device having different sets of contacts closed alternately at regularly timed intervals during said free oscillations, initiating means at each of the stations effective when actuated to render said timing device at the associated station operable through a number of free oscillations, said initiating means also being effective by the actuation of certain of said line relays over said line circuit to render said timing device active at each of the other stations, a bank of stepping relays at each station, circuit means at each station including contacts of each of said sets of said timing device at the associated station for successively actuating said stepping relays at the associated station, transmitting means at each of the stations for selectively shunting and unshunting said line circuit for the transmission of different series of code characters of equal duration during respective cycles of operation of the code communication system, and code receiving means at each of the stations distinctively conditioned in accordance with different codes received over the line circuit.

15. In a normally at rest code communication system of the character described for two-way code communication between a control office station and several remotely spaced field stations, a line relay at each station, a single line circuit connecting the control office station with the field stations for governing said line relays, a normally inactive timing device at each of the stations operable when rendered active through a number of free oscillations, said timing device having different sets of contacts closed alternately at regularly timed intervals during said free oscillations, initiating means at each of the stations effective when actuated to render said timing device at the associated station operable through a number of free oscillations, said initiating means also being effective over said line circuit by actuation of certain of said line relays to render said timing device active at each of the other stations, a bank of stepping relays at each station, circuit means at each station governed by said timing device at the associated station for successively actuating said stepping relays at the associated station, transmitting means at the control office station for transmitting a selected control code of characters of equal duration over said line circuit to the field station by selectively shunting and unshunting said line circuit for the transmission of different characters during steps selected by said stepping relay bank at the control office, transmitting means at each of the field stations for transmitting selected indication codes by selectively shunting and unshunting said line circuit for the transmission of selected code characters during the respective steps of said stepping relay bank at the associated station, and code receiving means at each of the stations distinctively conditioned in accordance with different codes received over the line circuit.

16. In a normally at rest code communication system for two-way code communication between a control office station and several remotely spaced field stations, a line circuit including a line relay at each station, a normally inactive timing device having two sets of contacts actuated alternately at regularly timed intervals for several operations when rendered active, initiating means at each of the stations effective when actuated to render said timing device at the associated station active, said initiating means also being effective over the line circuit by the actuation of certain of said line relays to render said timing device active at each of the other stations, a bank of stepping relays at each station, circuit means at each station governed by said contacts of said timing device at the associated station for successively actuating said stepping relays at the associated station, control code transmitting means at the control office station for transmitting a selected code over the line circuit to the field stations during the respective steps of said stepping relay bank at the control office, indication code transmitting means at each of the field stations for transmitting selected indication codes by selectively shunting and unshunting said line circuit for the transmission of selected code characters during the respective steps of said stepping relay bank at the associated station, the code characters transmitted from the field stations being always of the same duration and being transmitted only when said control code transmitting means is inactive, and code receiving means at each of the stations distinctively conditioned in accordance with different codes received over the line circuit from another station.

17. In a normally at rest code communication system of the character described for the communication of selected control codes from a control office station to a remote field station for the control of a device at the field station, a line circuit including a line relay at the field station, a normally inactive timer at each station having two sets of contacts actuated alternately at regularly timed intervals for several operations when rendered active, initiating means at the control office station effective when actuated to render said timing device at the associated station active, said initiating means also being effective over the line circuit by the actuation of said line relay to render said timer active at the field station, a bank of stepping relays at each of the stations, circuit means at each station governed by the different sets of contacts of said timer at the associated station for successively actuating said stepping relays at the associated station and partially repeating the successive operation to form a required number of successive steps, code transmitting means at the control office for transmitting a selected code to the field station for the control of said device, code receiving means at the field station responsive to the code transmitted over the line circuit from the control office for governing said device in accordance with the code received, and correspondence checking means at the field stations for detecting an out of correspondence condition between the code characters received over the line circuit and the steps taken during said repeating operation by said stepping relay bank at the field station corresponding to the steps during which these characters are intended to be received, said correspondence checking means being effective to prevent the control of said device by a control code that is received if an out of correspondence condition is detected by said correspondence checking means.

18. A normally at rest code communication system for communicating selected control codes from a control office station to a field station for operating a device at the field station comprising in combination, a line circuit connecting the two stations, a normally inactive timer at each of the stations operable through a number of free oscillations when rendered active, said timer having different sets of contacts closed alternately at regularly timed intervals during said free oscillations, initiating means effective when actuated at the control office to render said timers active at the control office and at the field station through a number of free oscillations, a bank of stepping relays at each of the stations, circuit means at each of the stations including contacts of each of said sets of said timer at the associated station for successively actuating said stepping relays at the associated station until all stepping relays have been actuated, said circuit means being effective to cause actuation of certain of the stepping relays for a second time during a control cycle of operation of the code communication system to form additional communication channels, code transmitting means at the control office including contacts of said stepping relays effective to transmit a selected series of code characters over the line circuit to the field station during a control cycle of operation, code responsive means at the field station for selectively operating a device in accordance with various control codes that are received over the line circuit from the control office, and stepper checking means at the field station actuated during the stepping in case any one of said certain stepping relays fails to be actuated for a second time to form one of said additional communication channels, said stepper checking means being effective when actuated to prevent the control of said device in response to the control code that is received.

19. In a code communication system for the communication of control codes from a control office station to a field station, a normally inactive timer at each station having two contacts that are actuated alternately to predetermined positions at regularly timed intervals when said timing device is rendered active, initiating means at the control office station effective when actuated to render said timing device at the associated station active to transmit a series of selected code characters to the field station, a bank of stepping relays at each of the stations, circuit means at each station for actuating said stepping relays successively in accordance with the actuation of said contacts of said timer, said circuit means being effective after all stepping relays have been actuated once to actuate certain of said stepping relays for a second time to provide additional communication channels, code receiving means at the field station distinctively conditioned in accordance with the reception of respective control codes, and stepper checking means actuated during the stepping in case any one of said certain stepping relays fails to be actuated for a second time, said stepper checking means being effective when actuated to prevent the control of a device in accordance with the code that is received.

20. In a code communication system of the character described, a normally inactive timing device having two contacts that are actuated alternately to predetermined positions at regularly timed intervals when said timing device is rendered active, a bank of stepping relays, circuit means for actuating said stepping relays one at a time in a predetermined numerical order, an odd numbered relay being actuated each time a particular one of said contacts is actuated to a particular position, and an even numbered relay being actuated each time the other of said contacts is actuated to a particular position, said circuit means being effective after all stepping relays have been actuated for a first time to actuate certain of said stepping relays for a second time to provide additional communication channels, and stepper checking means actuated during the stepping in case any one of said certain stepping relays fails to be actuated for a second time during the stepping operation for indicating failure in the integrity of the stepping operation.

21. In a normally at rest code communication system operable when initiated through respective indication cycles of operation for communicating indications to a control office station from any selected one of several field stations having indications to transmit, a normally inactive timer at each station having contacts actuated alternately at regular intervals when the timer is rendered active, stepping means at each station operable step by step when said timer is active at a rate determined by the rate of operation of said contacts of said timer, code transmitting means at each of the field stations effective when rendered active to initiate said timer at the associated station and to act over said line circuit to initiate the timer at each of the other field stations and at the control office station, said code transmitting means at each of the field stations being effective when rendered active to transmit over said line circuit during the respective steps of said stepper and a distinctive registration code followed by an indication code, the station registration codes being assigned to the different stations in the order of geographic superiority, and said transmitting means being effective at the midpoint of an indication cycle at each of the field stations provided the registration code at that station is superior to the registration code at all other stations to reinitiate said timer at the associated station and act over the line circuit to reinitiate said timer at the other stations, and code receiving means at the control office station distinctively responsive to the different codes received over the line circuit from the field stations.

22. In a normally at rest code communication system operable through respective indication cycles of operation for communicating indications to a control office station from any selected one of several remotely spaced field stations, a line circuit connecting the control office station and the field stations including a line relay at each station, a normally inactive timer at each station having contacts actuated alternately at regular intervals when the timer is rendered active, stepping means at each station operable step by step at a rate governed by the contacts of said timer at the associated station, code transmitting means at each of the field stations effective when rendered active to initiate said timer at the associated station, said code transmitting means when rendered active being initially effective over said line circuit to initiate the timer at each of the other stations, said code transmitting means being effective when rendered active to transmit over said line circuit during the stepping, a selected code including a station registration code characteristic of the station that is transmitting, said code transmitting means being effective at the midpoint of an indication cycle to reinitiate said timing device at the associated station and at each of the other stations to cause a complete repeat of the stepping means and thereby form additional communication channels for the transmission of indication codes from the field station that is transmitting, and code receiving means at the control office station distinctively responsive to the different codes received over the line circuit from the field stations.

23. A normally at rest code communication system for two-way communication between a control office station and several remotely spaced field stations comprising in combination, a line relay at each station, a single line circuit connecting the control office with the field stations for governing said line relays, a normally inactive timing device at each of the stations operable through a number of free oscillations when rendered active, said timing device having different sets of contacts closed alternately at regularly timed intervals during said free oscillations, initiating means at each station effective when actuated to render said timing device at the associated station operable through a number of free oscillations, said initiating means also being effective over said line circuit by the actuation of the line relays to render said timing device at each of the other stations contemporaneously active, circuit means at each station including contacts of each of said sets of said timing device at the associated station for successively actuating said stepping relays at the associated station, transmitting and receiving means at each station including contacts of each of said sets of said timing device and contacts of said stepping relays at the associated station for respectively transmitting and receiving over said line circuit different selected series of code elements constituting respective cycles of operation, all of the elements of each cycle being of equal duration, and interlocking circuit means associated with the field stations setting up an order of superiority for transmission among the field stations in case several field stations initiate transmission simultaneously.

24. A normally at rest code communication system for two-way communication between a control office station and several remotely spaced field stations comprising in combination, a line relay at each station, a line circuit connecting the control office and the field stations governing the energization of said line relays, a stepping relay bank at each station, an oscillatory timing device at each station governing the operation of said stepping relay bank when rendered active, transmitting and receiving means at each station including said stepping relay bank at the associated station operable when said timing device at the associated station is rendered active to selectively transmit and receive different series of code characters of equal duration during respective steps, initiating means at each station for initiating transmission of a selected code by said transmitting means at the associated station, said initiating means being effective over said line circuit to deenergize the line relays at all of the other stations and thereby render said oscillatory timing devices active, and interlocking means associated with the field stations setting up an order of superiority for transmission in case several field stations have simultaneous starts.

References Cited in the file of this patent

UNITED STATES PATENTS

| | | |
|---|---|---|
| Re. 21,086 | Preston | May 16, 1939 |
| 1,995,272 | Brixner | Mar. 19, 1935 |
| 2,152,010 | Zenner | Mar. 28, 1939 |
| 2,169,479 | Powell | Aug. 15, 1939 |
| 2,264,500 | Baughman | Dec. 2, 1941 |
| 2,303,875 | Baughman et al. | Dec. 1, 1942 |
| 2,350,668 | Baughman et al. | June 6, 1944 |
| 2,368,826 | Hailes et al. | June 6, 1944 |
| 2,399,734 | Hailes et al. | May 7, 1946 |
| 2,623,108 | Holden | Dec. 23, 1952 |
| 2,626,314 | Coley | Jan. 20, 1953 |